(12) United States Patent
Holmes

(10) Patent No.: US 9,347,812 B1
(45) Date of Patent: May 24, 2016

(54) ADJUSTABLE VOLUMETRIC MEASURING UTENSIL

(71) Applicant: David Aaron Holmes, Sonoma, CA (US)

(72) Inventor: David Aaron Holmes, Sonoma, CA (US)

( * ) Notice: Subject to any disclaimer, the term of this patent is extended or adjusted under 35 U.S.C. 154(b) by 18 days.

(21) Appl. No.: 14/599,501

(22) Filed: Jan. 17, 2015

(51) Int. Cl.
*G01F 19/00* (2006.01)

(52) U.S. Cl.
CPC ..................... *G01F 19/00* (2013.01)

(58) Field of Classification Search
CPC .......... G01F 19/00; G01F 22/00; G01F 11/10
USPC ............................................................. 73/429
See application file for complete search history.

(56) References Cited

U.S. PATENT DOCUMENTS

| | | | | |
|---|---|---|---|---|
| 3,530,722 A | * | 9/1970 | Miller | G01F 19/00 177/245 |
| 6,125,699 A | * | 10/2000 | Molenaar | G01F 19/002 73/429 |
| 7,503,212 B2 | * | 3/2009 | Dalla Piazza | A47F 13/08 73/429 |
| 8,327,702 B2 | * | 12/2012 | Steinkraus | G01F 19/002 73/426 |
| 2009/0056440 A1 | * | 3/2009 | Vendl | G01F 19/00 73/429 |
| 2012/0248138 A1 | * | 10/2012 | Wollach | G01F 11/44 222/1 |

* cited by examiner

*Primary Examiner* — Lisa Caputo
*Assistant Examiner* — Jamel Williams

(57) ABSTRACT

An adjustable volumetric measuring utensil has an adjustable inner member including a repositionable dam member and an outer member including a fixed wall having an incurvate interior surface forming a non-horizontally oriented channel, such that the interior surface of the channel mates with the dam member at a plurality of locations to form a measuring chamber of variable volume, the channel having a full measure indicator defining a horizontal upper boundary plane delimiting from above the measuring chamber of variable volume and defining the correct positioning of the horizontal upper surface of a measured material, whereby the dam member can be positioned partly above and partly below the horizontal upper boundary plane and whereby a variable portion of the upstream face of the dam member is in contact with the measured material, depending on its positioning, the utensil including a series of volumetric measuring indicia or recipe conversion indicia.

14 Claims, 50 Drawing Sheets

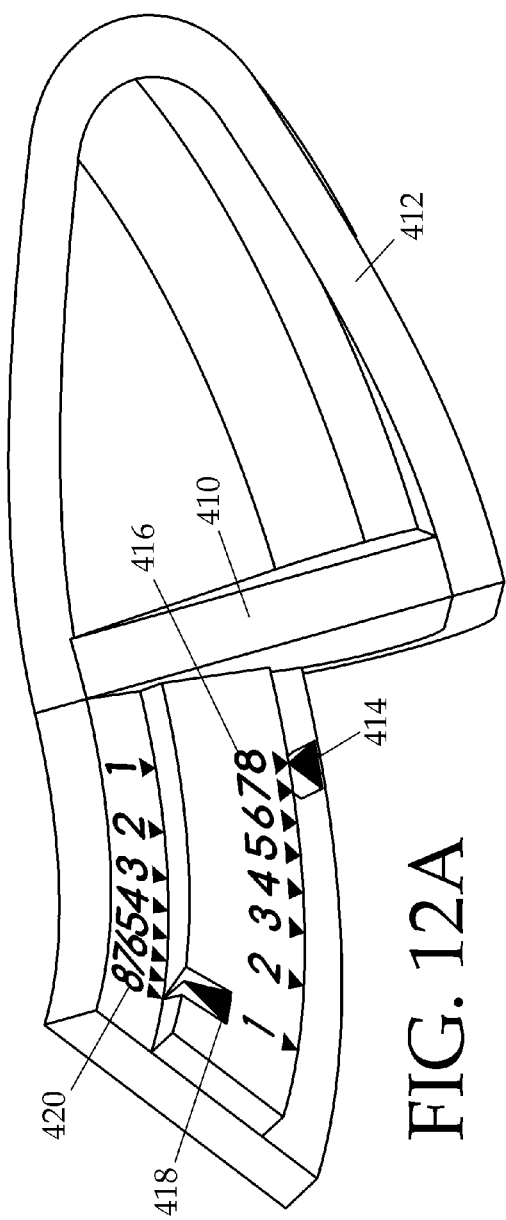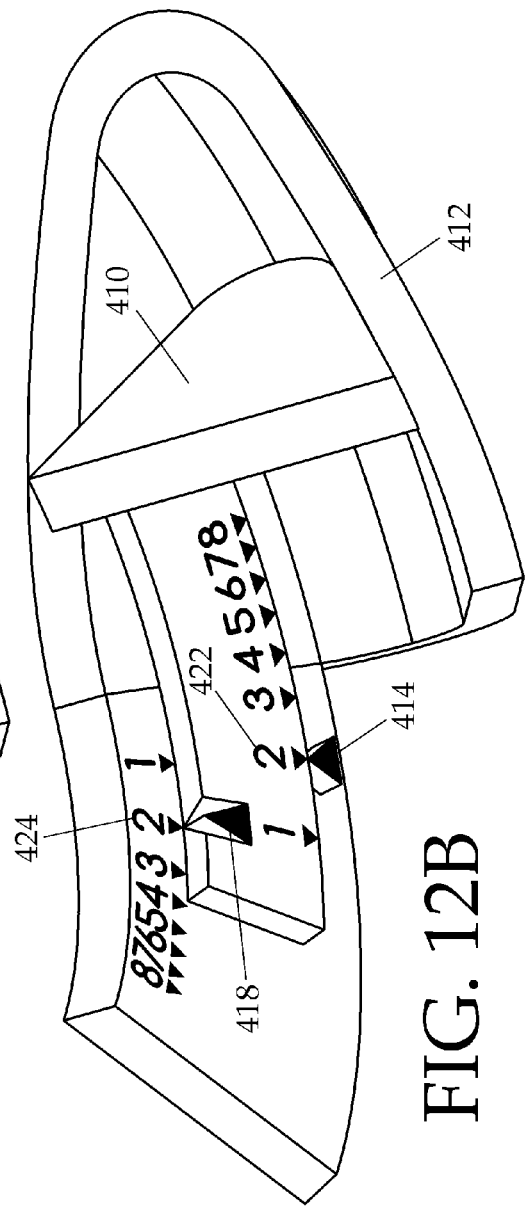

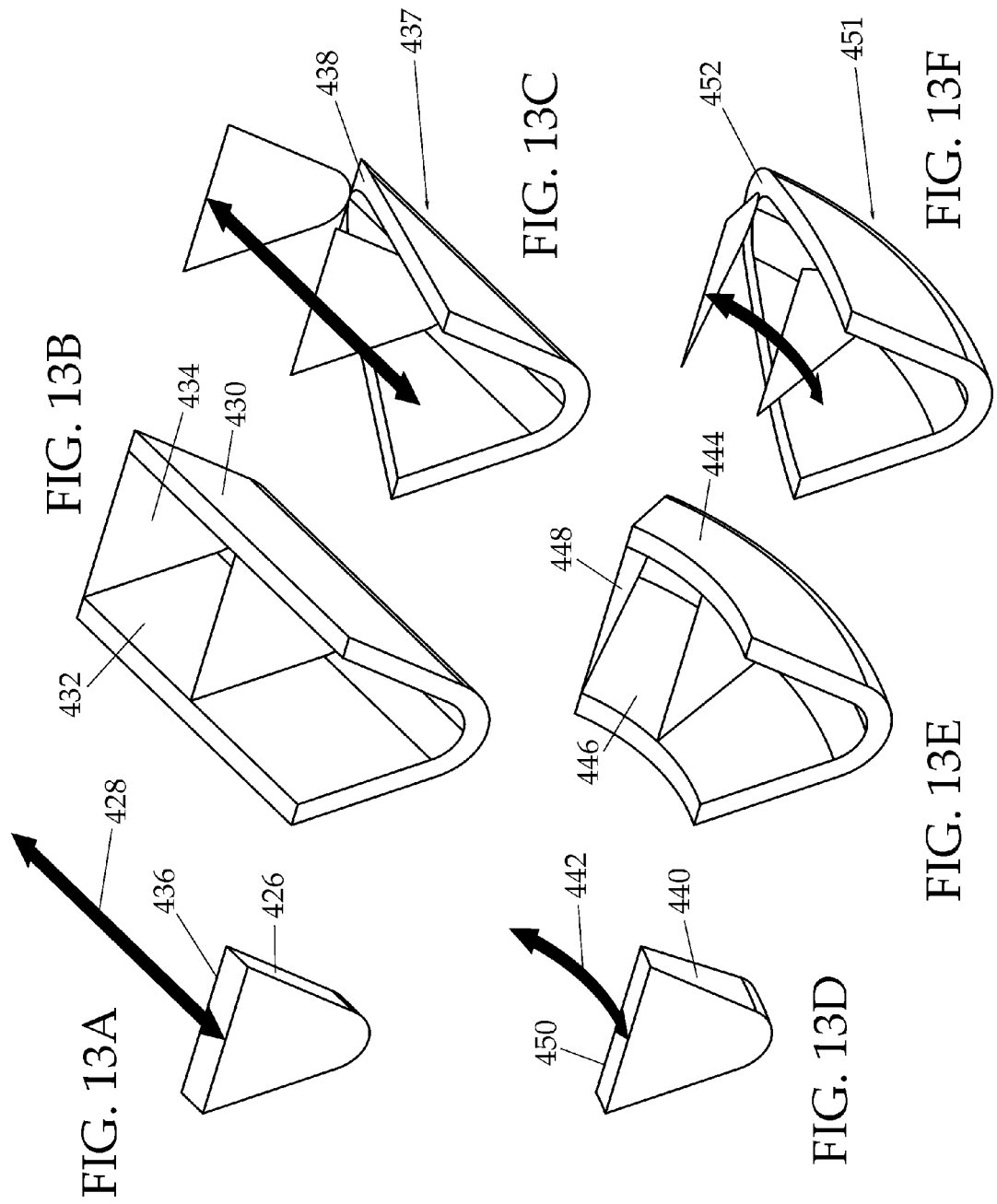

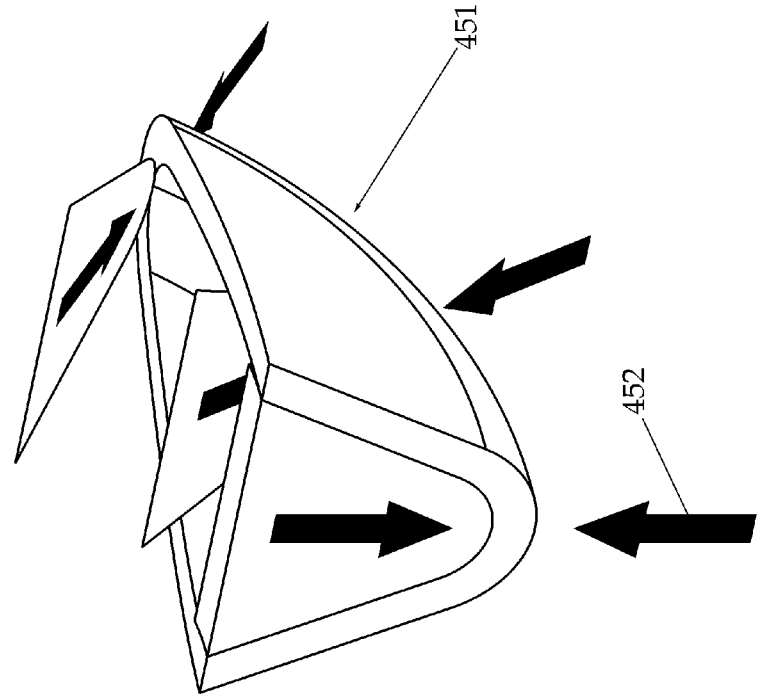
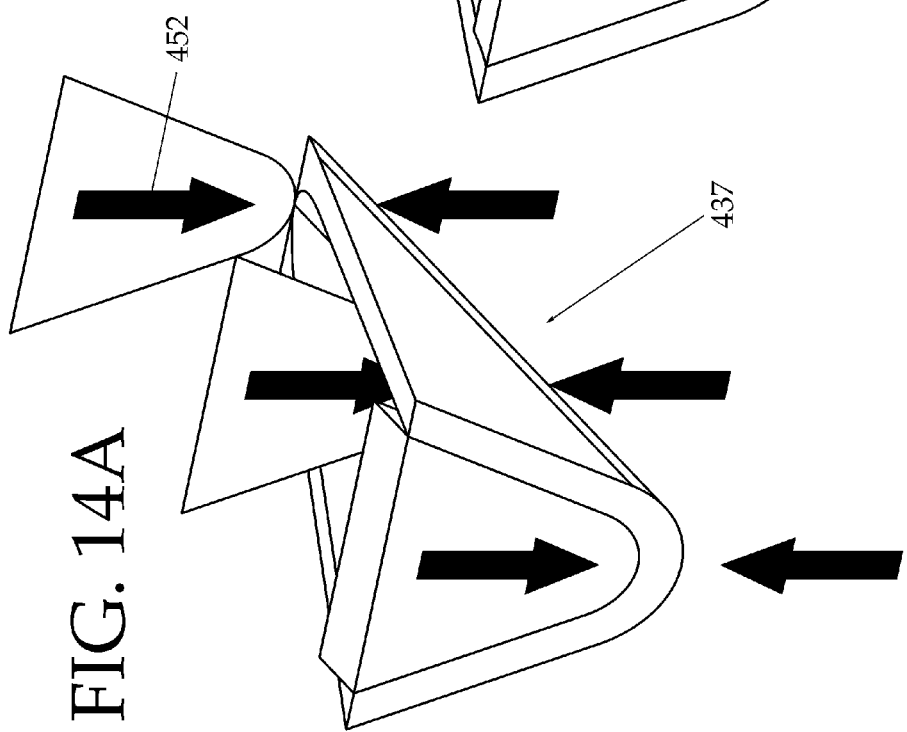

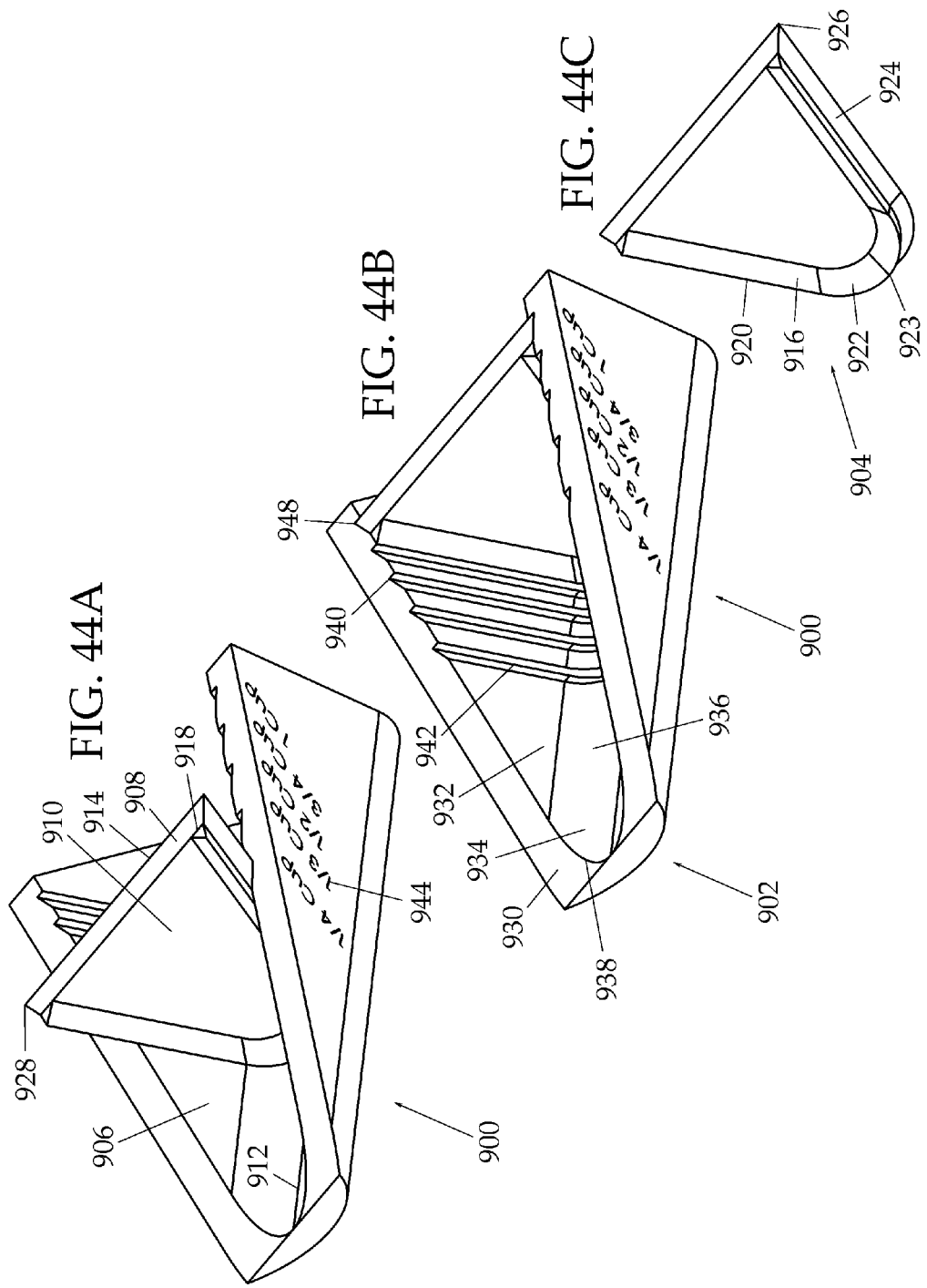

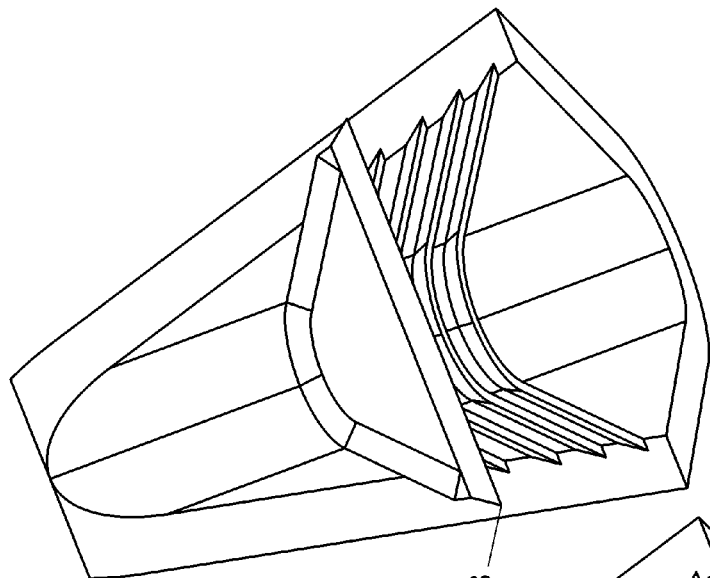
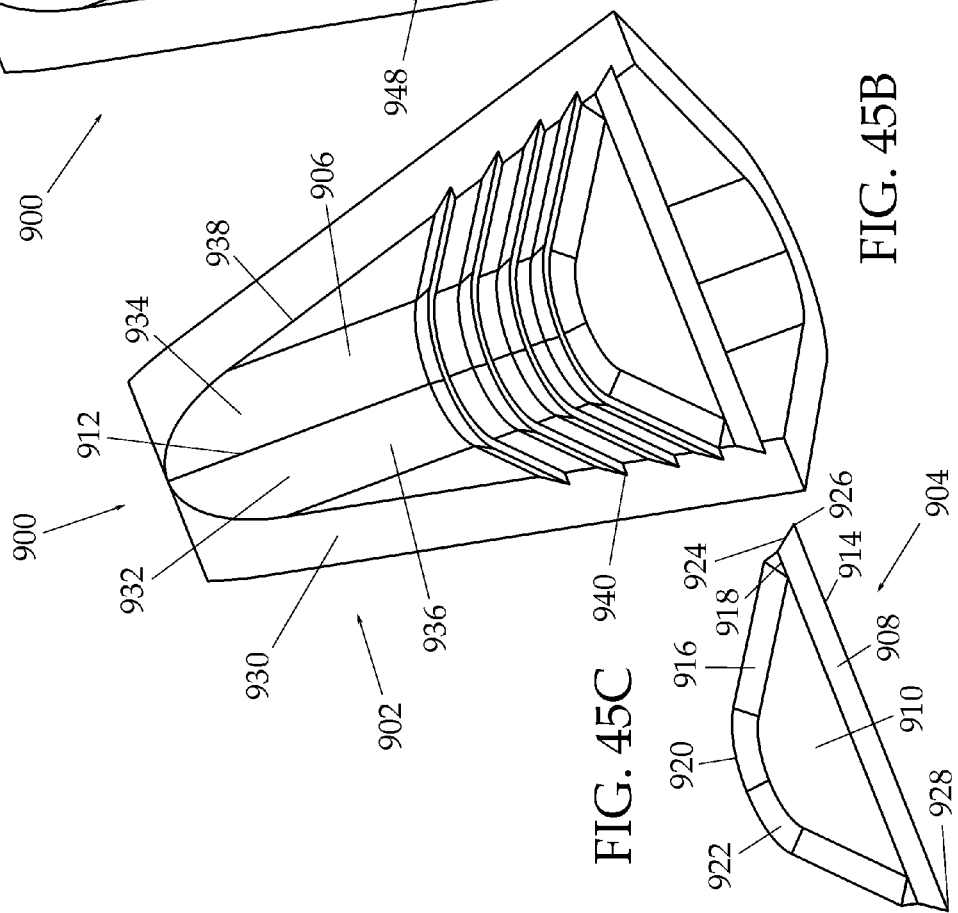

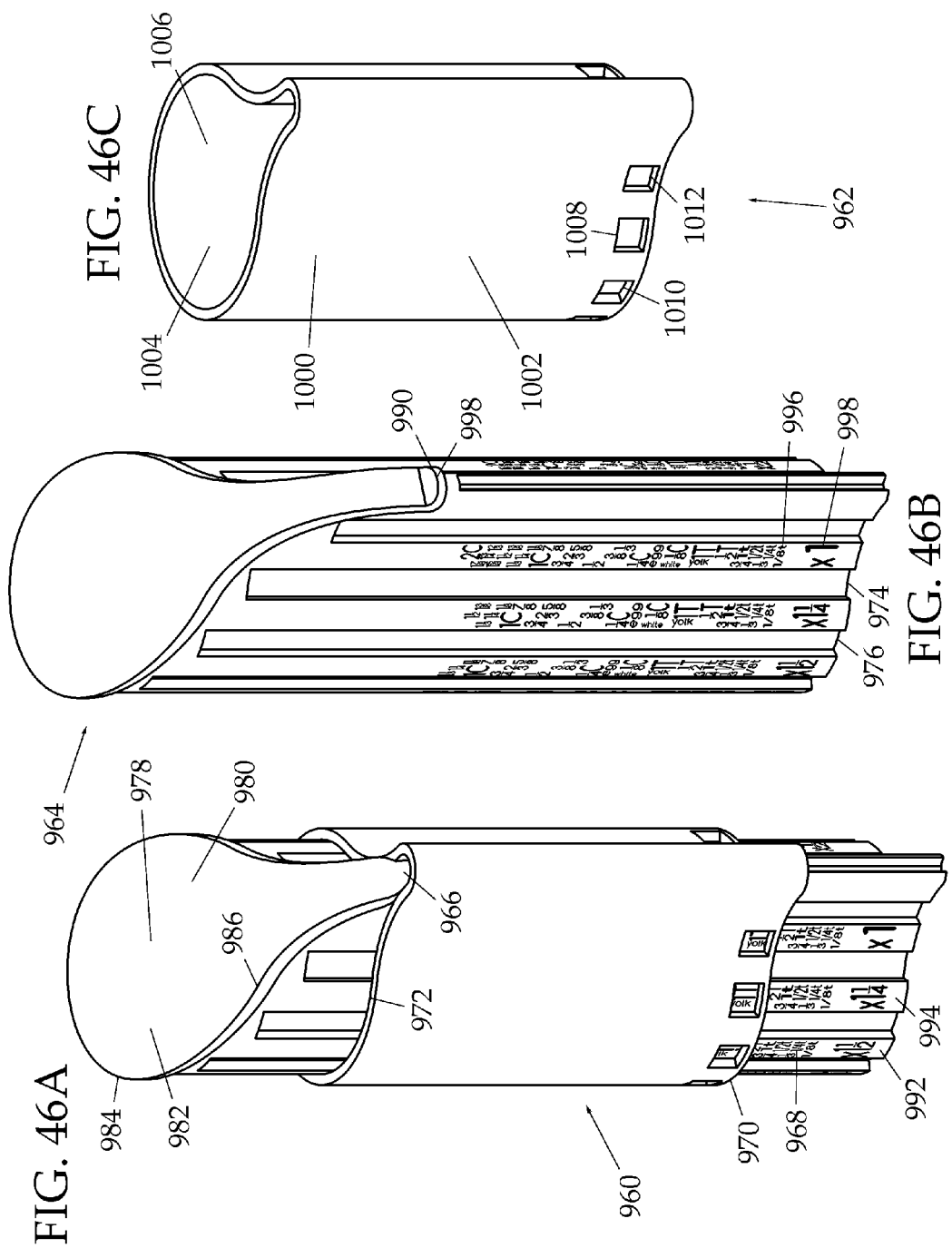

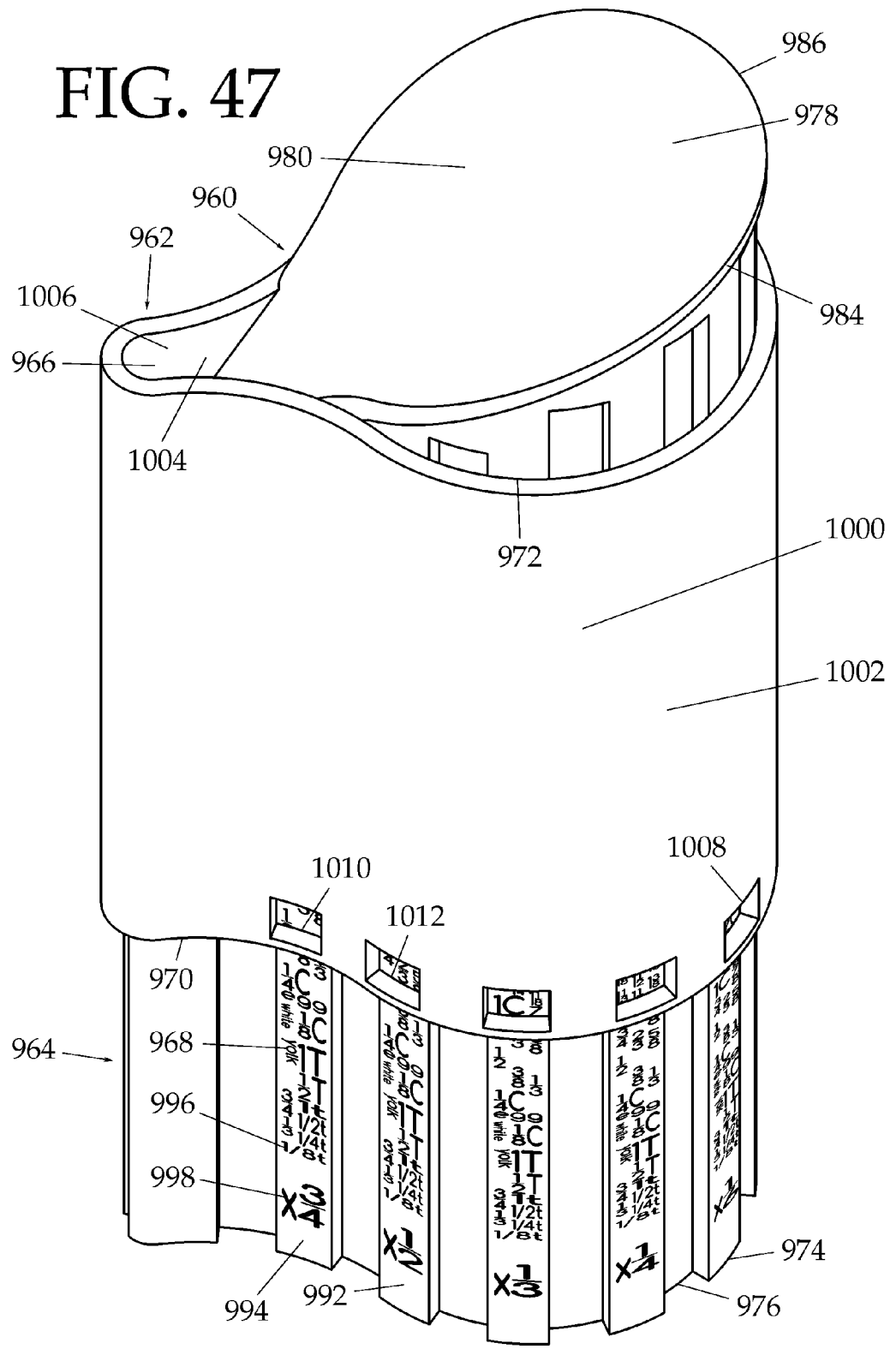

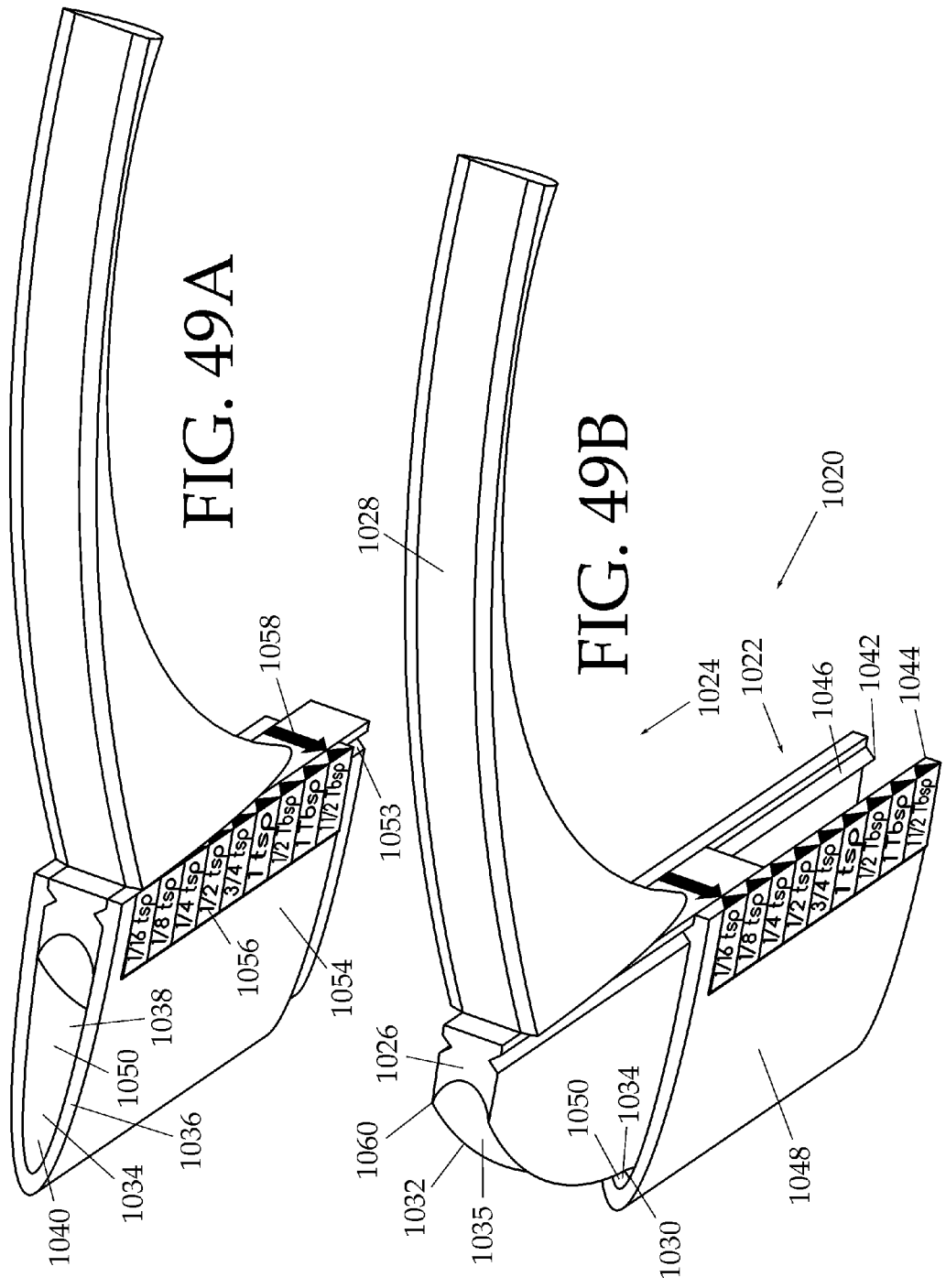

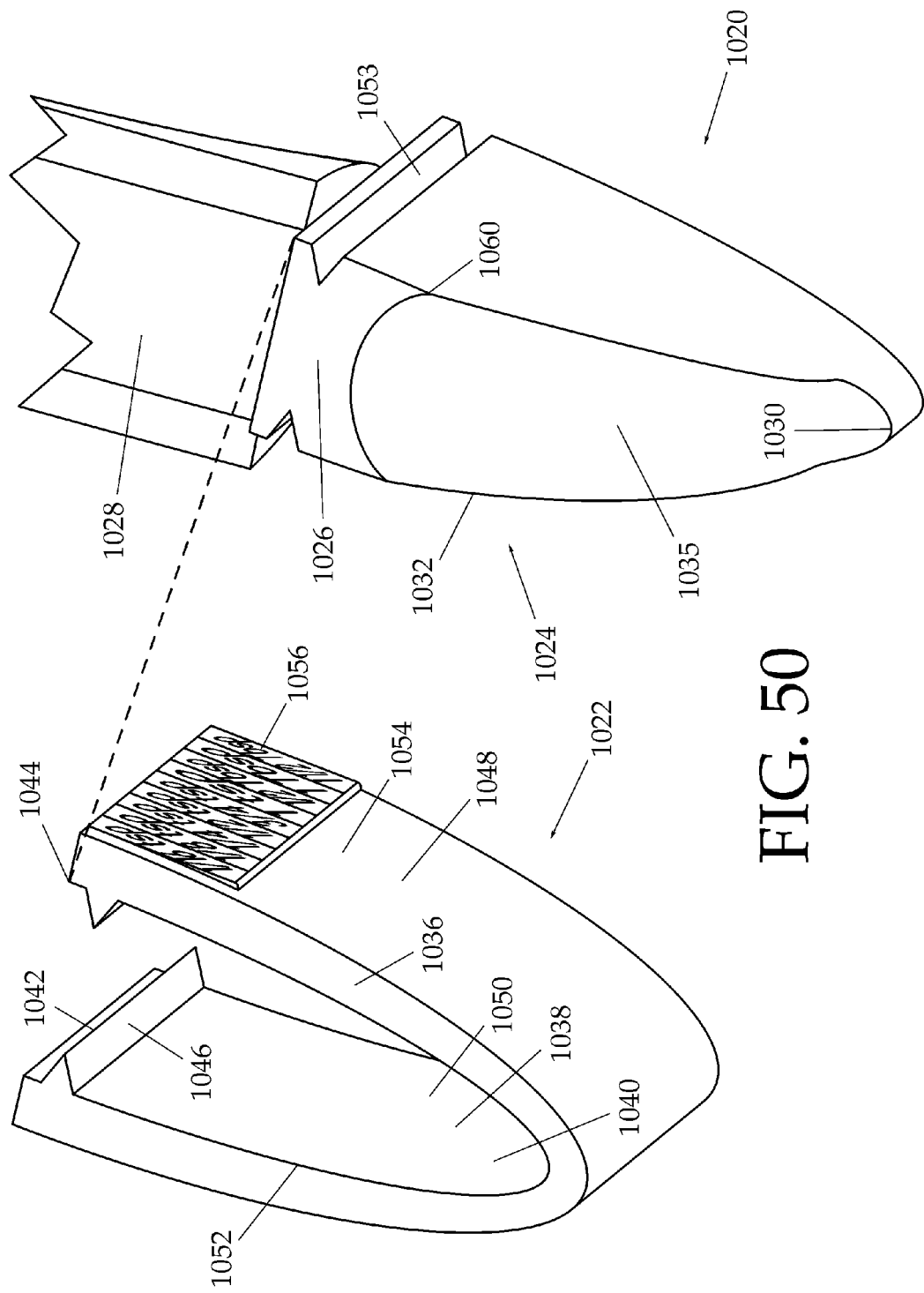

ADJUSTABLE VOLUMETRIC MEASURING UTENSIL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

This invention relates to the field of adjustable volumetric measuring utensils.

BACKGROUND OF THE INVENTION

Adjustable volumetric measuring utensils, principally in the form of measuring spoons having a back wall that can be moved to various locations along a channel of uniform cross-sectional profile and cylindrical measuring cups having a tight fitting, vertically adjustable floor are well known, but all have significant drawbacks. Chief among these is a severe practical limitation on the range of measurements a given utensil can accurately make. Often a recipe will call for two or more cups of a main ingredient such as flour or sugar and an eighth of a teaspoon of salt or a potent spice, amounts differing in volume, in this instance, by a factor of seven hundred and sixty-eight. If one wished to extend the functionality of an adjustable measuring spoon of known type that was originally designed to hold, at its lowest setting, an eighth of a teaspoon in a channel-shaped bowl an eighth of an inch long—by expanding its length so that it could also measure two cups—the bowl at its maximum setting would need to be eight feet long! On the other hand, even a very tall and narrow, one and three-quarter inch diameter, cylindrical adjustable measuring cup, one capable of measuring two cups at an overly generous depth of twelve inches, would require, for measuring an eighth of a teaspoon, that the height of the cylinder, from floor to rim, be reduced to one sixty-fourth of an inch, roughly the thickness of a playing card.

In both of their generic forms, known adjustable volumetric measuring utensils have intractable inherent limitations stemming from the mathematical fact that a series of enlargements or fractional reductions made to only one dimension of a three-dimensional object such as a measuring vessel radically changes its overall shape: either from too thin and wide to too long and narrow, in the first instance, or from too tall and thin to too short and squat, in the second. The accuracy of measurement attainable with such a utensil also suffers greatly at the thin or squat end of the scale. A playing-card's-thickness difference, more or less, in a twelve inch tall, two cup measurement of flour would hardly be noticeable in a recipe. That same playing-card's-thickness difference, however, would represent a doubling of the amount of salt, from one eighth of a teaspoon to one fourth of a teaspoon, enough to ruin the recipe.

U.S. Pat. No. 6,125,699 to Molenaar discloses an adjustable measuring spoon having a swinging or pivoting gate (23) that can be pivoted about a pivot (51) to five different positions to adjust the size of the measuring bowl for fractional measurements of a teaspoon up to a tablespoon. U.S. Pat. No. 7,503,212 to Dalla Piazza et al. discloses an adjustable measuring scoop (1) having a movable partition (21) rotatably connected to a handle insert (32) on an axle (22) so that the partition (21) can be moved upwardly toward or downwardly away from the opening of the bucket (2) of the scoop (1).

Whereas in both of the previously mentioned generic forms, where a linear change in the position of the adjustable back wall or floor was directly proportional to a change in volume, in both of these referenced patents it is the angular displacement of the gate (23) or partition (21) that is directly proportional to the change in volume. The aforementioned problems remain unsolved by these innovations.

These and all other referenced patents and applications are incorporated herein by reference in their entirety. Furthermore, where a definition or use of a term in a reference that is incorporated by reference herein is inconsistent or contrary to the definition of that term provided herein, the definition of that term provided herein applies and the definition of that term in the reference does not apply.

U.S. Pat. No. 3,530,722 to Miller et al. discloses a recipe measuring utensil in which a reciprocally adjusted scale is employed that allows a cook to prepare a larger or smaller yield of baked goods or more or fewer servings of a dish than indicated in a recipe without having to consult a conversion chart or calculate adjusted fractional measurements. Putting this clever idea into practice, however, would require providing a serviceable range of perhaps a half dozen or more conversion factors—from the doubling of the yield of a recipe to the fractional reduction to a single serving of a recipe originally intended to serve six. This would involve providing either a multitude of individual measuring cups arranged in color-coded sets; a single clear glass cup covered in an illegible jumble of diminishingly small measuring scales; a large number of adjustable measuring cups and spoons or some combination thereof. The range-of-measurement problem has now been vastly compounded, even if one reduces the range to an upper limit of one cup. The range of volumes required to provide a complete set of measuring vessels has increased sixfold: with volumes ranging from one forty-eighth of a teaspoon to two cups. The largest measured volume is now four thousand six hundred and eight times greater than the smallest.

The foundational axioms of solid geometry seem to have stymied whatever efforts there may have been to solve the persistent problem of how to expand the functional range and accuracy of an adjustable volumetric measuring utensil. The problem has been addressed in part by providing a set of multiple utensils for measuring subsets of ingredients, segregated by relative volume and type, including providing separate measuring cups and spoons for liquid ingredients and for dry ingredients. As anyone who has shared a kitchen with another cook can attest, crucial members of such sets tend to get separated and mislaid, often for years at a time.

Thus, there remains a considerable need for devices and methods that can provide improvements in some aspects of the range, accuracy, multiplicity of function, and ease-of-use of adjustable volumetric measuring utensils.

BRIEF SUMMARY OF THE INVENTION

The present invention is directed to adjustable volumetric measuring utensils having an adjustable inner member including a repositionable dam member and an outer member including a fixed wall having an incurvate interior surface forming a non-horizontally oriented channel, such that the interior surface of the channel mates with the dam member at a plurality of locations to form a measuring chamber of variable volume, the channel having a full measure indicator defining a horizontal upper boundary plane delimiting from above the measuring chamber of variable volume and defining the correct positioning of the horizontal upper surface of a measured material, whereby the dam member can be positioned partly above and partly below the horizontal upper boundary plane and whereby a variable portion of the upstream face of the dam member is in contact with the measured material, depending on its positioning, the utensil including a series of volumetric measuring indicia.

Among the many different possibilities contemplated, the dam member may advantageously be pivotally coupled to a support member whereby a radial force clamps the flexible peripheral sealing member of the dam member securely into a curved open channel to make a watertight measuring assembly. It is further contemplated that the dam member may be more fully enclosed or even completely encircled by a tubular, preferentially vertical housing, with the flexible peripheral sealing member of the dam member providing the clamping force to make the assembly watertight. It is further contemplated that the outer member may be an elongated, obliquely oriented channel along which the dam member can move in a linear or curved trajectory when repositioned and then can firmly be held in place by clamping means. It is further contemplated that the side surface of the dam member may have a prominent surface feature such as a protuberance or indentation mating with an indentation or protuberance upon the incurvate interior surface so that the dam member seats positively at the correct locations. It is further contemplated that a more prominent protrusion on the dam member may include a large enough portion of its downstream face that the dam member locks in place due to the force of gravity and the downstream force exerted by the measured quantity of material acting upon the dam member, requiring no additional clamping means. It is further contemplated that the inner and outer members may be clamped together by the gripping force of the hand of the user, guided into place by the mating shapes of the two members. It is further contemplated that the utensil may have at least a second series of volumetric measuring indicia for adjusting the yield of a recipe, the indicia being of a selected ratio to but indicating a volume different from the actual volume of the measured quantity. It is further contemplated that the utensil may include indicia indicating the volume of a standard size egg, egg white, and egg yolk. It is further contemplated that the utensil may include a second full measure indicator located beneath the horizontal upper edge for the measurement of spillable liquids. It is further contemplated that the utensil may be made suitable for pedagogical purposes and for classroom use, to demonstrate principles of solid geometry including the effect on volume of simultaneous changes in multiple linear dimensions.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING

The novel features believed to be characteristic of the present invention are set forth with particularity in the appended claims. The invention itself may best be understood by reference to the following description taken in connection with the accompanying drawing in which:

FIGS. 12A-B are semi-schematic upper right front perspective views of alternative positionings of a series of indicia according to an aspect of the inventive subject matter.

FIGS. 13A-F are semi-schematic upper right front perspective views of the positionings and trajectories of the dam member relative to the outer member according to an aspect of the inventive subject matter.

FIGS. 14A-B are semi-schematic upper right front perspective views of the direction of application of the clamping force according to an aspect of the inventive subject matter.

FIGS. 44A-C are upper back left perspective views of another adjustable measuring assembly according to an aspect of the inventive subject matter.

FIGS. 45A-C are upper front perspective views of the embodiment of FIGS. 44A-C.

FIGS. 46A-C are upper back right perspective views of another adjustable measuring assembly according to an aspect of the inventive subject matter.

FIG. 47 is an upper back left perspective view of the embodiment of FIGS. 46A-C.

FIGS. 49A-B are upper front left perspective views of another adjustable measuring assembly according to an aspect of the inventive subject matter.

FIG. 50 is an upper back left exploded perspective view of the embodiment of FIGS. 49A-B.

SUMMARY OF THE INVENTION

Figure 1:
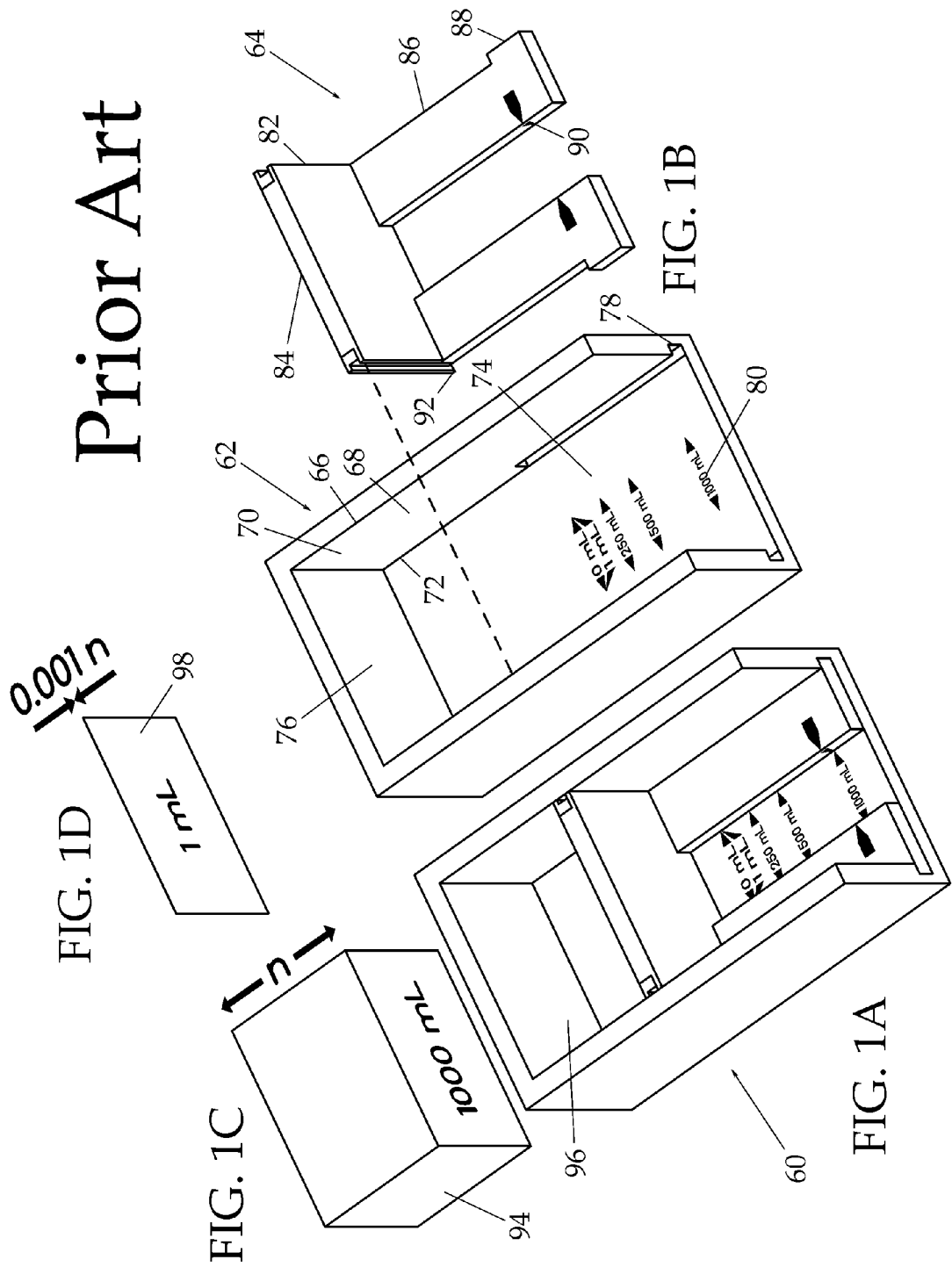
FIGS. 1A-D are semi-schematic upper left front perspective views of a prior art adjustable volumetric measuring utensil.
Figure 2:
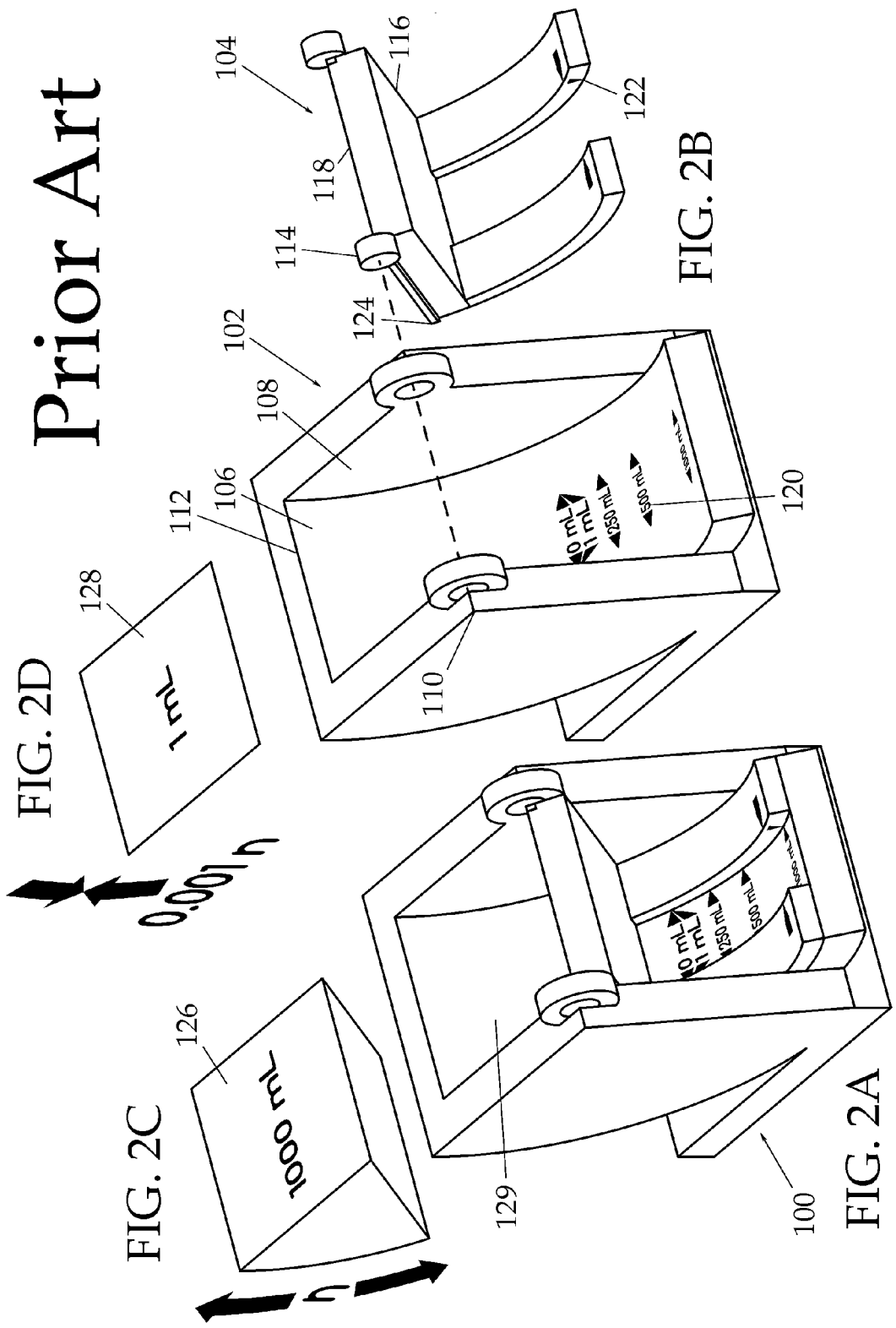
FIGS. 2A-D are semi-schematic upper left front perspective views of another prior art adjustable volumetric measuring utensil.
Figure 3:
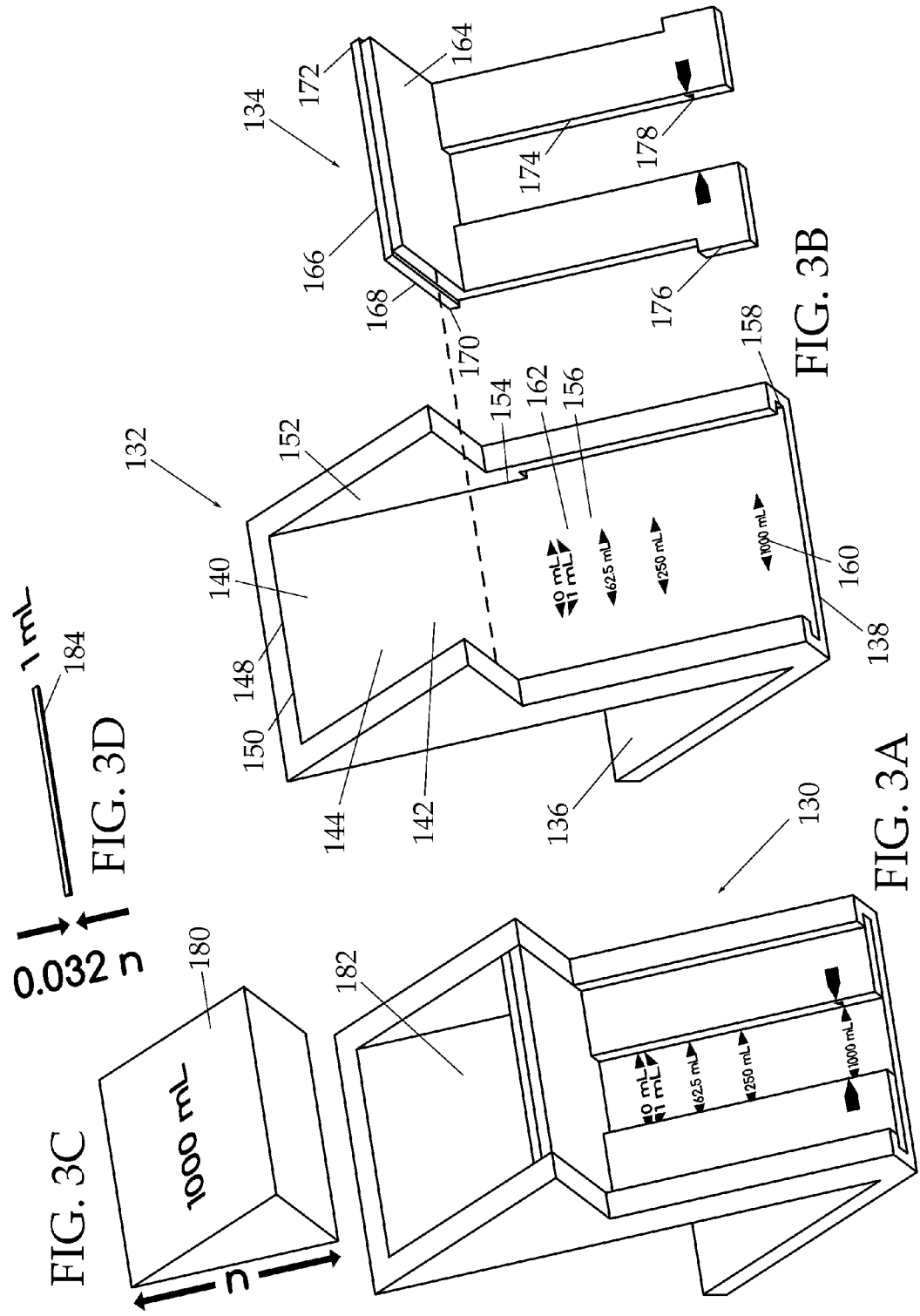
FIGS. 3A-D are semi-schematic upper left front perspective views of an adjustable measuring assembly according to an aspect of the inventive subject matter.
Figure 4:
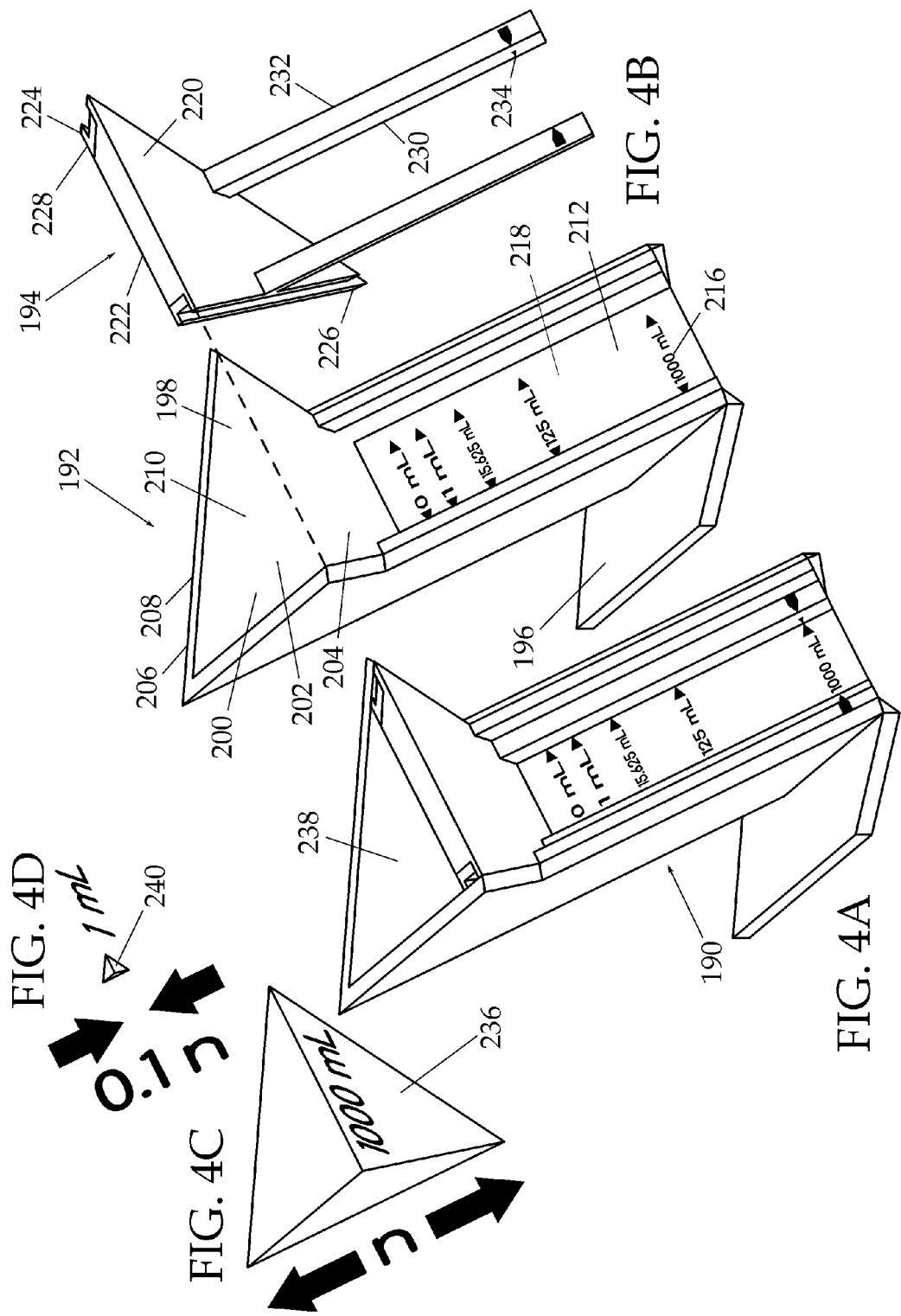
FIGS. 4A-D are semi-schematic upper left front perspective views of another adjustable measuring assembly according to an aspect of the inventive subject matter.

The present invention is directed to adjustable volumetric measuring utensils having a repositionable dam member and an outer member having a non-horizontally oriented incurvate interior surface that mates with the dam member, so that the dam member can be positioned partly above and partly below a horizontal plane defining the upper surface of a measured material, whereby a variable portion of the upstream face of the dam member is in contact with the measured material, depending on its positioning, the utensil including a series of volumetric measuring indicia.

Among the many different possibilities contemplated, the dam member may advantageously be pivotally coupled to a support member whereby a radial force clamps the flexible peripheral sealing member of the dam member securely into a curved open channel to make a watertight measuring assembly. It is further contemplated that the dam member may be more fully enclosed or even completely encircled by a tubular, preferentially vertical housing, with the flexible peripheral sealing member of the dam member providing the clamping force to make the assembly watertight. It is further contemplated that the outer member may be an elongated, obliquely oriented channel along which the dam member can move in a linear or curved trajectory when repositioned and then can firmly be held in place by clamping means. It is further contemplated that the side surface of the dam member may have a prominent surface feature such as a protuberance or indentation mating with an indentation or protuberance upon the incurvate interior surface so that the dam member seats positively at the correct locations. It is further contemplated that a more prominent protrusion on the dam member may include a large enough portion of its downstream face that the dam member locks in place due to the force of gravity and the downstream force exerted by the measured quantity of material acting upon the dam member, requiring no additional clamping means. It is further contemplated that the inner and outer members may be clamped together by the gripping force of the hand of the user, guided into place by the mating shapes of the two members. It is further contemplated that the utensil may have at least a second series of volumetric measuring indicia for adjusting the yield of a recipe, the indicia being of a selected ratio to but indicating a volume different from the actual volume of the measured quantity. It is further contemplated that the utensil may include indicia indicating the volume of a standard size egg, egg white, and egg yolk. It is further contemplated that the utensil may include a second full measure indicator located beneath the horizontal upper edge for the measurement of spillable liquids. It is further contemplated that the utensil may be made suitable for pedagogical purposes and for classroom use, to demonstrate principles of solid geometry including the effect on volume of simultaneous changes in multiple linear dimensions.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

The present invention will now be described more fully hereinafter with reference to the accompanying drawing, in which several preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art.

FIGS. 1A-D and FIGS. 2A-D show semi-schematics of two generic prior art adjustable volumetric measuring utensils. The prior art is shown to provide a better basis for understanding some of the improvements provided by aspects of the inventive subject matter. FIG. 1A shows an adjustable measuring assembly 60 comprising an outer member 62 and an adjustable inner member 64. FIG. 1B shows the outer member 62 and the adjustable inner member 64 disassembled. The outer member 62 has a channel 66 with an interior surface 68, the channel 66 being of uniform cross-sectional profile, having two inside lateral surfaces 70 with bottom edges 72 and a front portion 74. The channel 66 is closed rearwardly by a back wall 76. The outer member 62 has two horizontal grooves 78 along the bottom edges 72 of the inside lateral surfaces 70 of the front portion 74 of the channel 66 and a series of volumetric measuring indicia 80 imprinted on the interior surface 68 of the channel 66. The adjustable inner member 64 has a repositionable dam member 82 having an upstream face 84 and having a cross-sectional profile mating with the interior surface 68 of the channel 66 and two horizontally slidable attachment members 86 having lateral projections 88 slidably fitting into the grooves 78 and an indicium indicator 90 imprinted upon the slidable attachment members 86 that can be slid into alignment with any one of the indicia 80. Also shown is a reference point of greatest depth 92 which in this prior art example is invariable, as there is no change in depth for the repositionable dam member. The reference point of greatest depth will be more fully defined, as the term appears in the appended claims, in the description of FIGS. 3A-D, below.

FIG. 1C shows a semi-schematic visualization of the shape of a volume of measured material 94 as it would appear if removed from a measuring chamber of variable volume 96 located between the upstream face 84 of the repositionable dam member 82 and the back wall 76 and further confined by the interior surface 68 of the channel 66. The semi-schematic represents a 1 L (1000 mL) volume of measured material 92 having a length (or thickness) n. FIG. 1D shows a semi-schematic visualization of the shape of a volume of a measured material 98 representing 1 mL and having a thickness 0.001n.

FIG. 2A shows an adjustable measuring assembly 100 comprising an outer member 102 and an adjustable inner member 104. FIG. 2B shows the outer member 102 and adjustable inner member 104 disassembled. The outer member 102 has a curved channel 106 with an interior surface 108, the channel 106 being of uniform cross-sectional profile normal to a circular arc centered at a swinging axis 110, the channel 106 terminating at the upper edge 112 of the curved channel 106. The adjustable inner member 104 is pivotally coupled to the outer member with a pivot joint 114. The adjustable inner member 104 has a repositionable dam member 116 having an upstream face 118 and having a cross-sectional profile mating with the interior surface 108 of the curved channel 106. Also shown are measurement indicia 120 imprinted upon the interior surface 108 of the channel 106, an indicium indicator 122 imprinted upon the adjustable inner member 104, and a reference point of greatest depth 124.

FIGS. 2C-D show semi-schematic visualizations of the shapes of two volumes of measured material 126, 128 as they would appear if removed from a measuring chamber of variable volume 129 located behind and above the upstream face 118 of the dam member 116 and below the upper edge 112 of the curved channel 106, representing 1000 mL and 1 mL respectively, having angular dimensions of n and 0.001n respectively.

Referring now to aspects of the invention in more detail, FIGS. 3A-D and FIGS. 4A-D show semi-schematics of adjustable volumetric measuring utensils according to an aspect of the inventive subject matter that are particularly suitable for pedagogical purposes and for classroom use, in order to demonstrate principles of solid geometry including the effect on volume of simultaneous changes in two linear dimensions and three linear dimensions, respectively.

FIG. 3A shows an adjustable measuring assembly 130 comprising and outer member 132 and an adjustable inner member 134. FIG. 3B shows the outer member 132 and the adjustable inner member 134 disassembled. The outer member 132 has a rectangular base 136 integrally attached at the forward edge 138 to an obliquely oriented channel wall 140 that defines an interior space 142 and has an incurvate interior surface 144 forming an obliquely oriented channel 146 having a uniform rectangular cross-sectional profile that is progressively truncated toward the horizontal upper edge 148 of the interior surface 144. The horizontal upper edge 148 of the interior surface 144 in this embodiment of the invention is the full measure indicator 150, defining a horizontal upper boundary plane that must match the horizontal upper surface of the measured material (not shown) to effect an accurate measurement. The obliquely oriented channel 146 has two inside lateral surfaces 152 with bottom edges 154 and a front portion 156. Two obliquely oriented grooves 158 run along the bottom edges 154 of the two inside lateral surfaces 152 of the front half 156 of the channel 146 and a series of volumetric measuring indicia 160 imprinted upon the floor 162 of the front portion 156 of the channel 146. The adjustable inner member 134 has a repositionable dam member 164 with an upstream face 166 with a peripheral leading edge 168 having and a reference point of greatest depth 170.

The term "reference point of greatest depth" appears frequently in the specification, as it is used in the appended claims to more clearly point out aspects of the inventive subject matter. The term "reference point of greatest depth" is herein defined throughout the specification as the point along the length of the peripheral leading edge of the upstream face of the repositionable dam member that is farthest beneath the horizontal upper boundary plane as defined by the full measure indicator. Depending upon the presence and shape of a peripheral sealing member, the reference point of greatest depth will always be close to but may not coincide precisely with the deepest point of the measuring chamber of variable volume.

The dam member 164 has a peripheral sealing member 172 that is made of a flexible, waterproof material and includes the peripheral leading edge 168 of the upstream face 166 of the dam member 164. The dam member 164 has a flexed cross-sectional profile mating with the interior surface 144 of the channel 146. The adjustable inner member 134 has two obliquely slidable attachment members 174 having lateral projections 176 slidably fitting into the grooves 156 and an indicium indicator 178 imprinted upon the slidable attachment members 174 that can be slid into alignment with any one of the indicia 160.

FIG. 3C shows a semi-schematic visualization of the shape of a volume of measured material 180 as it would appear if removed from a measuring chamber of variable volume 182 having a boundary defined by the portion of the upstream face of the repositionable dam member that is located below the horizontal upper edge 148 of the interior surface 144 and the portion of the interior surface 144 of the channel 146 located above and forward of the upstream face 166 of the dam member 164. The measuring chamber of variable volume 182 is bounded above by the horizontal upper boundary plane. The semi-schematic represents a 1 L (1000 mL) volume of measured material 180 in the shape of a triangular prism having a length dimension n in the direction of movement of the dam member.

FIG. 3D shows a semi-schematic visualization of the shape of a volume of a measured material 184 representing 1 mL, in which the length dimension has only decreased to 0.032n, representing a substantial improvement in this regard over the thousandfold decrease shown in the prior art semi-schematic of FIGS. 2A-D. In this embodiment, it is only the height dimension and the length dimension that change with each repositioning of the dam member 164. The width dimension remains constant.

FIG. 4A shows an adjustable measuring assembly 190, comprising an outer member 192 and an adjustable inner member 194. FIG. 4B shows the outer member 192 and adjustable inner member 194 disassembled. The outer member 192 has a generally pentagonal base 196 integrally attached to an obliquely oriented channel wall 198 that defines an interior space 200 and has an incurvate interior surface 202 forming an obliquely oriented channel 204 having a uniform, sharp angled straight-edged-V-shaped cross-sectional profile that is progressively truncated toward the horizontal upper edge 206 of the interior surface 202. The horizontal upper edge 206 of the interior surface 202 in this embodiment of the invention is the full measure indicator 208, defining a horizontal upper boundary plane that must match the horizontal upper surface of the measured material (not shown) to effect an accurate measurement. The obliquely oriented channel 204 has two inside lateral surfaces 210 and a front portion 212. The outer member has two obliquely oriented grooves 214 running parallel to the channel 204 along the two inside lateral surfaces 210 of the front portion 212 of the channel 204 and a series of volumetric measuring indicia 216 imprinted upon an obliquely oriented rectangular surface 218 within the front half 210 of the channel 204. The adjustable inner member 194 has a repositionable dam member 220 with an upstream face 222 with a peripheral leading edge 224 having a reference point of greatest depth 226, the dam member 220 also having a peripheral sealing member 228 that is made of a flexible, waterproof material and includes the peripheral leading edge 224 of the upstream face 222 of the dam member 220. The dam member 220 has a flexed cross-sectional profile mating with the interior surface 202 of the channel 204. The adjustable inner member 194 has two obliquely slidable attachment members 230 having lateral projections 232 slidably fitting into the grooves 214 and an indicium indicator 234 imprinted upon the slidable attachment members 230 that can be slid into alignment with any one of the indicia 216.

FIG. 4C shows a semi-schematic visualization of the shape of a volume of measured material 236 as it would appear if removed from a measuring chamber of variable volume 238 having a boundary defined by the portion of the upstream face 222 of the repositionable dam member 220 that is located below the horizontal upper edge 206 of the interior surface 202 and the portion of the interior surface 202 of the channel 204 located above and forward of the upstream face 222 of the dam member 220. The measuring chamber of variable volume 238 is bounded above by the horizontal upper boundary plane. The semi-schematic represents a 1 L (1000 mL) volume of measured material 236 in the shape of a tetrahedron having a length dimension n in the direction of movement of the dam member 220.

FIG. 4D shows a semi-schematic visualization of the shape of a volume of measured material 240 representing 1 mL, in which the length dimension has only decreased to 0.1n, representing a vast improvement in this regard over the thousandfold decrease shown in the prior art semi-schematic of FIGS. 1A-D. In this embodiment, all three of the orthogonal dimensions of height, length, and width change with each repositioning of the dam member 220. Furthermore, all iterations of the measuring chamber are mathematically similar to one another—all are similar tetrahedrons but at different scales, all having identical corresponding angle measurements and with all corresponding edge lengths being proportional.

A full-scale or larger-than-full-scale classroom demonstration set comprising three volumetric measuring utensils, including the prior art utensil of FIGS. 1A-D and the two embodiments according to an aspect of the inventive subject matter shown in FIGS. 3A-D and 4A-D, perhaps augmented by smaller-scale individual sets of student manipulatives, would reveal surprising mathematical facts and principles and provide the kinesthetic learners with an invaluable hands-on learning experience. Each of these three volumetric measuring utensils has a simplified linear scale comprising a series of five volumetric measuring indicia 80, 160, 216 corresponding to five positionings of the repositionable dam member 82, 164, 220 at five instructive locations along its linear trajectory, forming five volumetric measuring chambers 94, 124, 238, including: a rearmost zero positioning for which the volumetric measuring chamber 94, 124, 238 effectively disappears; a forwardmost positioning located a distance n from the zero positioning that forms a 1000 mL measuring chamber 94, 124, 238; a half-distance positioning located halfway between the zero positioning and the forwardmost positioning, and a quarter-distance positioning located at a distance 0.25n forward from the zero positioning. There is also a fifth positioning located at a variable distance forward from the zero positioning labeled 1 mL and corresponding to a 1 mL measuring chamber 94, 124, 238.

The prior art utensil of FIGS. 1A-D demonstrates to students that a change in a single orthogonal dimension (in this case a change in length) of the measuring chamber 94 results in a change in volume directly proportional to the change in the linear dimension. Reducing the length dimension by half reduces the original volume of 1000 mL to 500 mL and reducing the length dimension to a quarter of its original length reduces the volume to 250 mL. To produce a measuring chamber 94 having a 1 mL volume would require positioning the dam member 82 at a distance of a mere $\frac{1}{1000}$ n from the back wall 76, resulting in a uselessly proportioned, very deep and paper-thin measuring chamber 94.

The embodiment according to an aspect of the inventive subject matter shown in FIGS. 3A-D demonstrates to students that a simultaneous proportional fractional reduction by a given factor in two orthogonal dimensions (length and height) of the measuring chamber 124 results in a reduction in volume by a factor equal to the square of the fractional reduction factor of the linear dimensions. A half-distance positioning of the dam member 164 produces a measuring chamber 124 having a quarter of the original volume, or 250 mL, and a quarter-distance positioning of the dam member 164 produces a measuring chamber 124 having a volume equal to $\frac{1}{16}$ of the original volume, or 62.5 mL. To produce a measuring chamber 124 having a 1 mL volume would require positioning a reference point of greatest depth 170 on the peripheral leading edge 168 of the upstream face 166 of the dam member 164 at a location a distance equal to the square root of 0.001 times n (or approximately 0.032n) from the upper edge 148 of the interior surface 144 of the channel 146, measured along the trajectory of the dam member 164, resulting in a somewhat better proportioned, very long, but shallow, triangular-prism-shaped measuring chamber 124.

The embodiment according to an aspect of the inventive subject matter shown in FIGS. 4A-D demonstrates to students that a simultaneous proportional fractional reduction by a given factor in all three orthogonal dimensions (length, height, and width) of the measuring chamber 238 results in a fractional reduction in volume by a factor equal to the cube of the fractional reduction factor of the linear dimensions. A half-distance positioning of the dam member 220 produces a measuring chamber 238 having an eighth of the original volume, or 125 mL, and a quarter-distance positioning of the dam member 220 produces a measuring chamber 238 having a volume equal to 1/64 of the original volume, or 15.625 mL. To produce a measuring chamber 238 having a 1 mL volume would require positioning the reference point of greatest depth 226 at the vertex of the acute angle of the V-shaped upstream face 222 of the dam member 220 at a location a distance equal to the cube root of 0.001 times n (or a generous 0.1n) from the upper edge 206 of the interior surface 202 of the channel 204, measured along the trajectory of the dam member 220, resulting in a dramatically better proportioned measuring chamber 238—a small tetrahedron that is in fact identically proportioned to the largest, 1000 mL tetrahedronal measuring chamber 238, such that all edge lengths of all possible measuring chambers 238 have values confined within a single order of magnitude.

Referring now to aspects of the invention in more detail, FIGS. 5 through 8 shows an adjustable measuring assembly 250 according to an aspect of the inventive subject matter that, in addition to its direct practical application for food preparation, is also suitable for pedagogical purposes. Particularly in the context of home economics or culinary arts education, the measuring assembly 250 may be used to demonstrate practical methods according to aspects of the inventive subject matter for adjusting the yield of a recipe for baked goods or adjusting the number of servings in a recipe for a particular dish without having to resort to tedious mathematics requiring multiplication of fractional and mixed number measurements for each of a long list of individual ingredients by a fractional or mixed number recipe conversion factor.

Figure 5:
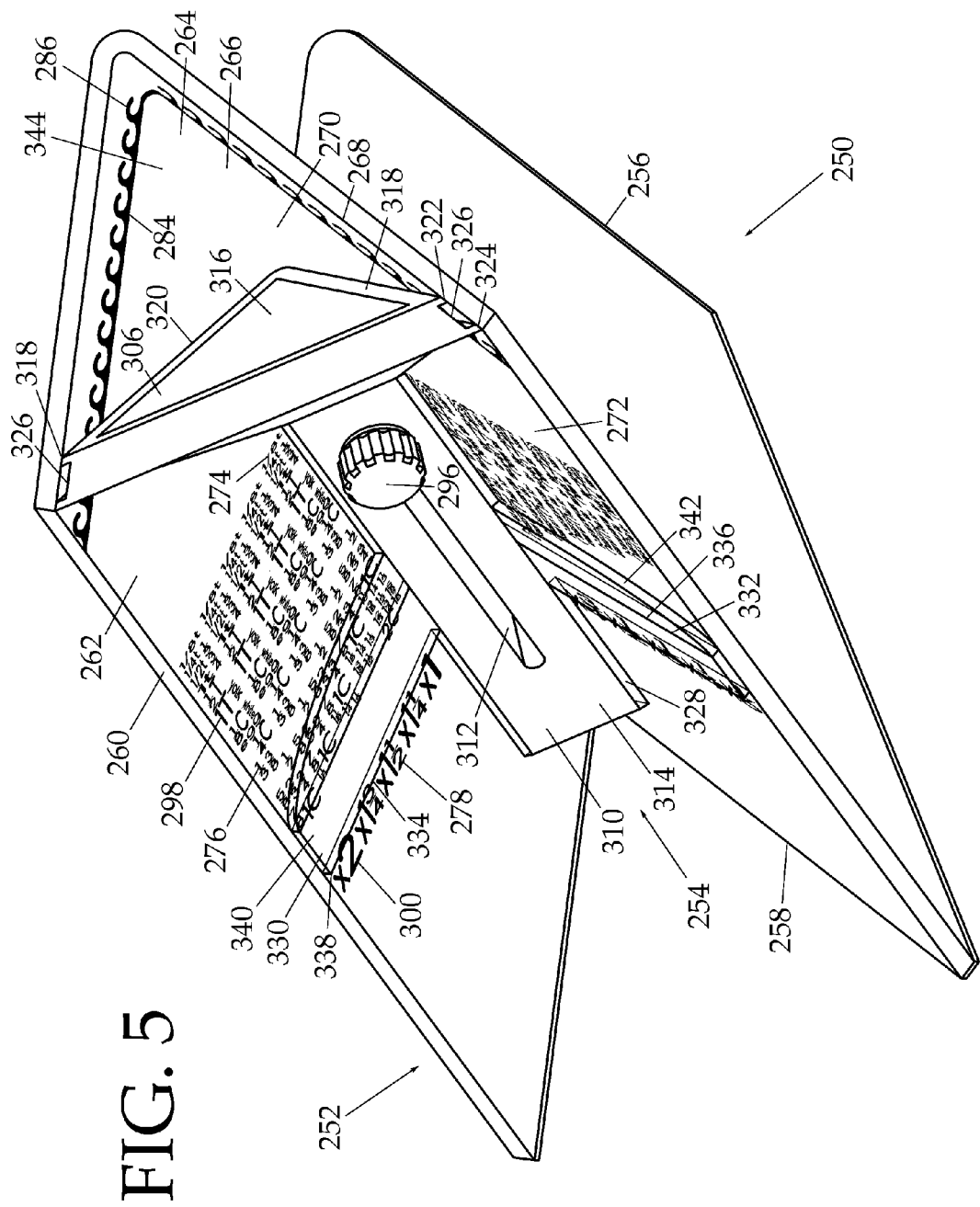
FIG. 5 is an upper front right perspective view of another adjustable measuring assembly according to an aspect of the inventive subject matter.
Figure 6:
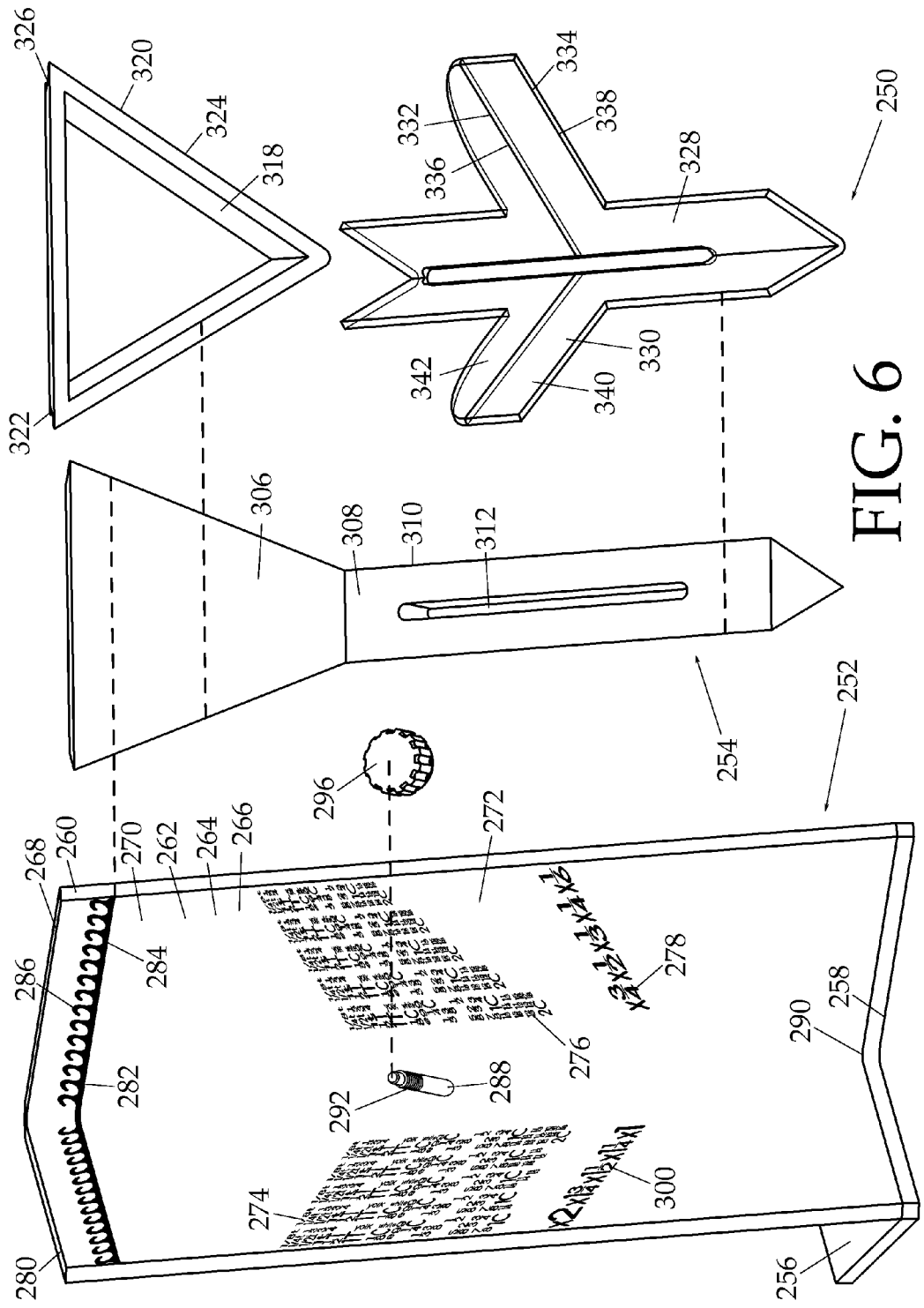
FIG. 6 is an upper front left exploded perspective view of the embodiment of FIG. 5.
Figure 7:
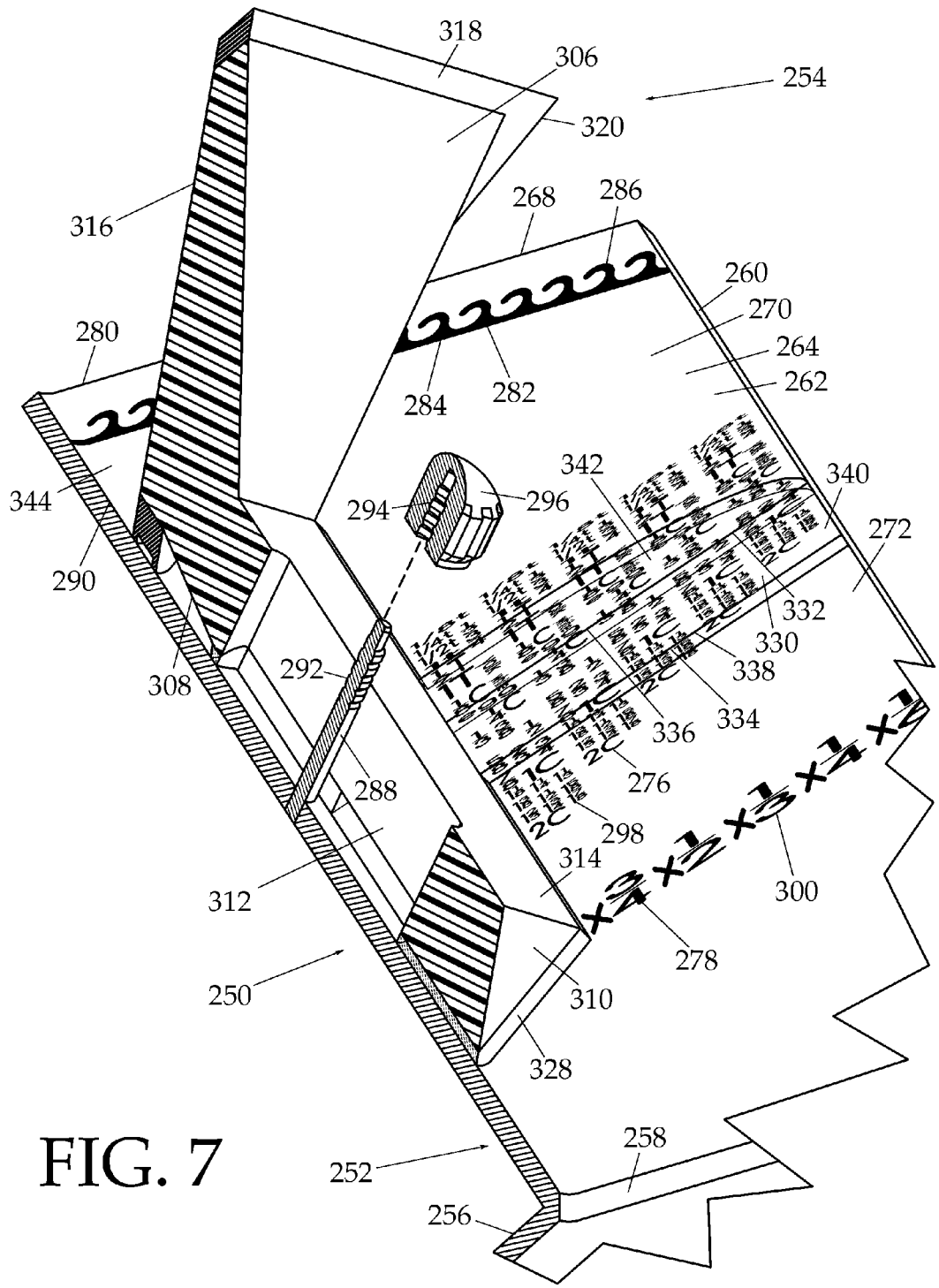
FIG. 7 is a lower front left cross-sectional perspective view of the embodiment of FIG. 5.
Figure 8:
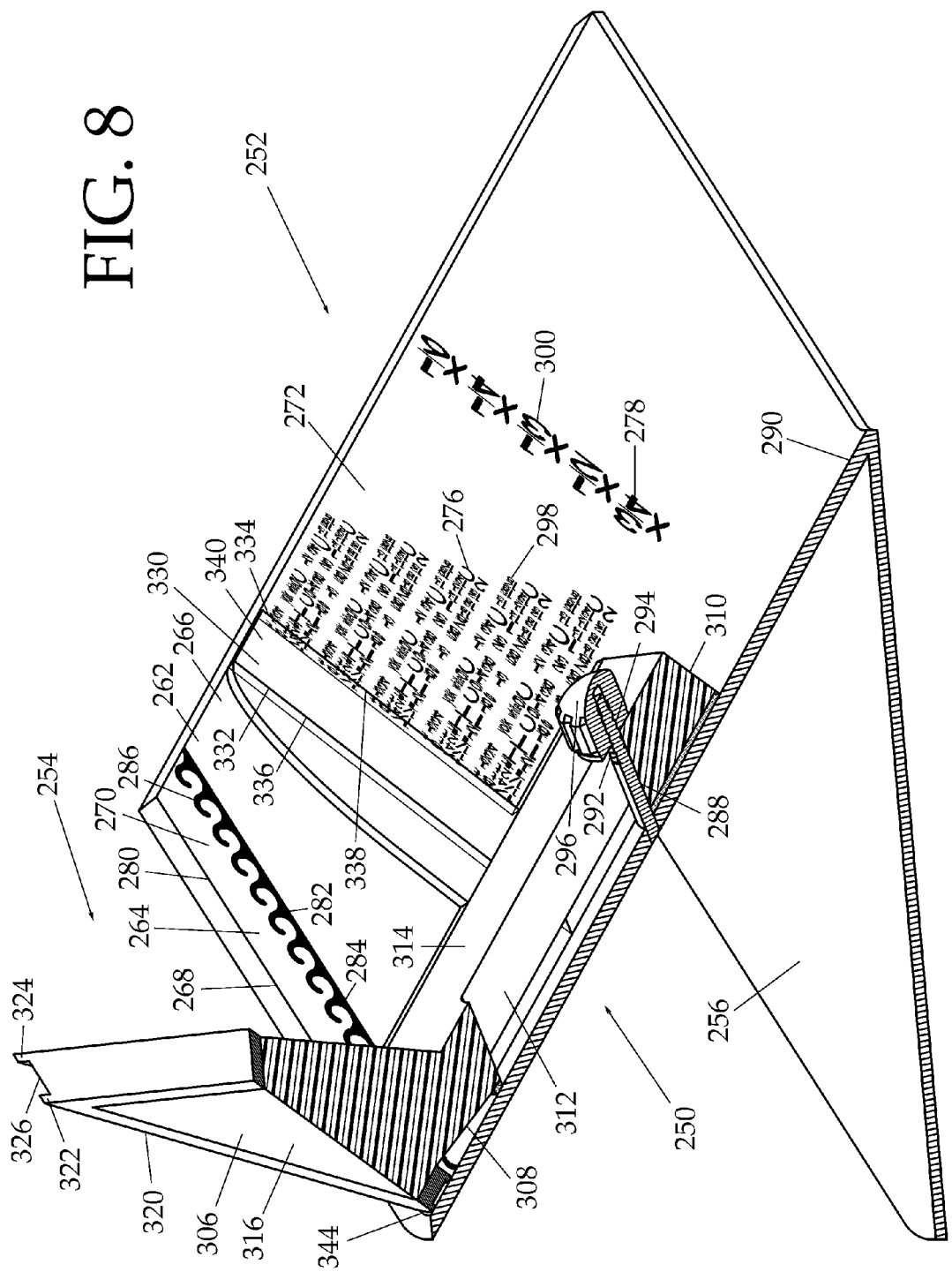
FIG. 8 is an upper back left cross-sectional perspective view of the embodiment of FIG. 5.

FIG. 5 shows the measuring assembly 250 comprising an outer member 252 and an adjustable inner member 254. FIG. 6 shows an exploded view of the parts of the inner and outer members, both disassembled. The outer member 252 comprises a thin, flat base 256 having the shape of a concave hexagon, the two front edges 258 of the hexagonal base 256 being concave and integrally attached to an obliquely oriented channel wall 260 that defines an interior space 262 and has an incurvate interior surface 264 forming an elongated, obliquely oriented channel 266 having a uniform, slightly-rounded-bottom-V-shaped cross-sectional profile that is progressively truncated toward the horizontal upper edge 268 of the interior surface 264. The channel 266 comprises two obliquely oriented lateral surfaces 270 having the appearance of two facing pages of an open book. A lower portion 272 of the lateral surfaces 270 provides a generous space for measurement indicia 274 and recipe conversion indicia 276 and their accompanying legends 278. The horizontal upper edge 268 of the interior surface 264 in this embodiment of the invention is the primary full measure indicator 280 for dry ingredients such as flour and sugar that can be leveled off with a straightedge such as a butter knife (not shown). The full measure indicator 280 defines a horizontal upper boundary plane that must match the horizontal upper surface of the measured material (also not shown) to effect an accurate measurement. A second full measure indicator 282 for liquid ingredients such as milk and oil defining a second horizontal upper boundary plane consists of a horizontal line 284 beneath a mnemonic graphic element of stylized crashing ocean waves 286 located approximately 1 inch below the upper edge 268 of the interior surface 264 of the channel 266. The outer member 252 has a threaded bolt 288 mounted slightly above the midpoint of and perpendicular to a rounded common edge 290 of the two obliquely oriented lateral side surfaces 270. Threads 292 of the threaded bolt 288 mate with interior threads 294 of a tightening knob 296.

Ten series 298 of volumetric measuring indicia 274, 276 are imprinted upon the lower portion 272 of the lateral surfaces 270 of the channel 266, each of the series 298 having an identifying legend 278 indicating a recipe conversion factor 300. Nine of the ten series 298 of volumetric measuring indicia 276 are of a selected ratio to but indicate a volume different from the actual volume of the measured quantity of material in the measuring assembly 250, such that the volume indicated is the product of the actual volume times the reciprocal of the recipe conversion factor 300. The specific recipe conversion factors 300 chosen are: ×2 (doubling the recipe), ×1¾ ×1½, ×1¼, ×1 (full recipe, unconverted, actual measure), ×¾, ×½, ×¼, ×⅓, and ×⅙. The series 298 of volumetric measuring indicia 274, 276 include the following volumes: 2 cups, 1⅞ cups, 1¾ cups, 1⅔ cups, 1⅝ cups, 1½ cups, 1⅜ cups, 1⅓ cups, 1¼ cups, 1⅛ cups, 1 cup, ⅞ cup, ¾ cup, ⅔ cup, ⅝ cup, ½ cup, ⅜ cup, ⅓ cup, ¼ cup, one U.S. standard large egg (0.206 cup), one U.S. standard egg white (0.136 cup), ⅛ cup, one standard egg yolk (0.070 cup), 1 tablespoon, ½ tablespoon, 1 teaspoon, ¾ teaspoon, ½ teaspoon, ⅓ teaspoon, ¼ teaspoon, and ⅛ teaspoon.

The adjustable inner member 254 is shown to have a repositionable dam member 306 integrally attached by a narrow neck 308 to an extruded-triangle-shaped slider member 310, both being made of a rigid material. The slider member 310 has a longitudinal slider hole 312 passing perpendicularly through the top surface 314 and running most of the length of the slider member 310, the longitudinal slider hole 312 having rounded ends for receiving the threaded bolt 288 at its two extreme positionings, for measuring the largest and smallest volumes. The repositionable dam member 306 has a triangular upstream face 316 and is surrounded by a peripheral sealing member 318 made of a flexible material such as silicone. The peripheral sealing member has a flexed cross-sectional profile mating with the uniform, slightly-rounded-bottom-V-shaped cross-sectional profile of the incurvate interior surface 264 of the elongated, obliquely oriented channel 266. The outermost lateral surfaces 320 of the peripheral sealing member 318 have an upstream peripheral ridge 322 and a downstream peripheral ridge 324 with a shallow recess 326 in between, forming a double wall. In an unflexed condition the cross-sectional profile of the two peripheral ridges 322, 324 extends approximately one sixteenth to one eighth of an inch beyond the profile of the channel 266, and by tightening the tightening knob, the user forces the two peripheral ridges 322, 324 to compress, forming a watertight seal. Having a pair of peripheral ridges 322, 324, as opposed to a single upstream peripheral ridge 322, allows for a better distribution of the variable clamping force at different positionings of the dam member 306 across the range of volumes.

The slider member 310 is positioned upon and within and fixedly attached to an extruded-slightly-rounded-bottom-V- shaped indicium indicator assembly 326, which can be made of ⅛ inch acrylic sheets or their equivalent, having a largely hidden base portion 328 upon which the slider member is attached and having a visible portion 330 comprising an indicium indicator for liquid ingredients 332 and an indicium indicator for dry ingredients 334, those being the upper and lower edges 336, 338, respectively, of a pair of laterally projecting, preferentially gold-tinted, transparent, generally rectangular lower cursors 340 that are obliquely oriented perpendicular to the trajectory of the dam member 306. The upper edges 336 are integrally attached to a preferentially blue-tinted, transparent pair of upper cursors 342, the pairs of cursors 332, 334 crossing all ten series 298 of volumetric measuring indicia 300. The upper edges 336 of the lower cursors 340 border the blue-tinted upper cursors 342, whose color functions as a mnemonic for the liquid ingredient indicator 332. The lower edge of the cursor assembly is gold tinted as a mnemonic for the dry ingredient indicator 334.

The cursors are adjustable by the user loosening the tightening knob 296, aligning the appropriate cursor 332, 334 with the desired indicium 300, and re-tightening the knob 296. Although the net clamping force decreases with the loss of mechanical advantage as the lever arm lengthens when the dam member 306 is moved farther up the obliquely oriented channel 266, this is largely offset by the decreasing surface area of contact between the dam member 306 and the interior surface 264 of the channel 266 over which the clamping force is distributed.

Also shown is a measuring chamber of variable volume 344 having a boundary defined by the portion of the upstream face 316 of the repositionable dam member 306 that is located below the horizontal upper edge 268 of the interior surface 264 and the portion of the interior surface 264 of the channel 266 located above and forward of the upstream face 316 of the dam member 306. The measuring chamber of variable volume 344 is bounded above by the horizontal upper boundary plane.

Figure 9:
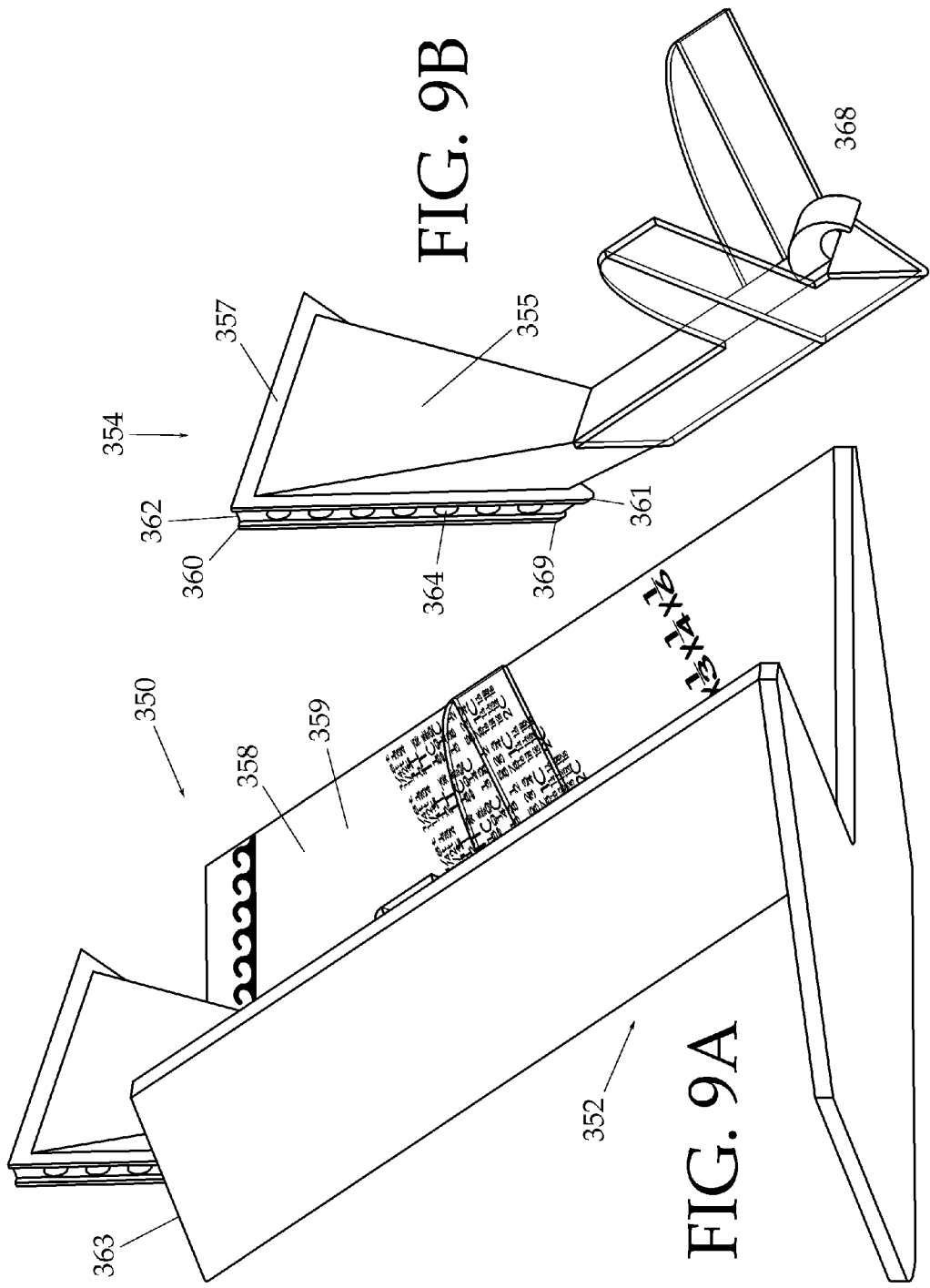
FIGS. 9A-B are lower front left perspective views of another adjustable measuring assembly according to an aspect of the inventive subject matter.
Figure 10:
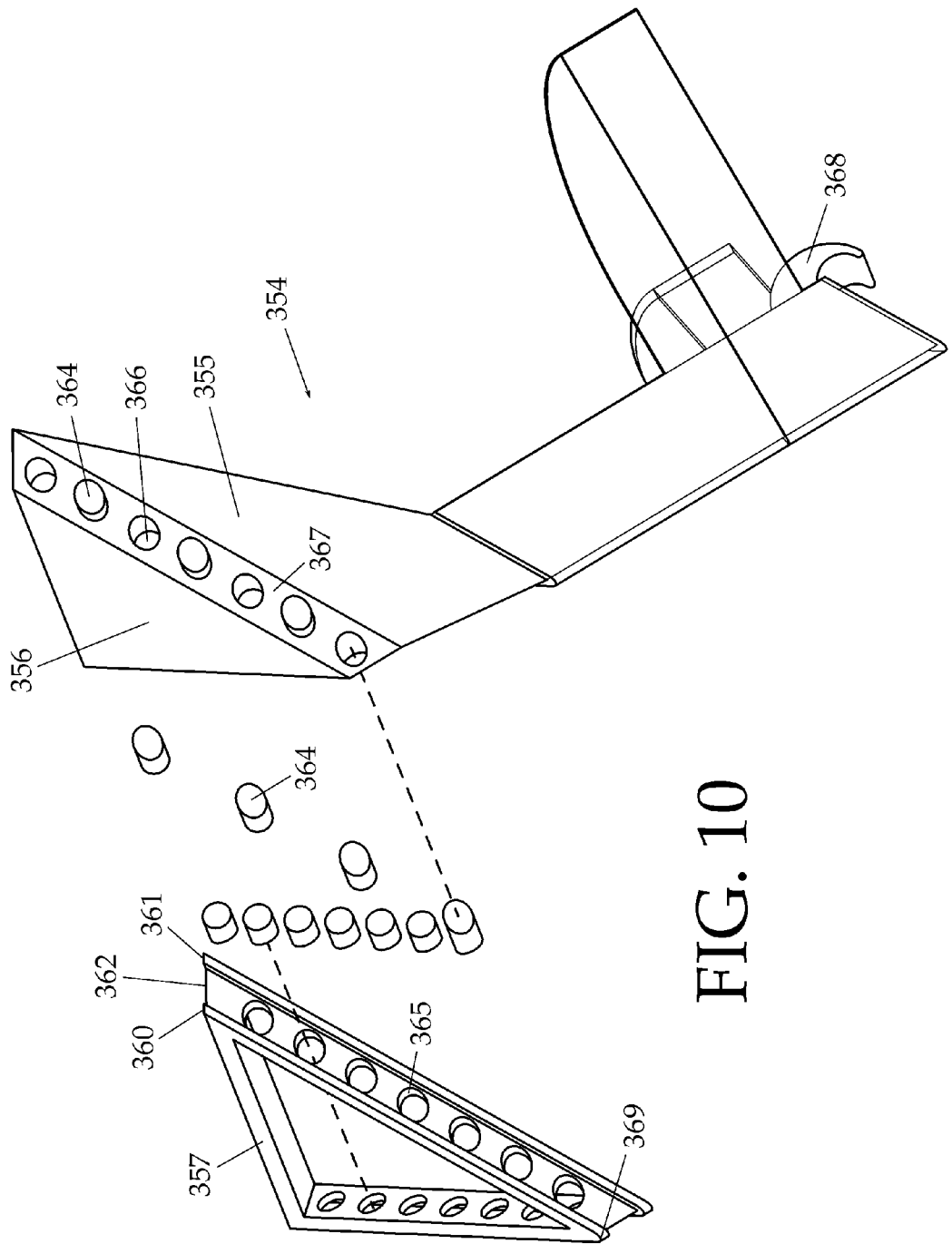
FIG. 10 is a lower back left exploded perspective view of the adjustable inner member of the embodiment of FIGS. 9A-B.

Referring now to aspects of the invention in more detail, FIGS. 9A-B and FIG. 10 show an adjustable measuring assembly 350 according to an aspect of the inventive subject matter comprising an outer member 352 and an adjustable inner member 354 that is on the whole of similar type and function to the embodiment of the measuring assembly 250 of FIGS. 5 through 8 except in the following details. Instead of the outer member 252 and the adjustable inner member 254 being attached to form an adjustable measuring assembly 250 by a bolt 288 and tightening knob 296, the adjustable inner member 354 of FIGS. 9A-B and FIG. 10 attaches to the outer member 352 to form an adjustable measuring assembly 350 by the force of magnetic attraction. A repositionable dam member 355 has a triangular upstream face 356 and is surrounded by a peripheral sealing member 357 made of a flexible material such as silicone. The peripheral sealing member 357 has a flexed cross-sectional profile mating with the uniform, slightly-rounded-bottom-V-shaped cross-sectional profile of the incurvate interior surface 358 of the elongated, obliquely oriented channel 359. The peripheral sealing member 357 has an upstream peripheral ridge 360 and a downstream peripheral ridge 361 with a shallow recess 362 in between, forming a double wall. In an unflexed condition the cross-sectional profile of the two peripheral ridges 360, 361 extends approximately one sixteenth to one eighth of an inch beyond the profile of the channel 359. An attractive magnetic force between the inner and outer members 354, 352 forces the two peripheral ridges 360, 361 to compress, forming a watertight seal.

Having a pair of peripheral ridges 360, 361, as opposed to a single upstream peripheral ridge 360, allows for a better distribution of the variable clamping force at different positionings of the dam member 355 across the range of volumes. The attractive magnetic force keeps the outer member 352 and the adjustable inner member 354 firmly attached into a measuring chamber of variable volume 363 while in use, yet allows the dam member 355 to be readily repositioned between measurements. The attractive magnetic force is provided by a plurality of cylindrical permanent magnets 364 embedded into the shallow recess 363 in both of the outermost lateral surfaces 360 of the flexible peripheral sealing member 357, the plurality of magnets 364 extending through perforations 365 in the flexible peripheral sealing member 357 where they are embedded in a series of holes 366 bored into the side surfaces 367 of the repositionable dam member 355. The permanent magnets 364 are attracted to the incurvate interior surface 358 of the outer member 352, which is made from a magnetically attractive material such as stainless steel. A finger grip 368 located at the lower front end of the adjustable inner member 354 allows the dam member 355 to be easily repositioned by the user grasping and lifting the finger grip 368, due to the mechanical advantage afforded the user by the relatively long lever arm overcoming the powerful but steeply attenuating range of the magnetic field's force. Also shown is a reference point of greatest depth 369.

Figures 11A, 11B:
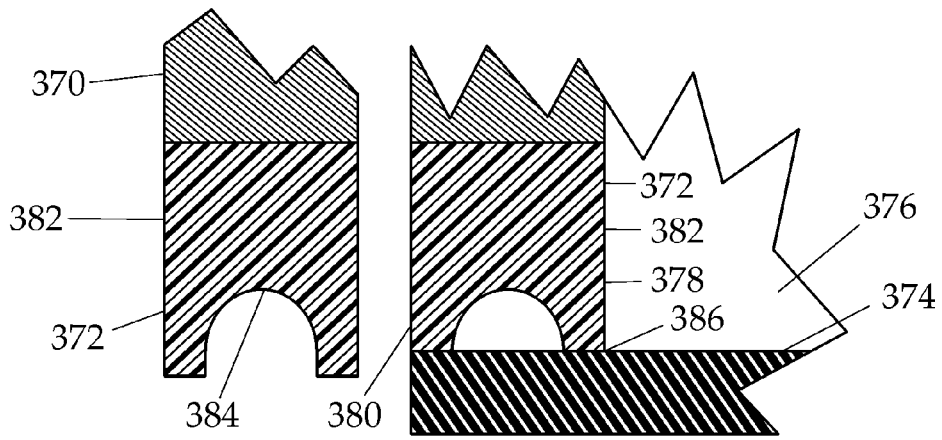
FIGS. 11A-F are semi-schematic right cross-sectional views of three variations of the peripheral sealing member according to an aspect of the inventive subject matter.

FIGS. 11A-F shows a cross-sectional semi-schematic of aspects of the inventive subject matter. Details of possible forms and material compositions of dam members and peripheral sealing members outlined in this and the following two paragraphs may be applicable to any of the embodiments of the invention shown in the specification. FIG. 11A shows a cross-section of the peripheral portion of a dam member 370 viewed perpendicular to its trajectory, with the upstream face to the right. The peripheral sealing member 372 is shown in an unflexed condition. FIG. 11B shows the same peripheral sealing member 372 in a flexed condition positioned and attached to the incurvate interior surface 374 of the fixed wall 376 of the outer member by a clamp, by magnetic attraction, or by other attachment means (not shown). The flexible upstream wall 378 and flexible downstream wall 380 form a double-walled assembly 382 with an open space 384 in between as a precaution against possible leakage around the upstream leading edge 386 of the peripheral sealing member 372. The double-walled assembly 382 also helps to distribute the clamping force over a larger area.

Figures 11C, 11D:
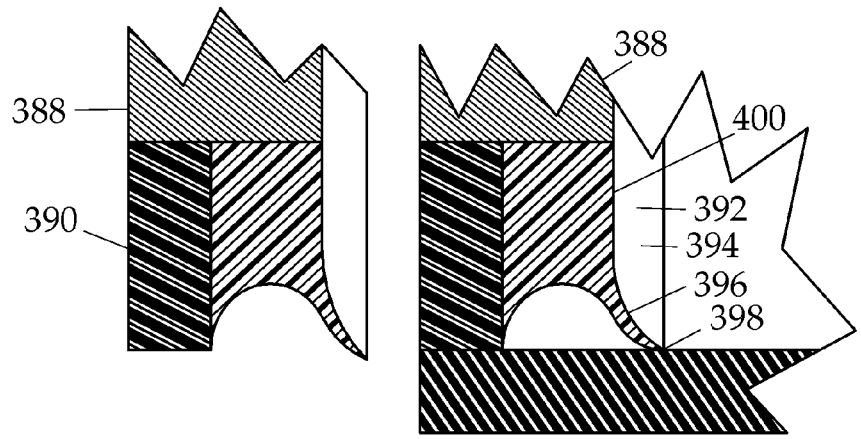

FIG. 11C shows a cross-section of the peripheral portion of a second repositionable dam member 388, similarly oriented and unflexed. FIG. 11D shows the dam member 388 of FIG. 11C in a flexed condition, likewise positioned and attached as in FIG. 11B. The downstream portion 390 of the peripheral sealing member 392 is made of a more rigid material, less flexible than the material from which the upstream portion 394 of the peripheral sealing member 392 is made. Here the objective is to provide a more delicate, and therefore more pliable and waterproof, windshield-wiper-shaped flange 396 as the peripheral leading edge 398 of the upstream face 400 of the dam member 388, while also preventing it from overflexing.

Figures 11E, 11F:
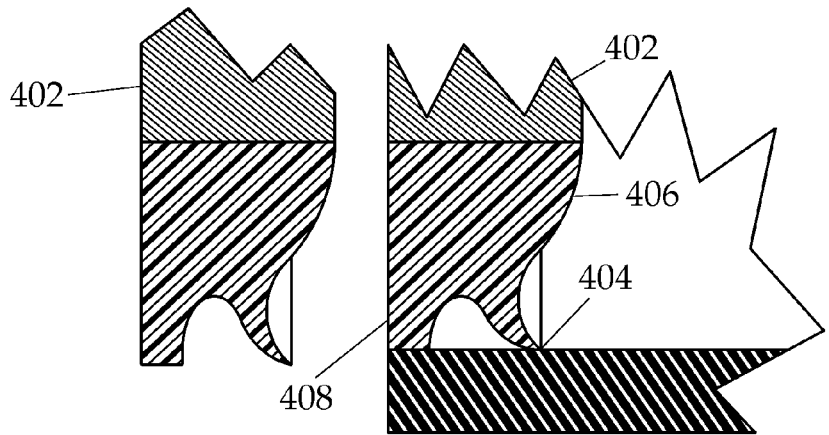
Figure 15:
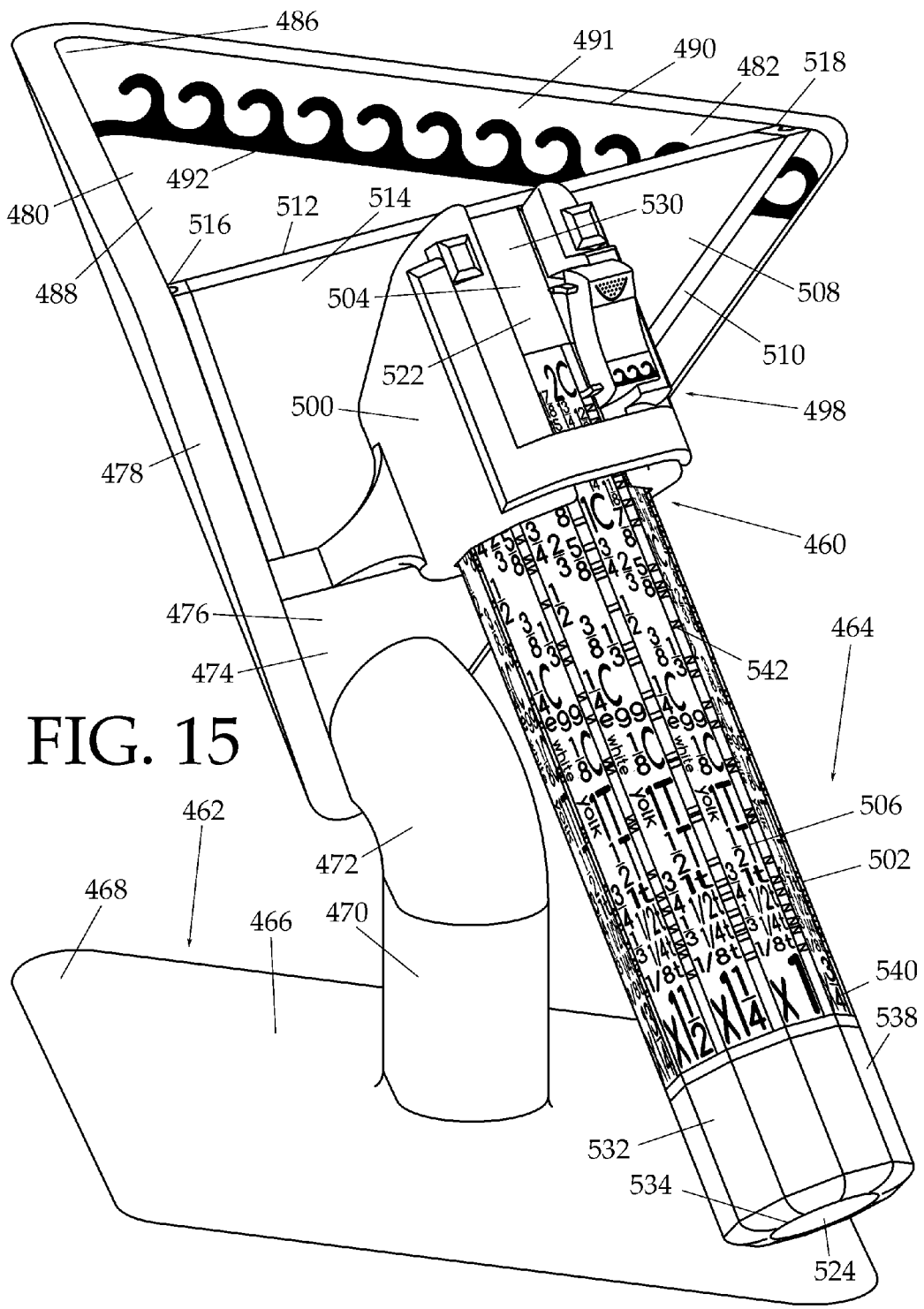
FIG. 15 is an upper front left perspective view of another adjustable measuring assembly according to an aspect of the inventive subject matter.
Figure 16:
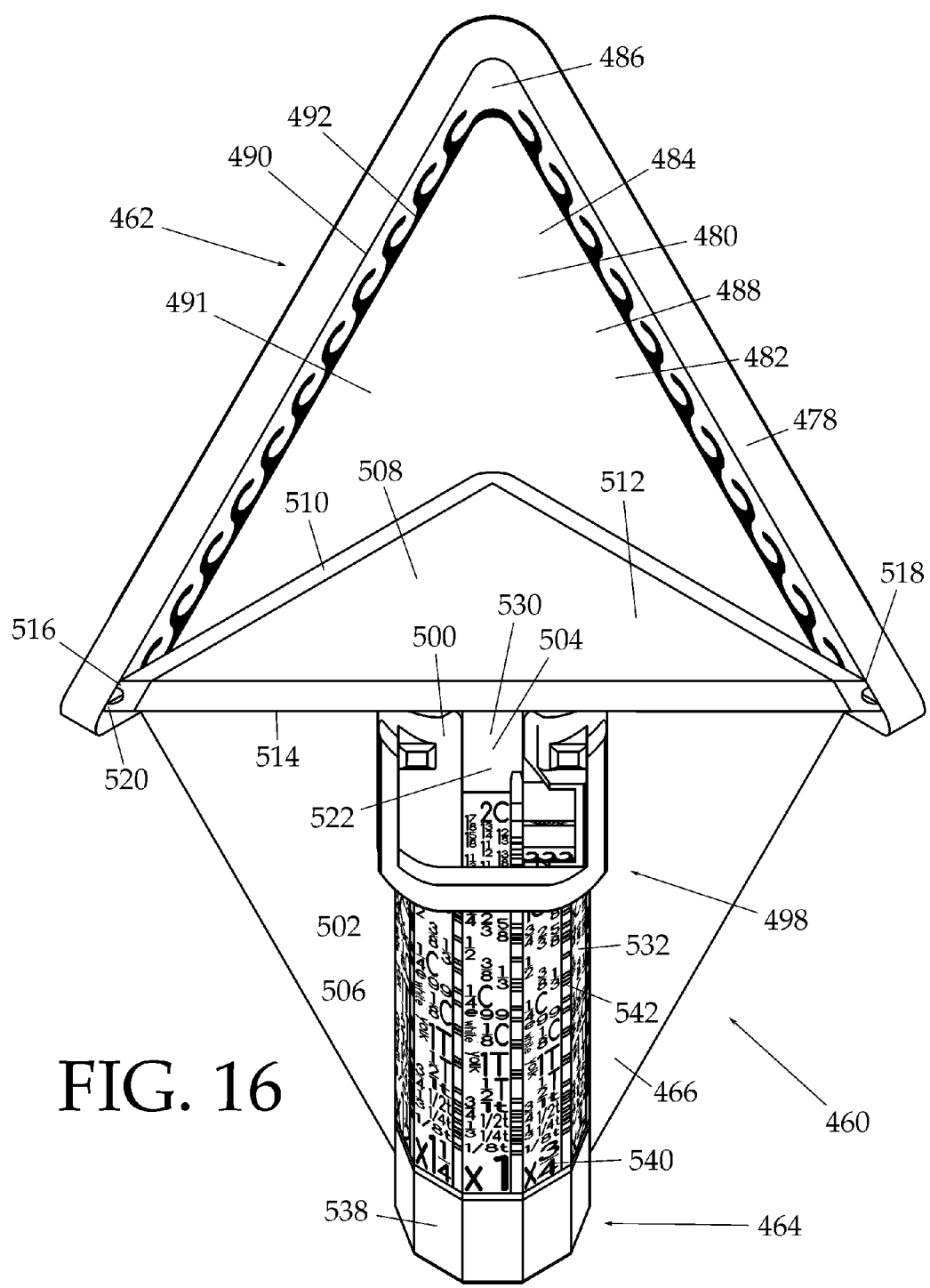
FIG. 16 is a top view of the embodiment of FIG. 15.
Figure 17:
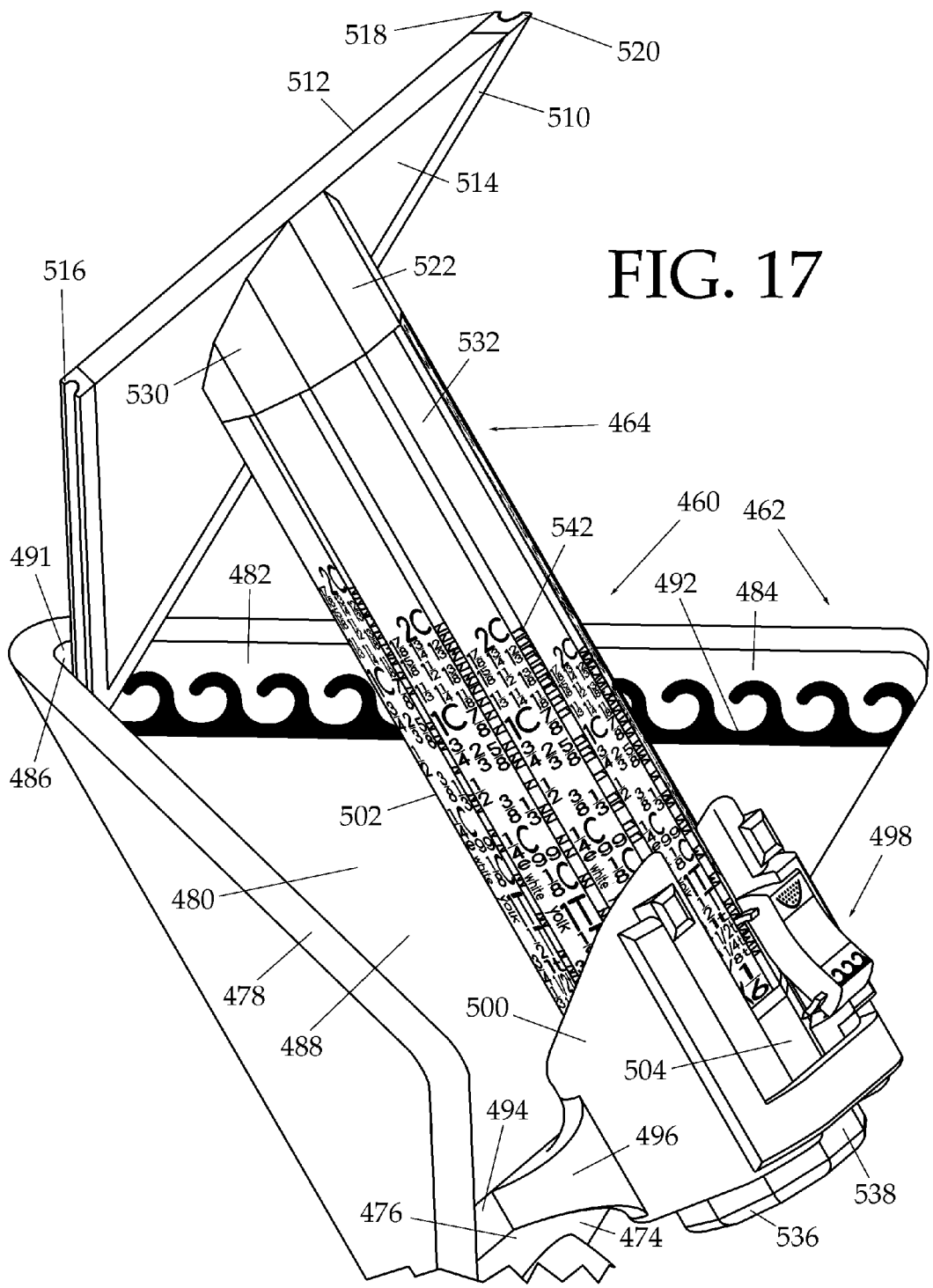
FIG. 17 is an upper front left perspective view of the embodiment of FIG. 15.
Figure 18:
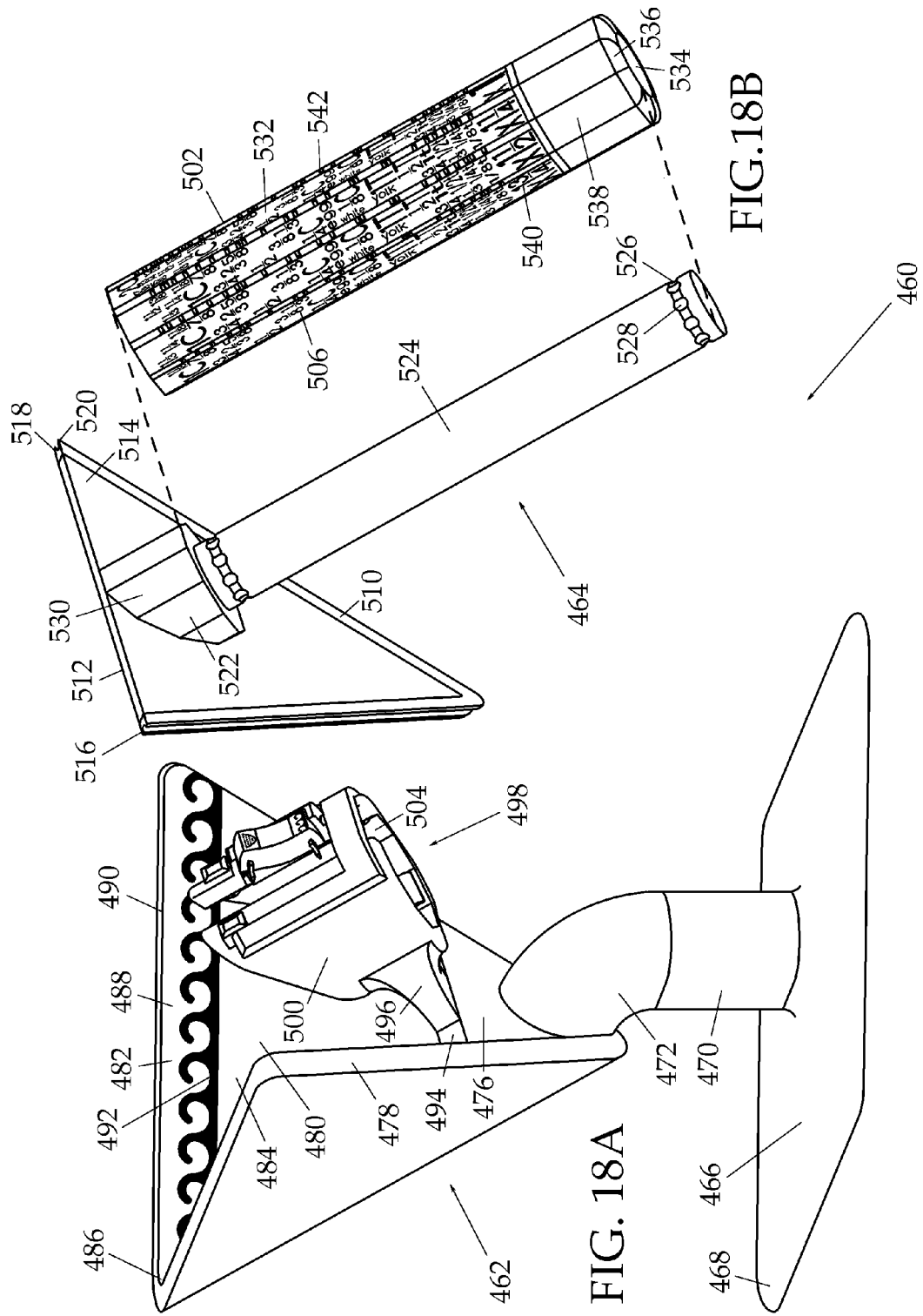
FIG. 18A is an upper front left perspective view of the outer member of the embodiment of FIG. 15.
FIG. 18B is an upper front left exploded perspective view of the adjustable inner member of the embodiment of FIG. 15.

FIG. 11E shows a cross-section of the peripheral portion of a third repositionable dam member 402, similarly oriented and unflexed. FIG. 11F shows the dam member 402 of FIG. 11E in a flexed condition, likewise positioned and attached as in FIG. 11B. Here the more pliable and waterproof, windshield-wiper-shaped peripheral leading edge 404 of the upstream face 406 of the dam member 402 is also prevented from overflexing by the secondary wall 408, which in this instance is made of the same flexible, waterproof material. The delicate peripheral leading edge 404 is recessed so that it is less likely to be damaged during use.

FIGS. 12A-B shows a semi-schematic of aspects of the inventive subject matter. FIG. 12A shows the first of two positionings of semi-schematic adjustable inner member 410 with respect to a semi-schematic outer member 412, here set for measuring eight unspecified units. The indicium indicator (arrow point) 414 on the outer member 412 aligns with the numerical indicium "8" 416 imprinted on the adjustable inner member 410, and the indicium indicator 418 on the adjustable inner member 410 aligns with the numerical indicium "8" 420 on the outer member 412. FIG. 12B shows the second positioning of the adjustable inner member 410, here set for measuring 2 units. The indicium indicator 414 on the outer member 412 aligns with the numerical indicium "2" 422 imprinted on the adjustable inner member 410, and the indicium indicator 418 on the adjustable inner member 410 aligns with the numerical indicium "2" 424 on the outer member 412. FIGS. 12A-B illustrate that there are many alternative locations for displaying series of indicia and indicium indicators, depending upon the particularities of a given embodiment of the invention.

FIGS. 13A-F shows a semi-schematic of aspects of the inventive subject matter. FIG. 13A shows a repositionable dam member 426 having a slightly-rounded-bottom-V-shaped cross-sectional profile and an oblique linear trajectory 428. FIG. 13B shows a detail of a channel wall (prior to being truncated) 430 with an incurvate interior surface 432 having a uniform cross-sectional profile normal to the oblique linear trajectory 428 mating with the profile of the dam member. Two positionings 434 of the upstream face 436 of the dam member 426 are also illustrated. FIG. 13C shows a semi-schematic measuring assembly 437 showing how the uniform cross-sectional profile of the interior surface 432 of the channel wall 430 is truncated by the horizontal plane 438 defining the upper surface of the measuring chamber of variable volume. FIG. 13D shows a repositionable dam member 440 having a circular-arc-shaped profile and a circular-arc-shaped trajectory 442. FIG. 13E shows a detail of a channel wall 444 (prior to being truncated) with an incurvate interior surface 446 having a uniform cross-sectional profile normal to the circular-arc-shaped trajectory 442 mating with the profile of the dam member 440. Two positionings 448 of the upstream face 450 of the dam member 440 are also illustrated. FIG. 13F shows a semi-schematic measuring assembly 451 how the uniform profile of the interior surface 446 of the channel wall 444 is truncated by the horizontal plane 452 defining the upper surface of the measuring chamber of variable volume.

FIGS. 14A-B shows a semi-schematic of aspects of the inventive subject matter. The two semi-schematic measuring assemblies 437, 451 of FIGS. 13C and 13F are shown here with arrows 452 indicating the direction of the clamping force applied at three locations along the trajectory of the dam member. This illustrates the necessity of addressing the fact that there is a variable surface area of contact between the dam member and the interior surface of the channel over which the clamping force is distributed, This issue is addressed in various ways, depending upon the particularities of a given embodiment of the invention.

Referring now to aspects of the invention in more detail, FIGS. 15 through 25 show an adjustable measuring assembly 460 according to an aspect of the inventive subject matter having an outer member 462 and an adjustable inner member 464. The outer member 462 includes a flat base 466 that is diamond shaped with rounded upper edges 468 attached to a vertical shank or stem 470 having an ovoid cross-sectional profile that continues upward to an approximately 54.7 degree bend 472 and terminates at the slightly-rounded-bottom-closed-top-V-shaped front face 474 of a short, generally triangular-prism-shaped retaining wall 476. The sides and bottom of the V-shaped front face 474 are integrally joined with a fixed wall 478 defining an interior space 480 and having an incurvate interior surface 482. The fixed wall 478 has two lateral portions 484 that are generally triangular in shape and meet along a rounded common edge 486 running obliquely at an angle of approximately 54.7 degrees from horizontal, upward and rearward from the retaining wall 476. The common edge 486 is rounded to facilitate scraping out and cleaning of the measuring assembly 460. The two fixed, triangular, lateral wall portions 484 form an open channel 488. The interior surface 482 of the open channel 488 has a uniform cross-sectional profile normal to the oblique rounded common edge 486. The open channel 488 has a horizontal upper edge 490, such that the uniform cross-sectional profile of the channel 488 is progressively truncated toward the horizontal upper edge 490. The horizontal upper edge 490 functions as a full measure indicator for dry ingredients. The face-edge-face angle between these two fixed, triangular, lateral wall portions is approximately 70.5 degrees. The degree measures mentioned in this paragraph are only suggested if it is desired that the divers instances of the measuring chamber of variable volume 491 be generally in the form of regular tetrahedrons having generally equilateral triangular faces. Many other combinations of a shallower or deeper oblique angle and a wider or narrower face-edge-face angle will also produce similarly good results. Approximately 1 inch below the horizontal upper edge 490 is a second full measure indicator for spillable liquid ingredients 492 in the form of a horizontal line beneath a series of crashing waves.

Attached to the top face 494 of the short, generally triangular-prism-shaped retaining wall 476 by a short neck 496 is a measurement setting mechanism 498 that is best viewed in FIGS. 20 through 25 and which will be described in more detail below. The overall shape of the body of the mechanism 498 is of an extruded or elongated block letter C forming a sleeve 500 for containing a longitudinal portion 502 of the adjustable inner member 464. The sleeve 500 has a longitudinal slot 504 for viewing and selecting measurement indicia 506 imprinted upon the adjustable inner member 464.

An exploded view of the adjustable inner member 464 is shown in FIG. 18B. The repositionable dam member 508 has a double walled peripheral sealing member 510 that is made of a flexible material and has a generally triangular or slightly-rounded-bottom-closed-top-V-shaped cross-sectional profile normal to its trajectory, which is parallel to the oblique, rounded common edge 486 of the lateral wall portions 484 of the outer member 462. The dam member 508 has an upstream face 512 and a downstream face 514 and has a uniform thickness. The profile of the dam member 508 mates with the incurvate interior surface 482 of the open channel 488 when the peripheral sealing member 510 is in a flexed condition. The peripheral sealing member 510 comprises a flexible upstream ridge 516 running along the flexible peripheral leading edge 518 of the upstream face 512 and a flexible downstream ridge 520 bordering the downstream face 514, whereby the downstream ridge 520 is able to catch any errant drops of the measured liquid that may breach the upstream ridge 516. The short retaining wall 476 of the outer member 462 also provides a failsafe against residual leakage that may occur during a repositioning of the dam member 508.

Attached to the upper central portion of the downstream face 512 of the dam member 508 is a flange-and-guide member 522 having a cross-section with a uniform, regular decagonal profile and being connected to an obliquely oriented (approximately 54.7 degrees from horizontal) cylindrical spindle 524. The spindle 524 has two shallow annular trough-shaped tracks 526 located near each one of its ends, each of the tracks 526 having ten cup-shaped indentations 528, deeper than the shallow annular tracks 526, at regular 36 degree intervals around the spindle 524, one pair of indentations 528 for each of the ten lateral faces 530 of the decagonal-prism-shaped flange-and-guide member 522. The spindle 524 holds a rotatable, repositionable, removable recipe conversion carousel 532 having the general shape of a regular decagonal prism with a central longitudinal bore 534 passing through the centers of the two regular decagon end faces 536, the longitudinal bore 534 slidably mating with the cylindrical spindle 524. The lower, front end 536 of the carousel 532 is shown to be slightly rounded. Each rectangular lateral face 538 of the carousel 532 displays a series of measurement indicia 506 and an identifying legend 540 indicating the recipe conversion factor. The specific recipe conversion factors chosen are: ×2 (doubling the recipe), ×1¾ ×1½, ×1¼, ×1 (full recipe, unconverted, actual measure), ×¾, ×½, ×¼, ×⅓, and ×⅙. The series of volumetric measuring indicia 506 include the following volumes: 2 cups, 1⅞ cups, 1¾ cups, 1⅔ cups, 1⅝ cups, 1½ cups, 1⅜ cups, 1⅓ cups, 1¼ cups, 1⅛ cups, 1 cup, ⅞ cup, ¾ cup, ⅔ cup, ⅝ cup, ½ cup, ⅜ cup, ⅓ cup, ¼ cup, one U.S. standard large egg (0.206 cup), one U.S. standard egg white (0.136 cup), ⅛ cup, one standard egg yolk (0.070 cup), 1 tablespoon, ½ tablespoon, 1 teaspoon, ¾ teaspoon, ½ teaspoon, ⅓ teaspoon, ¼ teaspoon, and ⅛ teaspoon. A longitudinally arrayed series of notches 542 punctuate the right-hand side of each of the lateral faces 538 of the carousel 532, each notch 542 aligning with the bottom edge of the measuring indicium 506 to which it corresponds.

Figure 19:
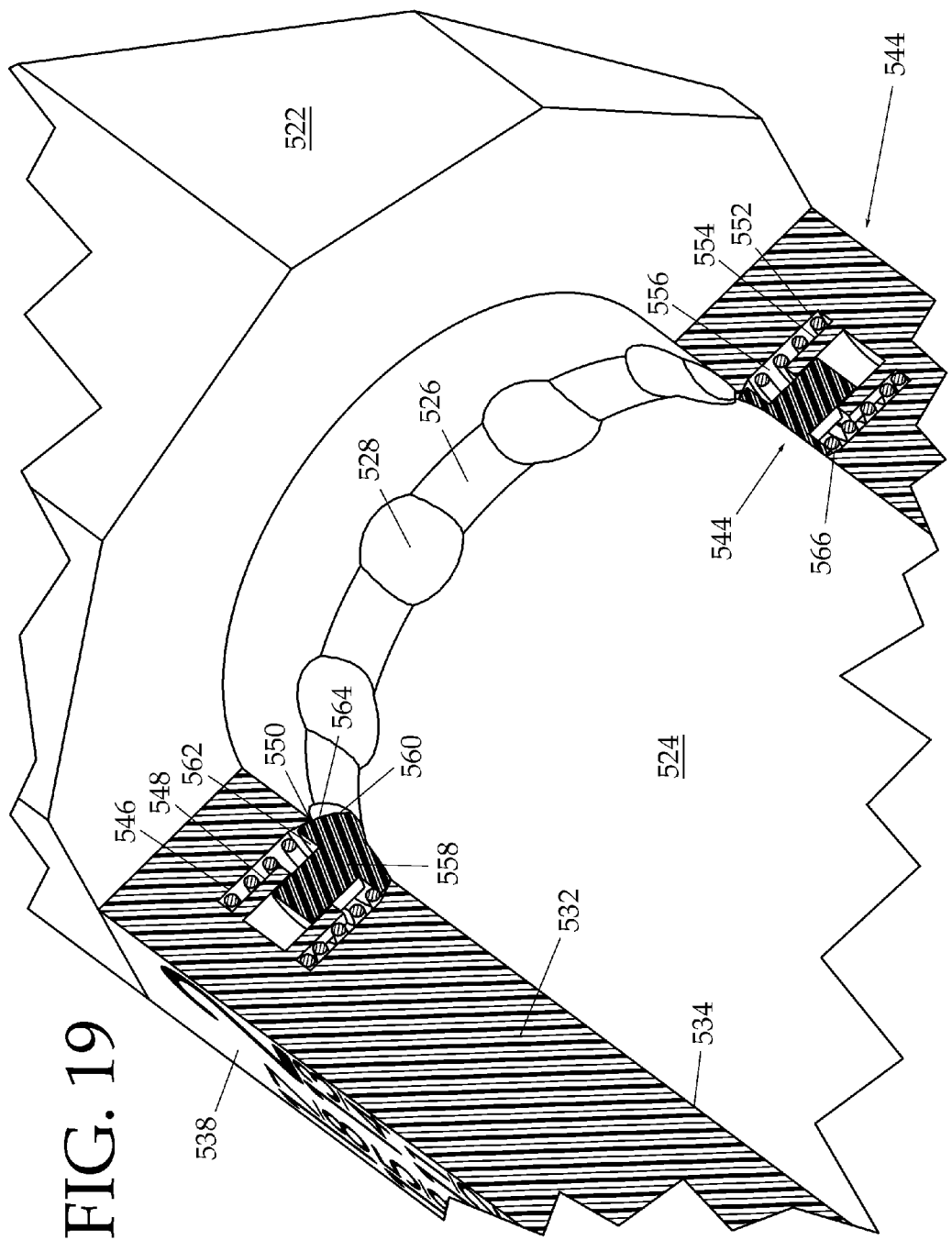
FIG. 19 is a cross-sectional view of the adjustable inner member of the embodiment of FIG. 15.

FIG. 19 shows a detailed cross-sectional view of the carousel 532 attached to the spindle 524, abutting and correctly aligned for use with the flange-and-guide member 522, with the spindle 524 and flange-and-guide member 522 shown not in cross-section, showing details of a detent mechanism 544 for aligning the faces 538 of the carousel 532 with the flange-and-guide member 522. Each of two sets of two opposing bores 546 having shorter, hollow cylindrical guide bores 548 within them and having an annularly constricted neck portion 550, each containing a compression spring 552 coiled between the outer wall 554 of the inner cylindrical guide bore 548 and the inner wall 556 of the bore 546 and having a pushpin-shaped plunger 558 slidable in the inner bore 548. The plunger 558 has a head 560 with a flat, circular underside portion 562 receiving the continuous compression force of the coiled spring 552. The head 560 of the plunger 558 has a broad, hemispherical upper surface 564 that advances against an internal shoulder 566. The plunger 558 projects a distance into the central bore 534 of the carousel 532, where it mates with and seats within the cup-shaped indentations 528 in the spindle 524, urging the carousel 532 into correct alignment with the flange-and-guide member 522. When the user wishes to change the recipe conversion factor, she twists the carousel 532, causing the four springs 552 and plungers 558 to move deeper into the opposing bores 546, allowing the carousel 532 to move along the annular trough-shaped tracks 526 into its new position. To remove the carousel 532 from the spindle 524, the user must twist the carousel 532 approximately 18 degrees out of position and pull the carousel 532 obliquely downward and forward, causing the springs 552 and plungers 558 to move even deeper into the opposing bores 546, releasing them altogether from the annular trough-shaped tracks 526. Other replacement carousels 532 may be provided having other indicia 506 imprinted thereon indicating alternative measuring units (metric units, for example, or British or other standard units) or with different series of indicia for ten alternative recipe conversion factors (for tripling or quadrupling a recipe, for example).

Still referring to aspects of the invention of FIGS. 15 through 25, the measurement setting mechanism 498 that is best viewed in FIGS. 20 through 25 will now be described in detail. In FIGS. 15 through 25, the adjustable inner member 464 of the measuring assembly 460 has been removed, and only the outer member 462 is shown. The measurement setting mechanism 498 is attached to the top face 494 of the short, generally triangular-prism-shaped retaining wall 476 by a short neck 496. The overall shape of the body of the mechanism 498 is of an extruded or elongated block letter C forming a sleeve 500 for containing a longitudinal portion 502 of the adjustable inner member 464, which comprises the removable repositionable recipe conversion carousel 532 rotatably attached to the spindle 524. The sleeve 500 has a longitudinal slot 504 for viewing and selecting measurement indicia 506 imprinted upon the carousel 432. The body of the measurement setting mechanism 498 forms the sleeve 500 that mates loosely with the rectangular lateral faces 538 of the decagonal-prism-shaped carousel 532, the sleeve 500 having nine faces 567 aligning with nine of the ten rectangular lateral faces 538 of the carousel 532, the tenth lateral face 538 being viewable through the longitudinal viewing slot 504.

The measurement setting mechanism 498 comprises a three-position toggle switch apparatus 568 that allows the user to switch between liquid and dry ingredient settings or choose the intermediate, neutral setting in order to reposition the adjustable inner member 464 to a different measurement setting. The measurement setting mechanism 498 also comprises a set of eight opposed rollers 569 made of a flexible material such as latex rubber for gently but firmly guiding the carousel 532 through the sleeve 500 without the carousel 532 and sleeve 500 making direct, potentially injurious contact. Two of the eight rollers 569 are clampable rollers 608 and are able to be clamped down to constrain the carousel 532 and attach the dam member 508 to the interior surface 482 of the outer member 462. The operation of the clampable rollers 608 is described below.

Figure 20:
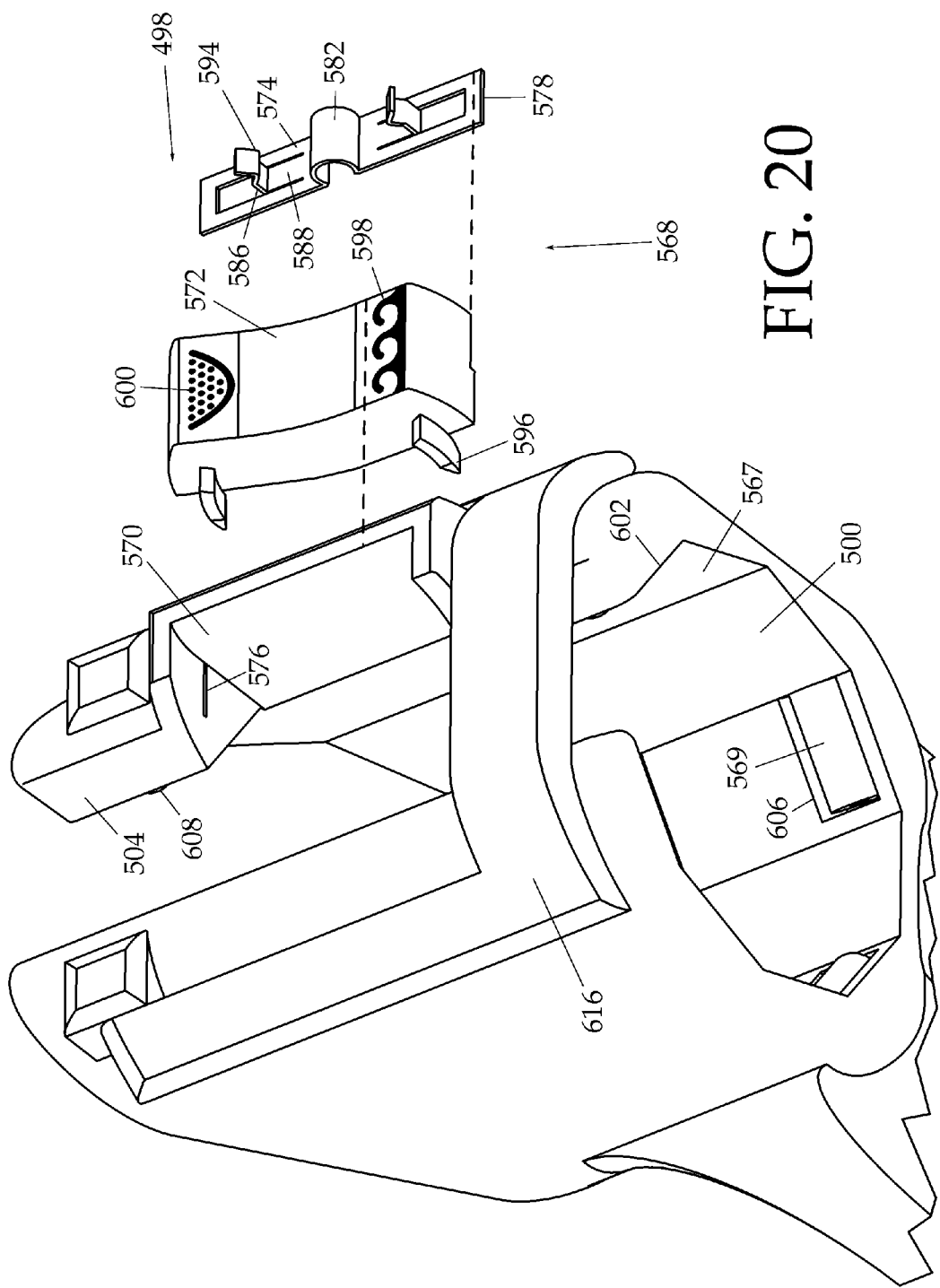
FIG. 20 is an upper front left exploded perspective view of a detail of the outer member of the embodiment of FIG. 15, showing the liquid/dry measure switch disassembled.

FIG. 20 is an exploded view showing the toggle switch apparatus 568 including: a recess 570 in the sleeve 500 that is shaped to rotatably contain a toggle switch 572 as it moves between settings; the toggle switch 572; and a detent-spring-and-axle 574. The recess 570 includes two slots 576 for holding both ends 578 of the detent-spring-and-axle 574 firmly in place. The detent-spring-and-axle 574 must be flexed for the ends 578 to be placed in position during manufacture. A C-shaped open hub 580 at the center of the bottom edge of the toggle switch 572 rotatably mates with an axle-shaped element 582 of the detent-spring-and-axle 574, allowing the toggle switch 572 to rock back and forth. Each of two upwardly oriented wells 584 along either side of the toggle switch 572 receive an upwardly bent section 586 of a detent spring 588, and indentations 590 in an inner wall 592 of the wells 584 positively engage with a protuberant bend 594 in the detent spring 588 to lock the toggle switch 572 at the three predetermined settings. At the two extreme settings, one or the other of two curved chisel-shaped teeth 596 is lowered into positive mating contact with the adjustable inner member 464 as described in the paragraph below.

Imprinted on the surface of the toggle switch 572 are a mnemonic indicium for liquid ingredients 598 and a mnemonic indicium for dry ingredients 600. Selecting the liquid ingredient setting entails aligning the notch 542 corresponding to the desired measurement indicium 506 on the carousel 532 with the liquid measure chisel-shaped tooth 596 and pressing the front end of the toggle switch 572 downward such that the toggle switch 572 swings about the axle-shaped element 582 of the detent-spring-and-axle 574 and such that the chisel shaped tooth 596 is lowered into positive mating contact with the notch 542.

Figure 21:
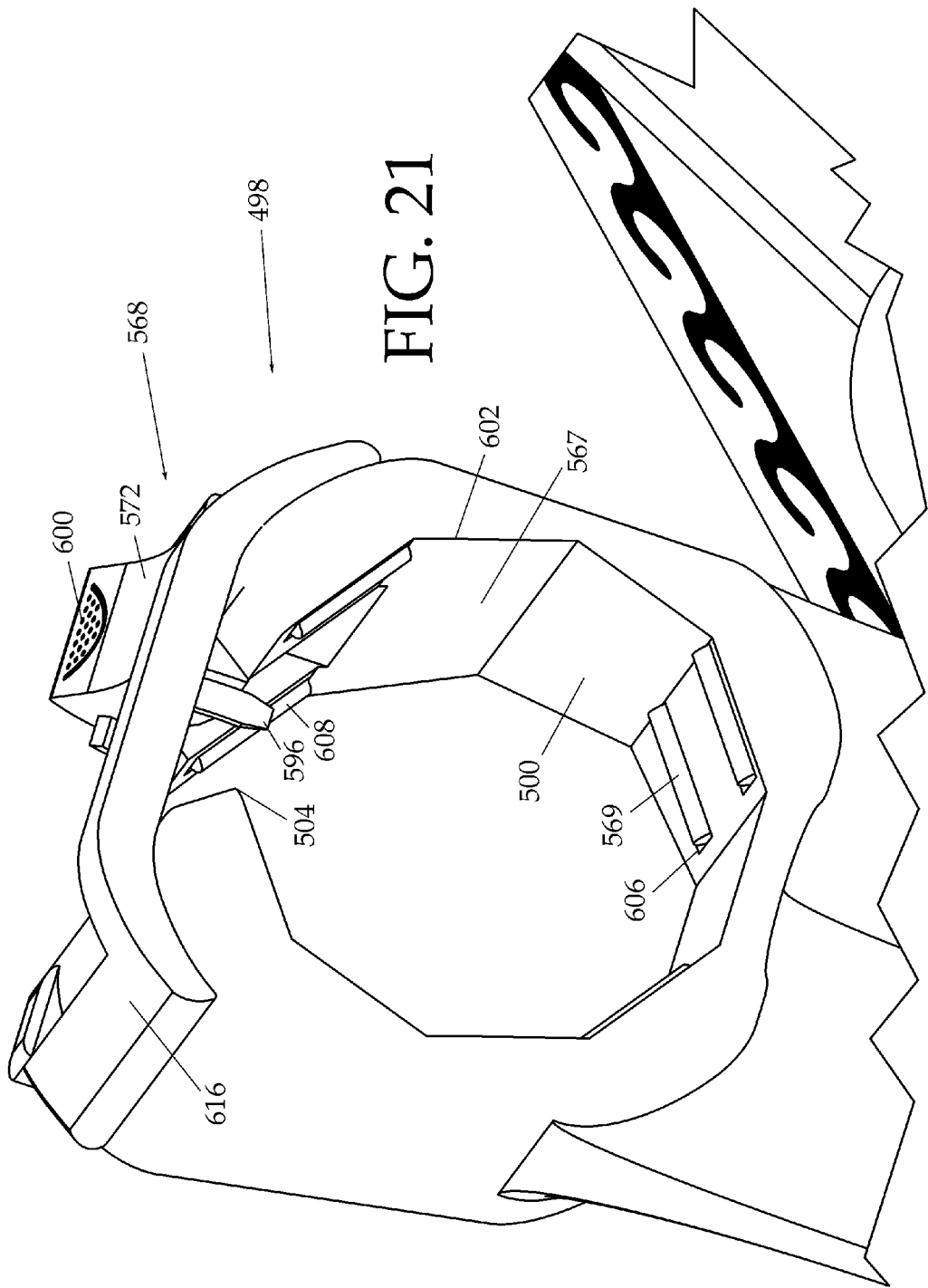
FIG. 21 is an upper front left perspective view of a detail of the outer member of the embodiment of FIG. 15.
Figure 22:
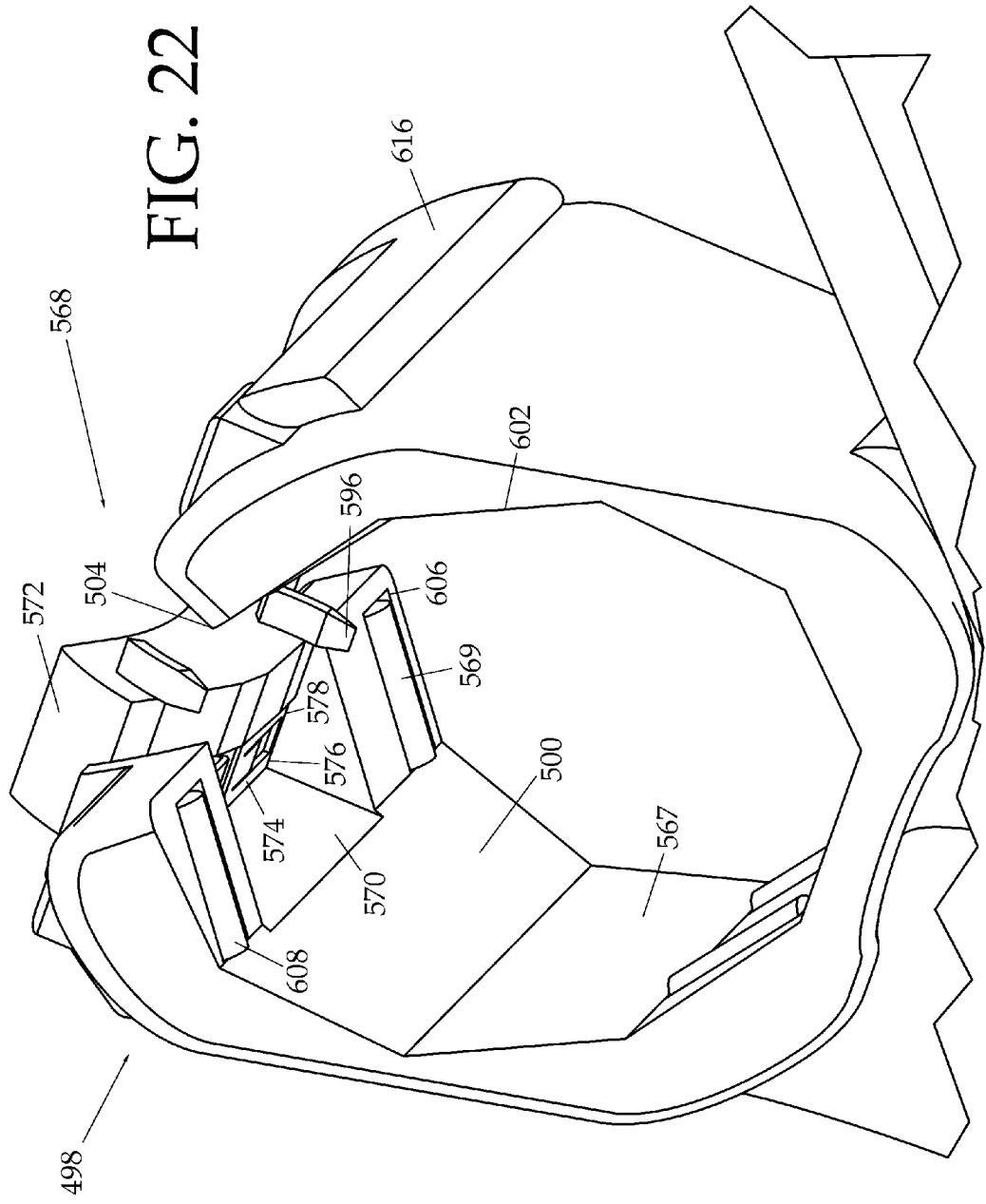
FIG. 22 is a lower back left perspective view of a detail of the outer member of the embodiment of FIG. 15.
Figure 23:
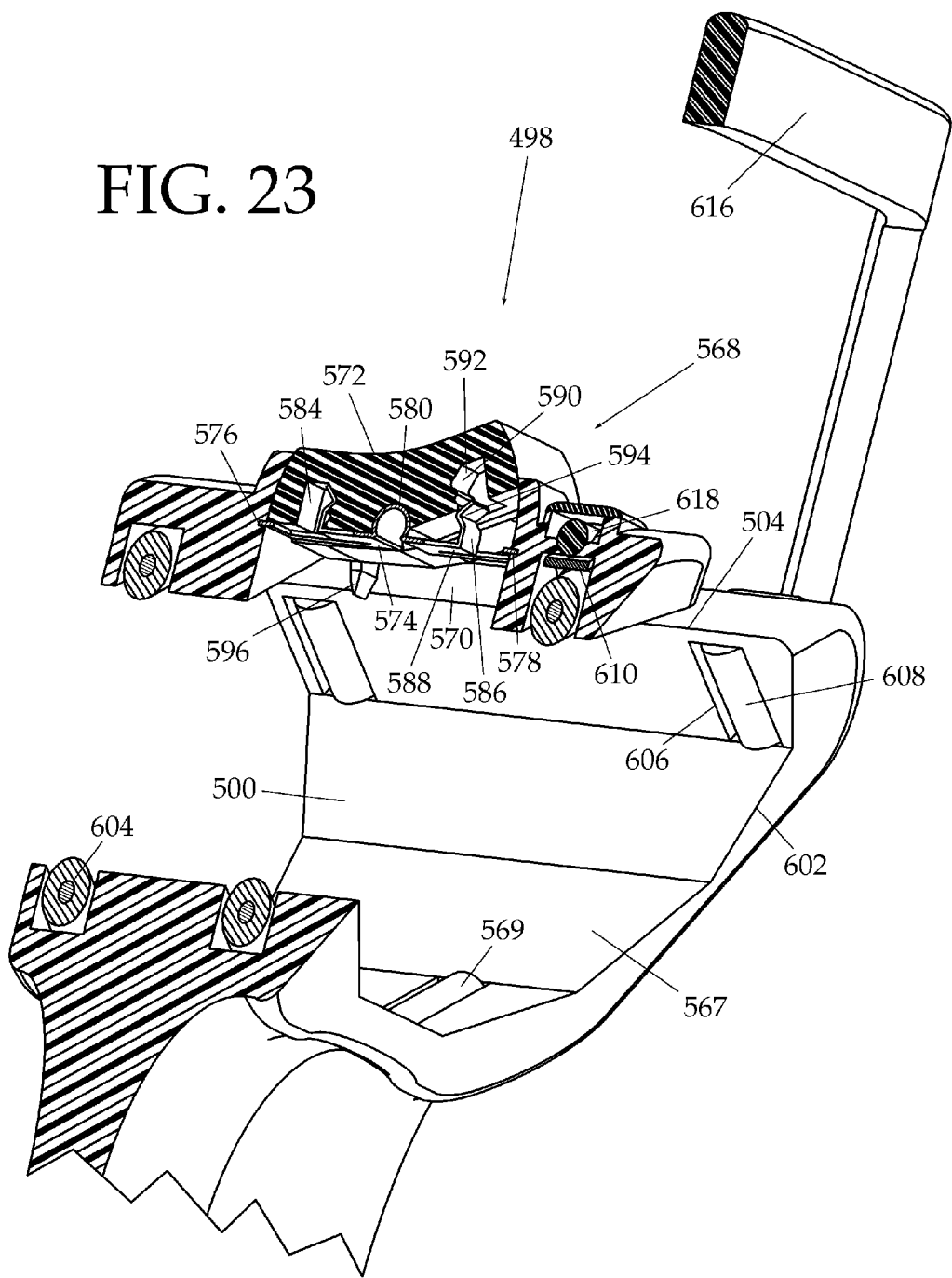
FIG. 23 is a lower back right cross-sectional perspective view of a detail of the outer member of the embodiment of FIG. 15.
Figure 24:
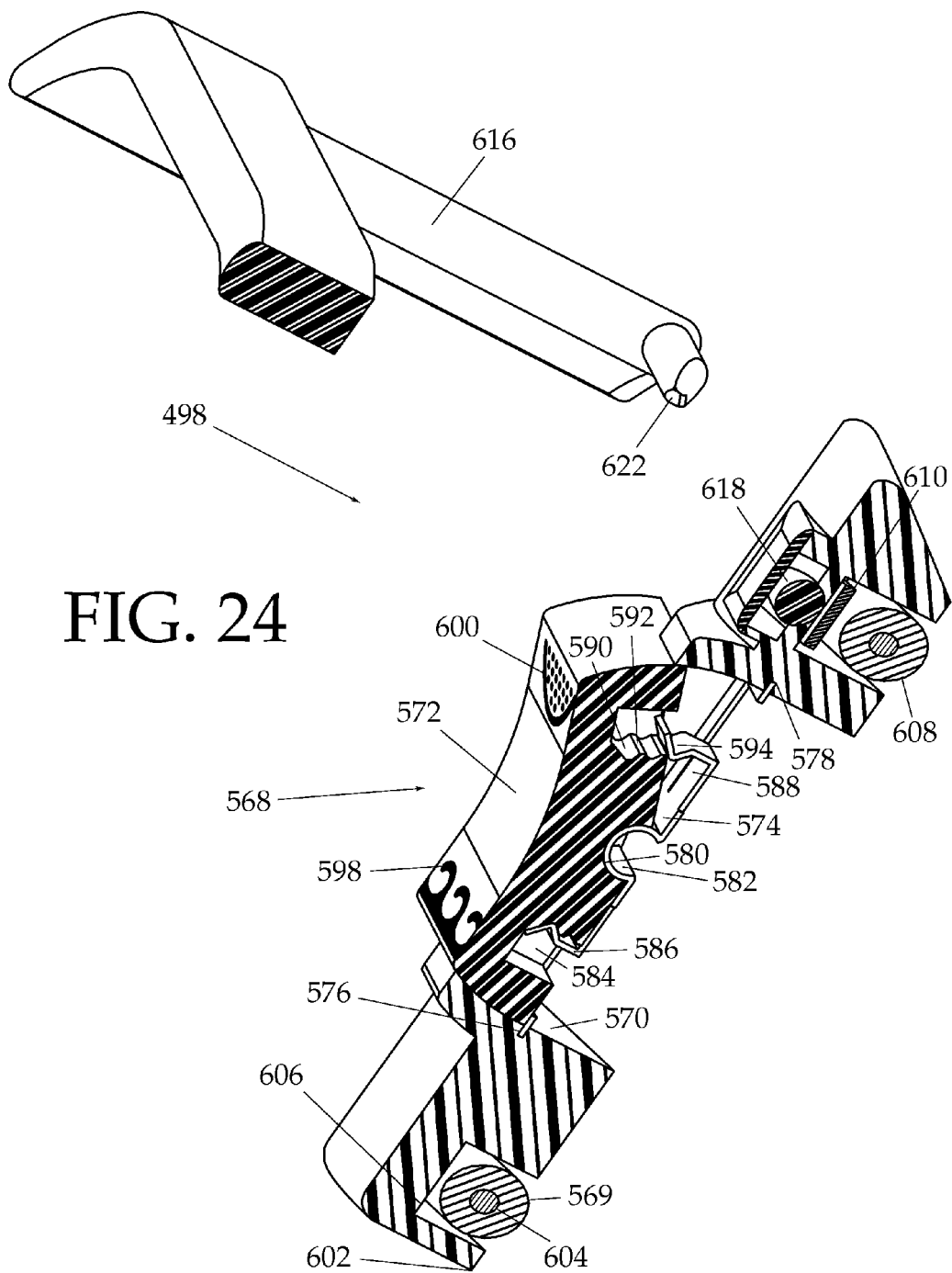
FIG. 24 is an upper back right cross-sectional perspective view of a detail of the outer member of the embodiment of FIG. 15.
Figure 25:
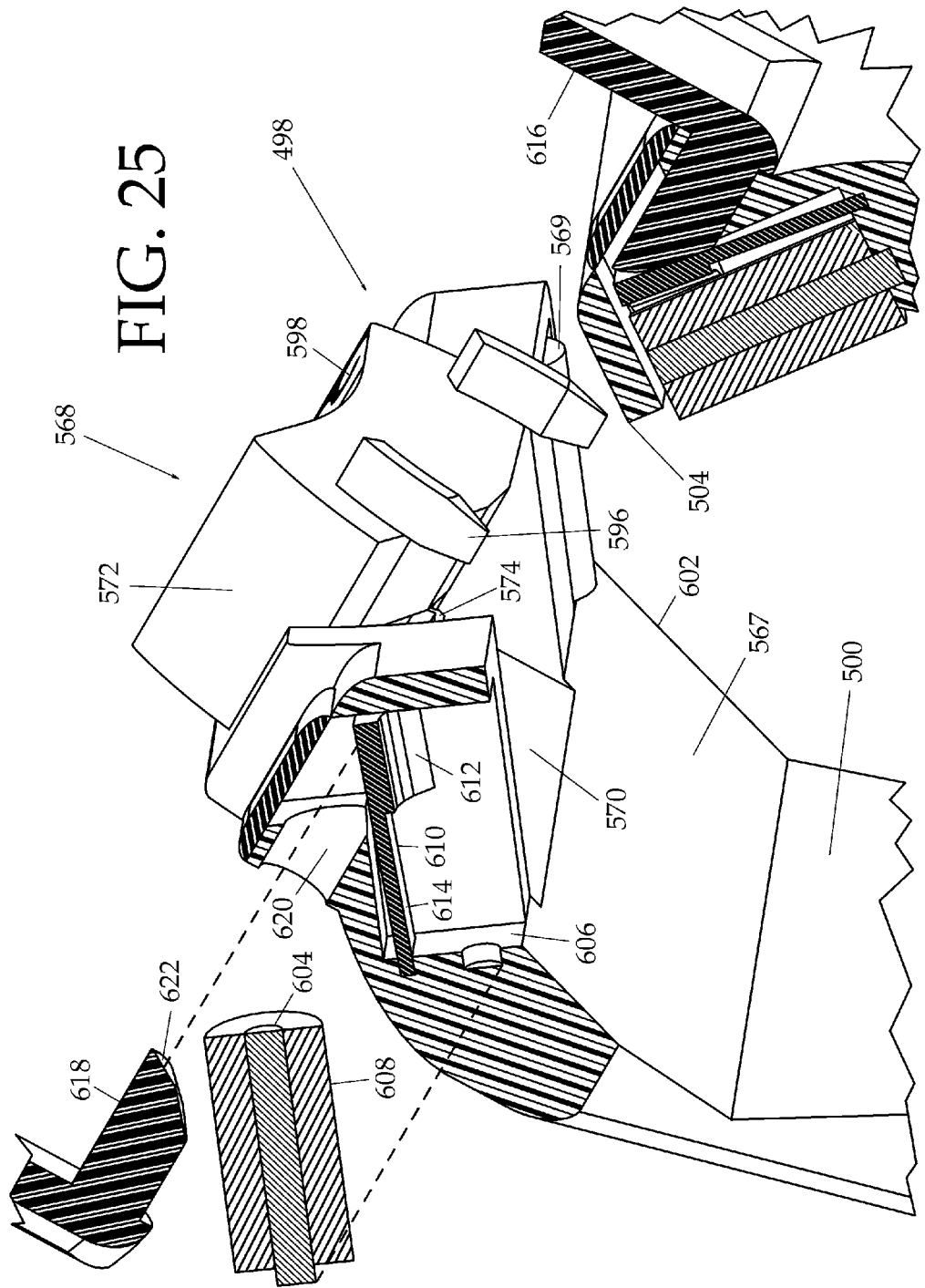
FIG. 25 is an exploded upper back left cross-sectional perspective view of the outer member of the embodiment of FIG. 15.

As best visualized in FIGS. 20 through 23 the set of eight opposed rollers 569 are situated as near as practicable to the outer edges 602 of the sleeve 500 and are effectively spaced around the carousel 532 to maximize its stability. Six of the rollers 569 are rotatable about a flexible axle 604, which is fixedly attached on one end to the sleeve 500 within a wheel well 606. Two clampable rollers 608, being the uppermost pair located on the left and right sides of the sleeve 500, have a braking mechanism 610 including a concave brake shoe 612 and a flexible longitudinal member 614 attached to the sleeve 500 within the wheel well 606. This is best visualized in the exploded cross-sectional view of FIG. 25. A releasable clamping lever 616 is shown in a released, upward position in which the braking mechanism 610 is disengaged. Each end of the releasable clamping lever 616 has a cylindrical axle 618 rotatably engaged with a hub channel 620 that allows an obliquely faceted cam 622 to engage with the flexible longitudinal member 614 of the braking mechanism 610 within the wheel well 606. When the releasable clamping lever 616 is in a clamped position, as shown in FIGS. 20 through 22, each of the two obliquely faceted cams 622 forces the flexible longitudinal members 614 to flex, causing the brake shoes 612 to clamp down upon the two clampable rollers 608, causing the flexible axles 604 to flex, and causing the distance between upper and lower front rollers 608, 569 to narrow, such that the carousel 532 is firmly clamped between the opposing sets of rollers 608, 569.

Referring now to aspects of the invention in more detail, FIGS. 26 through 31 show an adjustable measuring assembly 630 according to an aspect of the inventive subject matter having an outer member 632 and an adjustable inner member 634. The adjustable inner member 634 has a radially-oriented swingarm 636 having an axial end 638 swingably suspended about a swinging axis 640 and a circumferential end 642 integrally attached to a repositionable dam member 644 including an upstream face 646 having a peripheral leading edge 648 and a downstream face 650 having a peripheral trailing edge 652. The dam member 644 has a circular-arc-shaped trajectory centered at the swinging axis 640 and is movable along the trajectory. The dam member 644 has a slightly-rounded-bottom-closed-top-V-shaped cross-sectional profile normal to the circular-arc-shaped trajectory. The dam member 644 includes an integrally attached peripheral sealing member 654 comprising a flexible upstream peripheral ridge 656 including the peripheral leading edge 648 of the upstream face 646 of the dam member 644 and the trailing edge 652 of the downstream face 650 with a shallow recess 658 between them, forming a double-walled barrier 660 to improve the waterproof seal and better distribute the clamping force. The upstream face 646 of the dam member 644 is bowed outward toward the rear, which effectively lengthens the distance over which the dam member 644 can be repositioned for more accurate measurement of the smallest volumes.

The outer member 632 includes a flat, oval base 662 with a rounded upper edge 664 attached to a fixed wall 666 defining an interior space 668 and having an incurvate interior surface 670 comprising a curved channel 672 open at the top and at the back end and having a retaining wall 674 closing off the channel 672 at the front end. The curved channel 672 has a channel shape of uniform, slightly-rounded-bottom-V-shaped cross-sectional profile normal to a circular arc centered at the swinging axis 640 located above the curved channel 672. The interior surface 670 has a horizontal upper edge 675, which entails that the uniform cross-sectional profile of the channel shape is progressively truncated toward the upper edge 675 of the interior surface 670. The horizontal upper edge 675 is the full measure indicator, defining a horizontal upper boundary plane that must match the horizontal upper surface of the measured material (not shown) to effect an accurate measurement. Where the horizontal upper edge 674 and slightly-rounded-bottom-V-shaped channel 672 meet at the back end, a convenient pouring spout 676 is formed. An upper end 678 of an upside-down-L-shaped handle 680 extends from the upper center of the exterior surface of the retaining wall 674 forward, and a lower end 682 of the handle 680 attaches to the upper front surface of the base 662. Two vertical support members 684 are attached to the top surface 686 of the retaining wall 674 and extend upward above the channel 672 to include the swinging axis 640.

Figure 28:
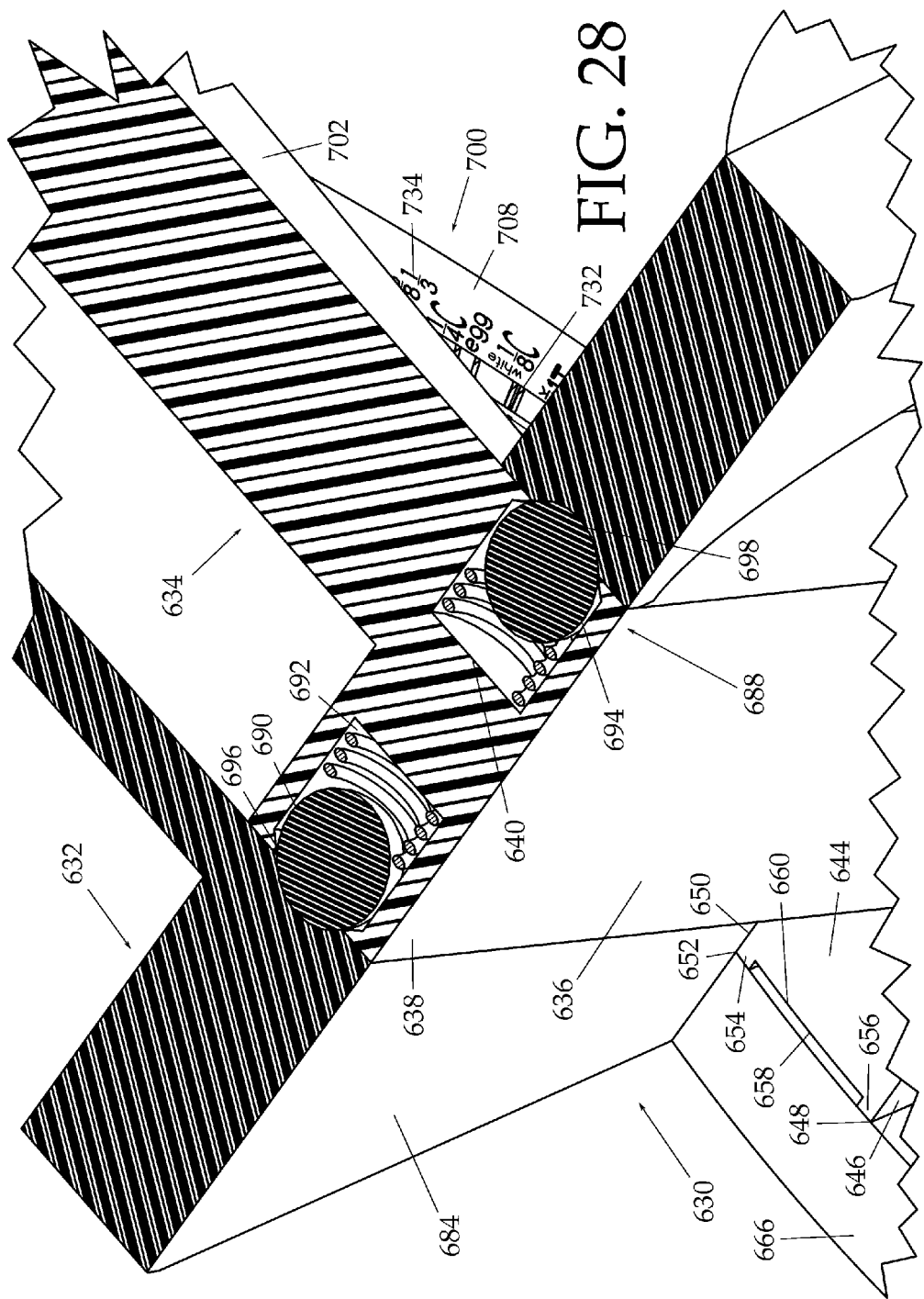
FIG. 28 is an upper back left cross-sectional perspective view of the embodiment of FIG. 26.

FIG. 28 shows a spring-loaded axle apparatus 688 that attaches the adjustable inner member 634 and the outer member 632 together, providing a radial clamping force necessary to maintain a watertight seal. The axial end 638 of the adjustable inner member 634 has a pair of spring-loaded ball plungers 690 of known type whose cylindrical bores 692 are centered along the swinging axis 640 such that the two balls 694 advance against an internal shoulder 696 such that they project a short distance laterally outward where they mate with and seat within two cup-shaped indentations 698 in the vertical support members 684. The spring-loaded axle apparatus 688 allows the adjustable inner member 634 to be removed from the outer member 632 by urging the balls 694 further into their bores 692 with a deliberate manual force.

Figure 31:
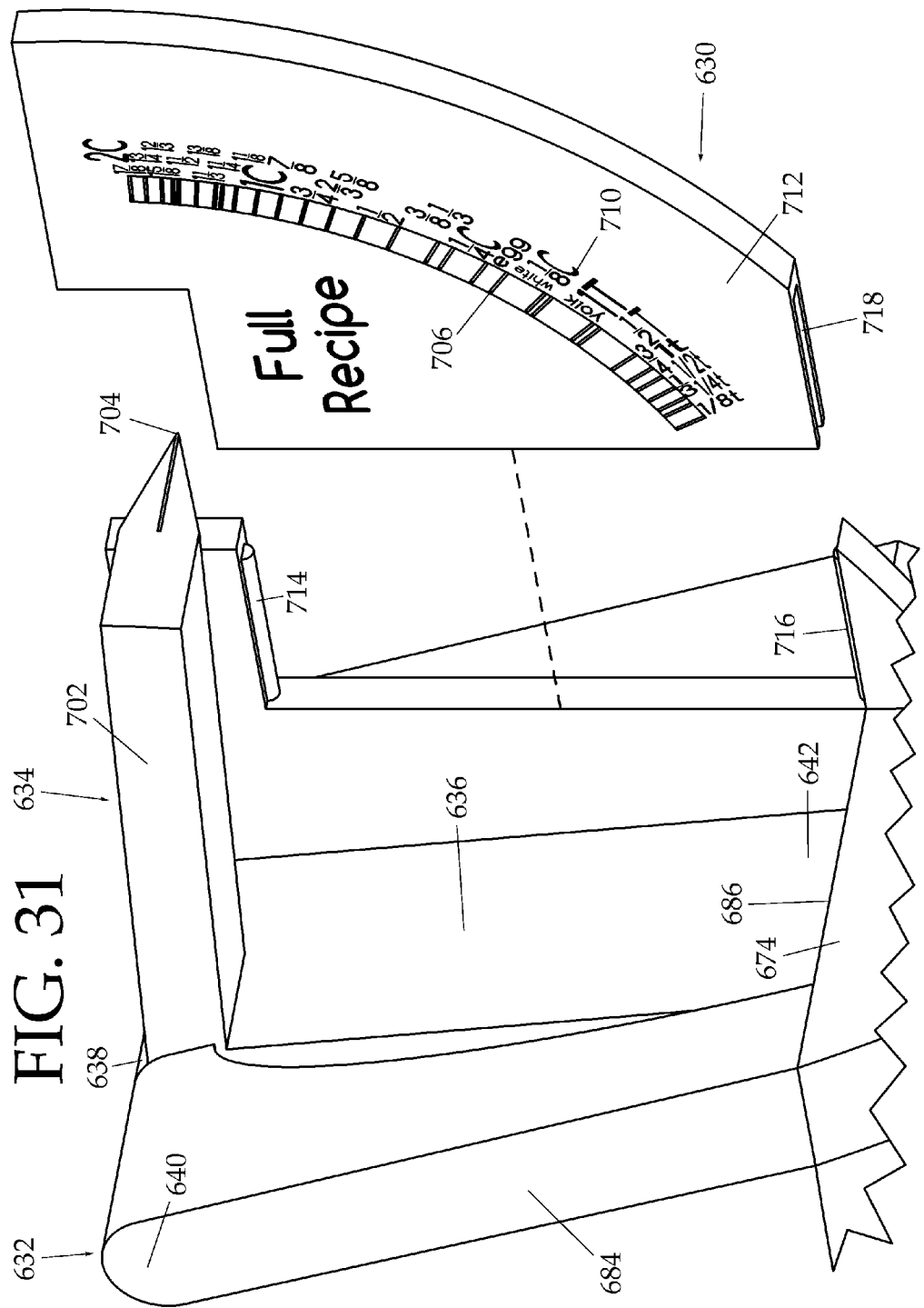
FIG. 31 is an exploded lower front left perspective view of another adjustable measuring assembly according to an aspect of the inventive subject matter.
Figure 32:
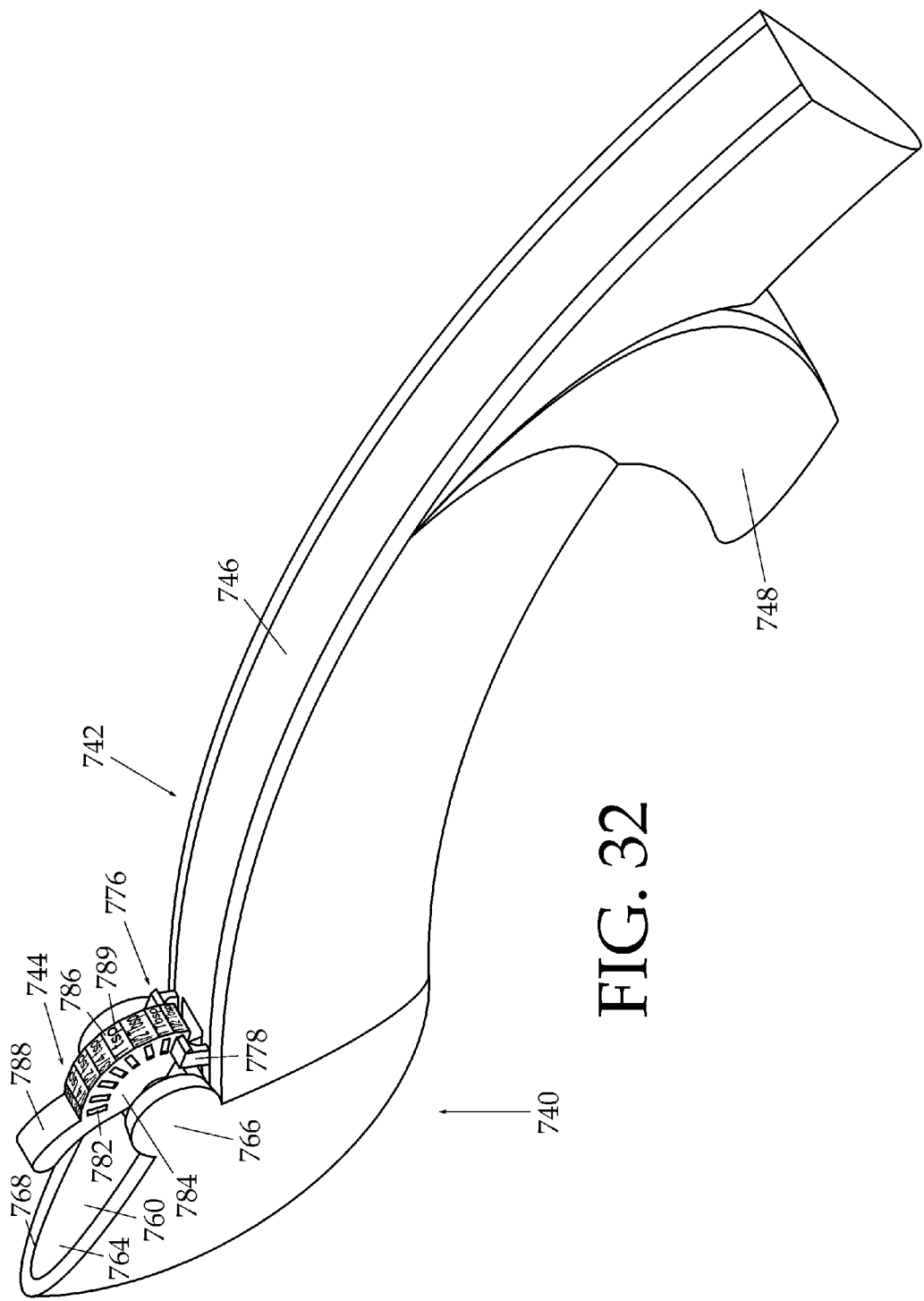
FIG. 32 is an upper front left perspective view of another adjustable measuring assembly according to an aspect of the inventive subject matter.
Figure 33:
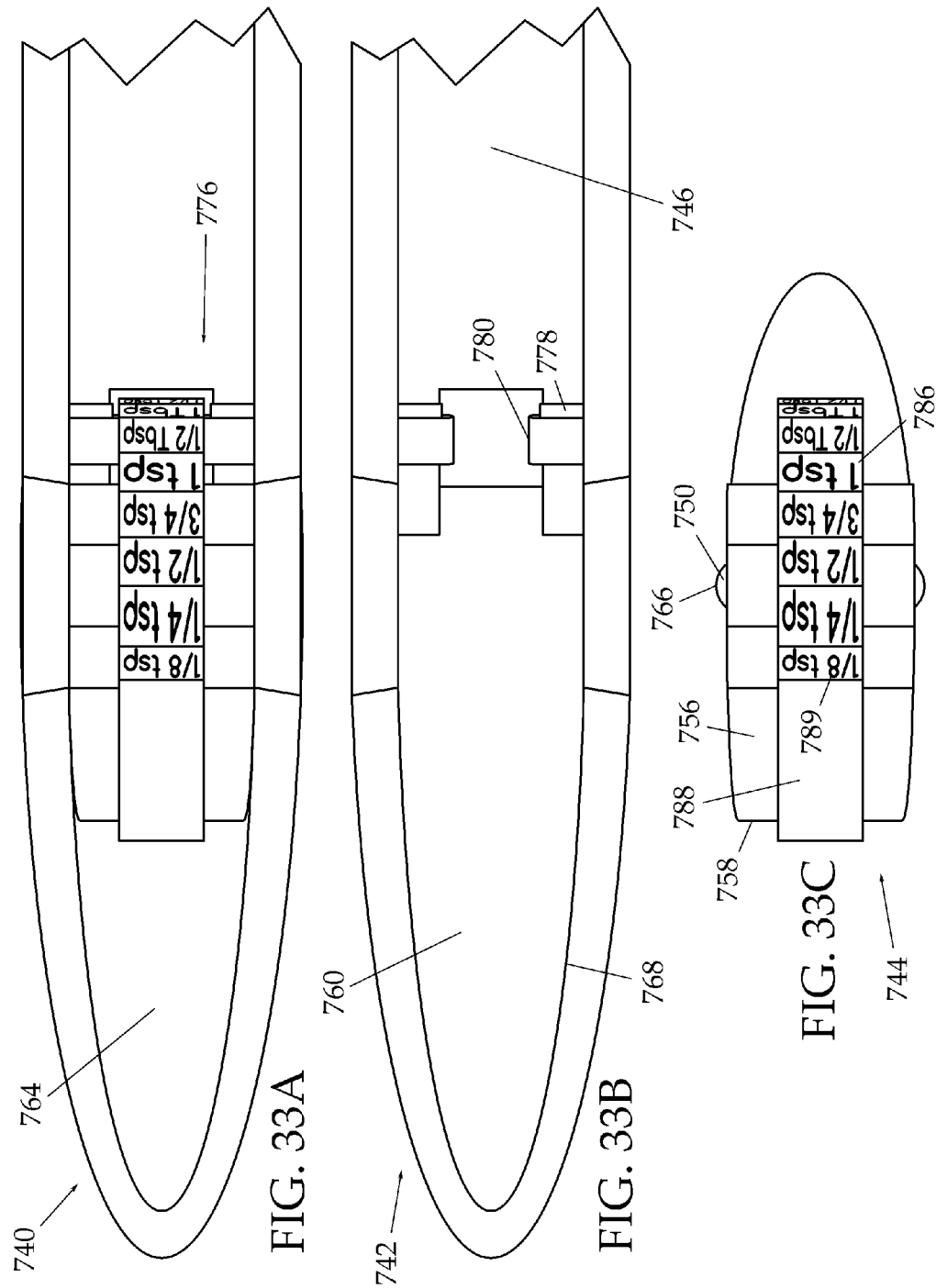
FIGS. 33A-C are top views of the embodiment of FIG. 32.

FIGS. 26 through 31 also show a measurement setting mechanism 700 including an indicium indicator arm 702 extending forward from the spring-loaded axle apparatus 688 at a right angle to the swingarm 636. The indicium indicator arm 702 includes a chisel-shaped pointer 704. In FIG. 31 the pointer 704 is shown to be fixedly attached to the swingarm 636. The chisel-shaped pointer 704 is able to mate with any one of a series of indentations 706 located along a circular-arc-shaped plate 708 centered at the swinging axis 640 and extending forward as an extension of the right vertical support member 684. A measurement indicium 710 between ⅛ teaspoon and 2 cups corresponds with each indentation. FIG. 31 shows that the circular arc shaped plate 708 can also have a removable member 712 that is replaceable with a corresponding part permitting a different recipe conversion. Two opposing protuberances 714 form a pair of tracks 716 on the upper and lower inner surfaces of the cutout portion of the circular-arc-shaped plate 708 that mate with indentations 718 in the top and bottom surfaces of the removable member 712 to hold it in place.

FIGS. 26 and 27 and FIGS. 29 through 30B show a second variation of a repositionable pointer 720 that is able to be slidably adjusted into two positions corresponding to two different recipe conversion factors, a full recipe and an eighth of a recipe. Two opposing, radially oriented protuberant rails 722 form a sliding track 724 passing through the circumferential end 726 of the indicium indicator arm 702 that slidably mates with opposing indentations 728 in the sides of the repositionable pointer 720. The chisel point 730 is able to mate with any one of the indentations 732 of either series of recipe conversion indicia 734 imprinted upon the circular arc shaped plate 708. Only two recipe conversion factors are shown for clarity. More series of recipe conversion indicia may be included if desired.

Figure 26:
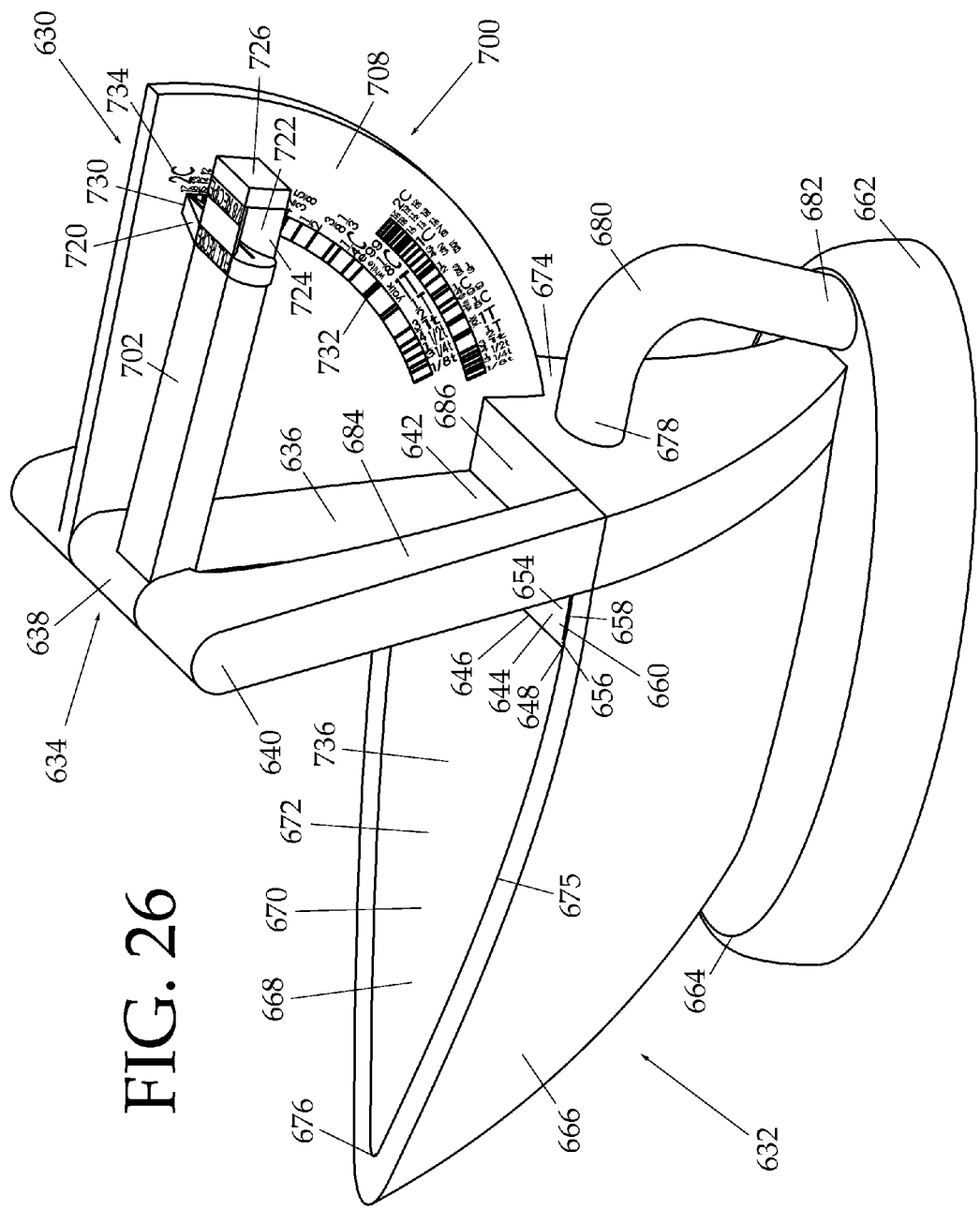
FIG. 26 is an upper front left perspective view of another adjustable measuring assembly according to an aspect of the inventive subject matter.
Figure 27:
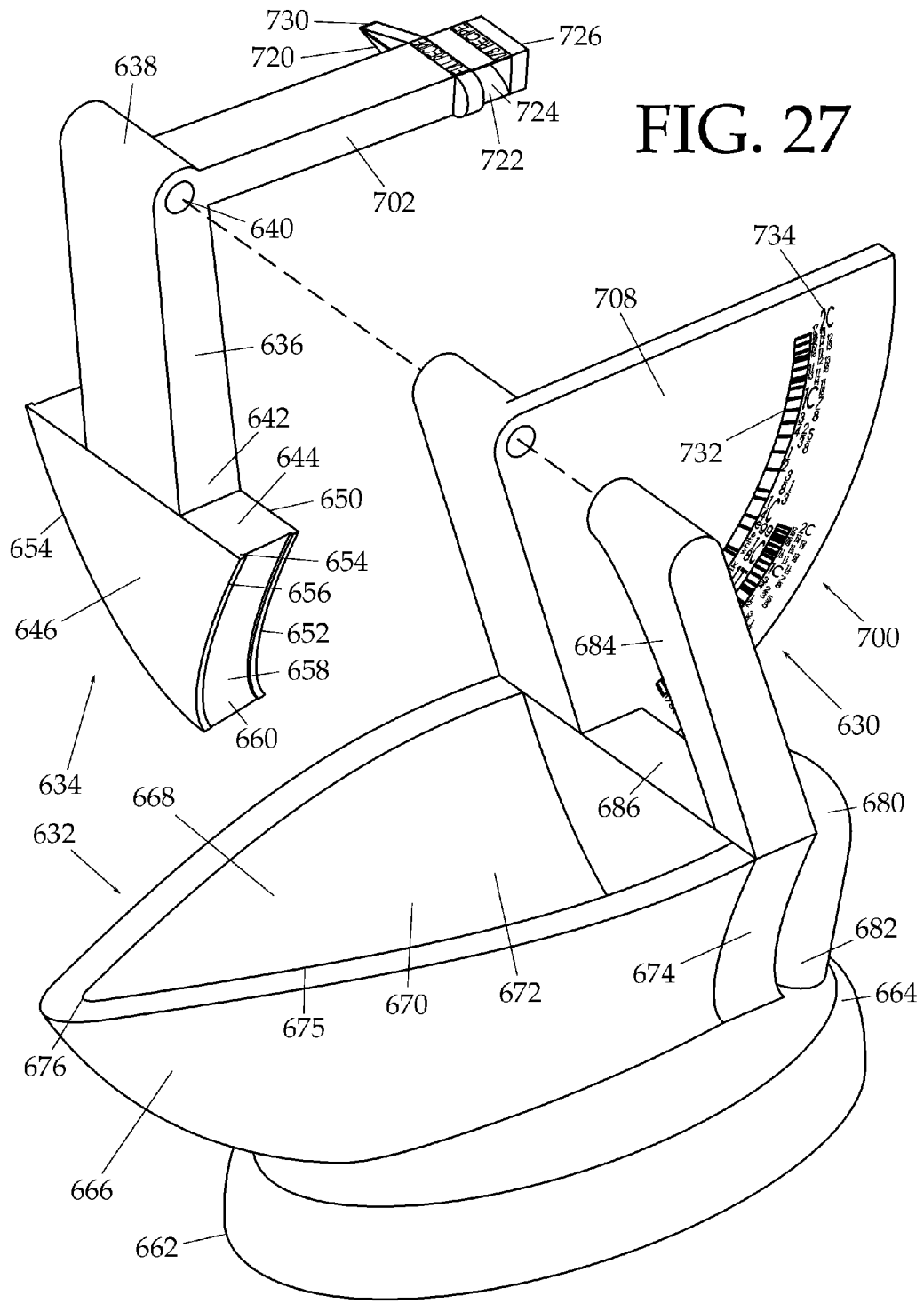
FIG. 27 is an exploded upper back left perspective view of the embodiment of FIG. 26.
Figure 29:
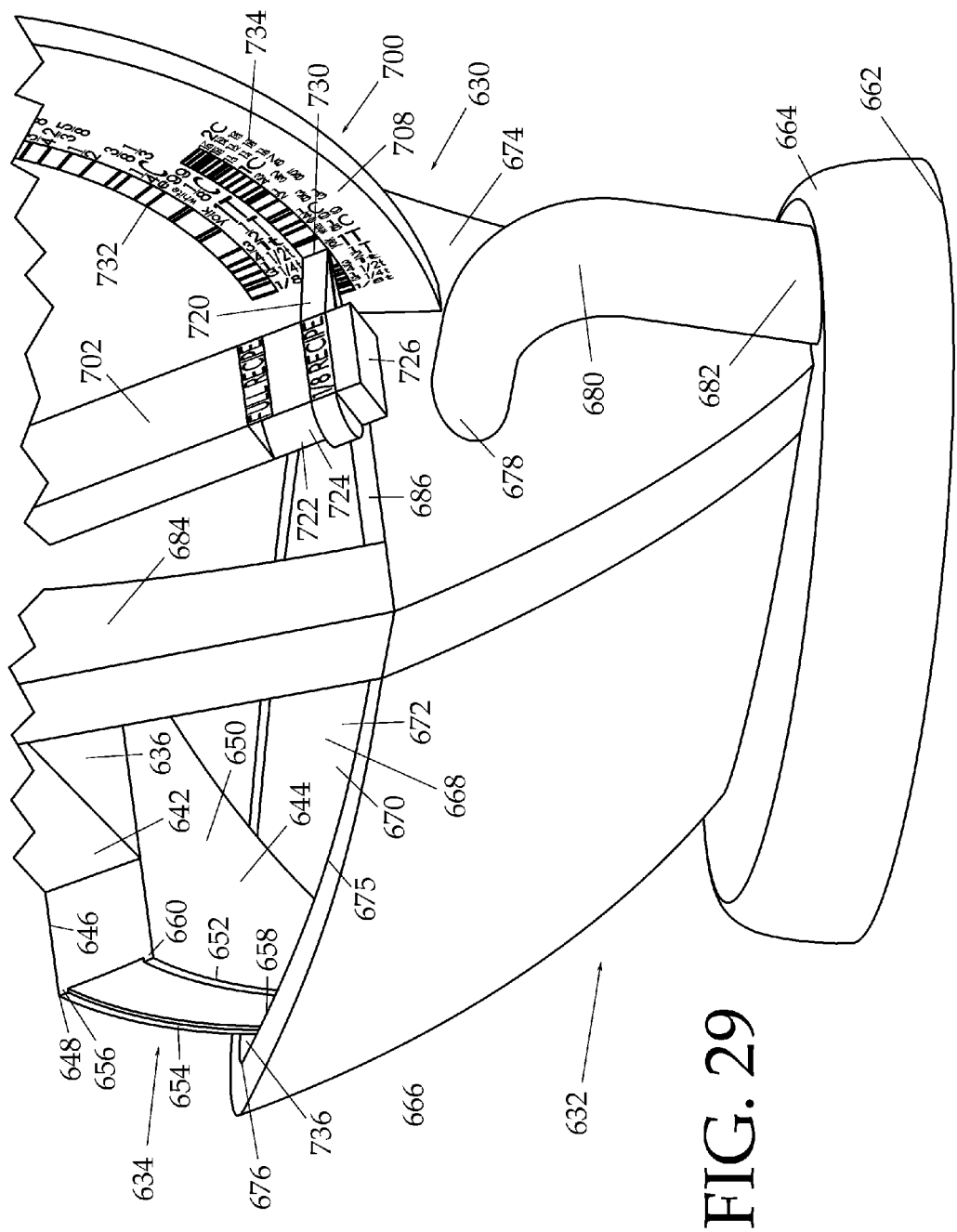
FIG. 29 is an upper front left perspective view of the embodiment of FIG. 26.
Figure 30:
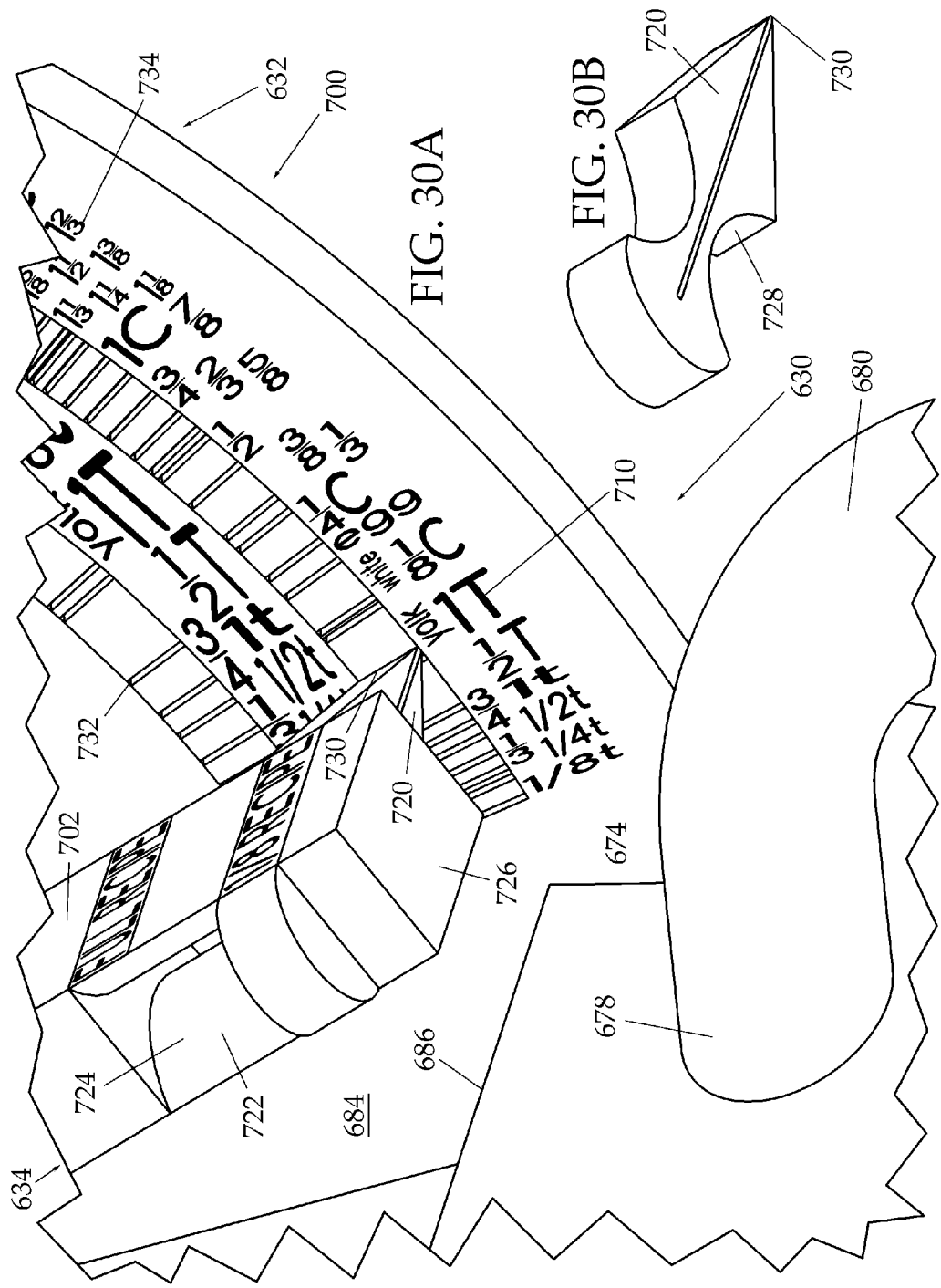
FIG. 30A is a lower front left perspective view of the embodiment of FIG. 26.
FIG. 30B is a lower front left perspective view of a detail of the embodiment of FIG. 26 showing the adjustable pointer removed from the adjustable inner member.

FIGS. 26 and 29 also show a measuring chamber of variable volume 736 as it would appear with two different positionings of the repositionable dam member 644. In FIG. 26 the measuring chamber 736 is set for measuring 2 cups for a full recipe. In FIG. 29, the measuring chamber 736 is set to measure an egg yolk for an eighth of a recipe.

Figure 34:
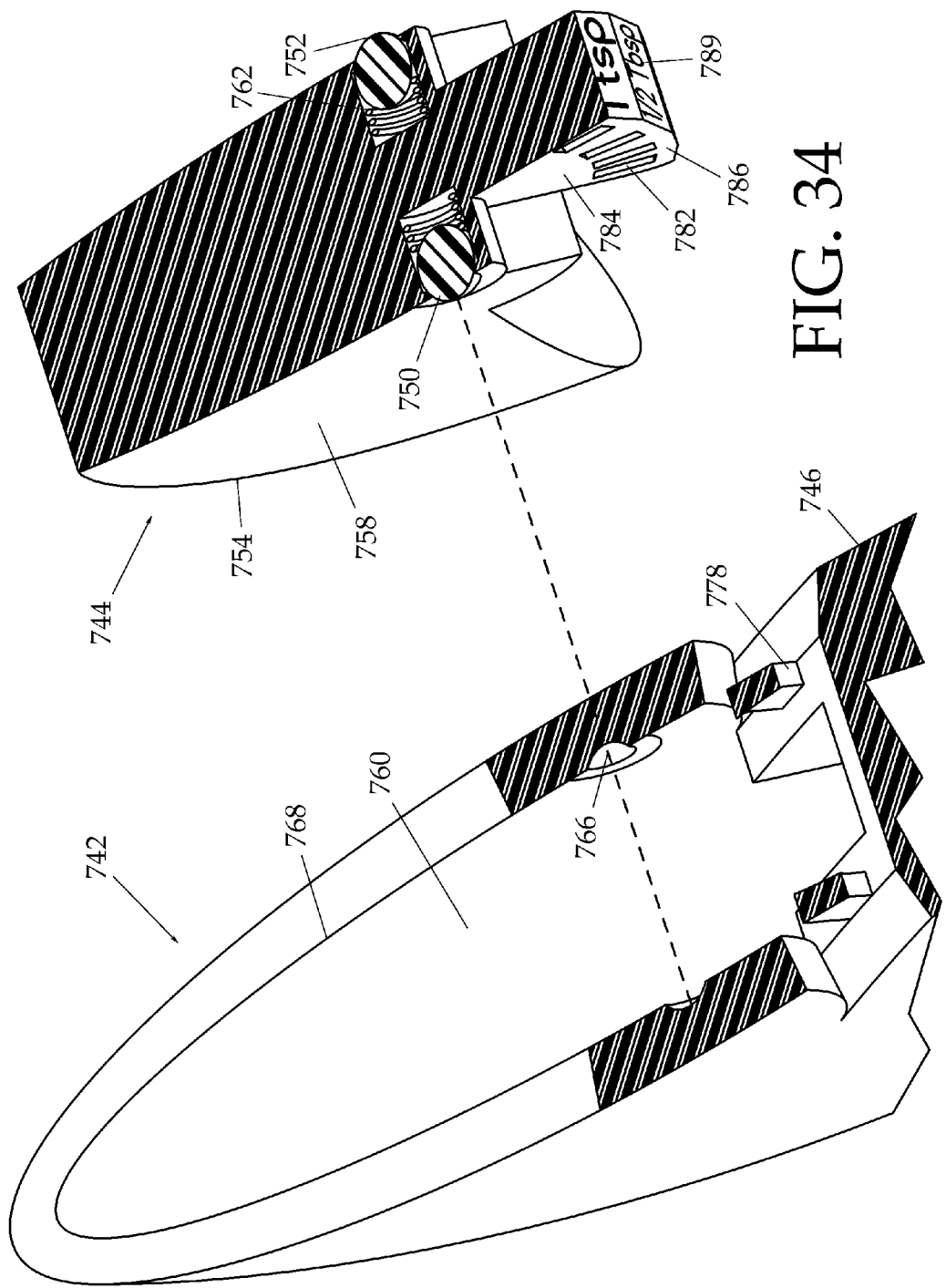
FIG. 34 is an upper front left exploded cross-sectional perspective view of the embodiment of FIG. 32.

Referring now to aspects of the invention in more detail, FIGS. 32 through 36F show an adjustable measuring assembly 740 according to an aspect of the inventive subject matter having an outer member 742 and an adjustable inner member 744. The outer member 742 is shown generally to have a spoon shape including a handle 746 and a wide-stanced, stabilizing, horizontally leveling foot 748. The adjustable inner member 744 and the outer member 742 are attached to one another using the same spring-loaded axle apparatus 688 as that described above and clearly shown in the cross-sectional exploded view of FIG. 28 of the embodiment of the invention of FIGS. 26 through 31. The same mechanism is also shown in FIG. 34, namely: a pair of inset ball plungers 750 forming a releasable axle 752.

Figure 35:
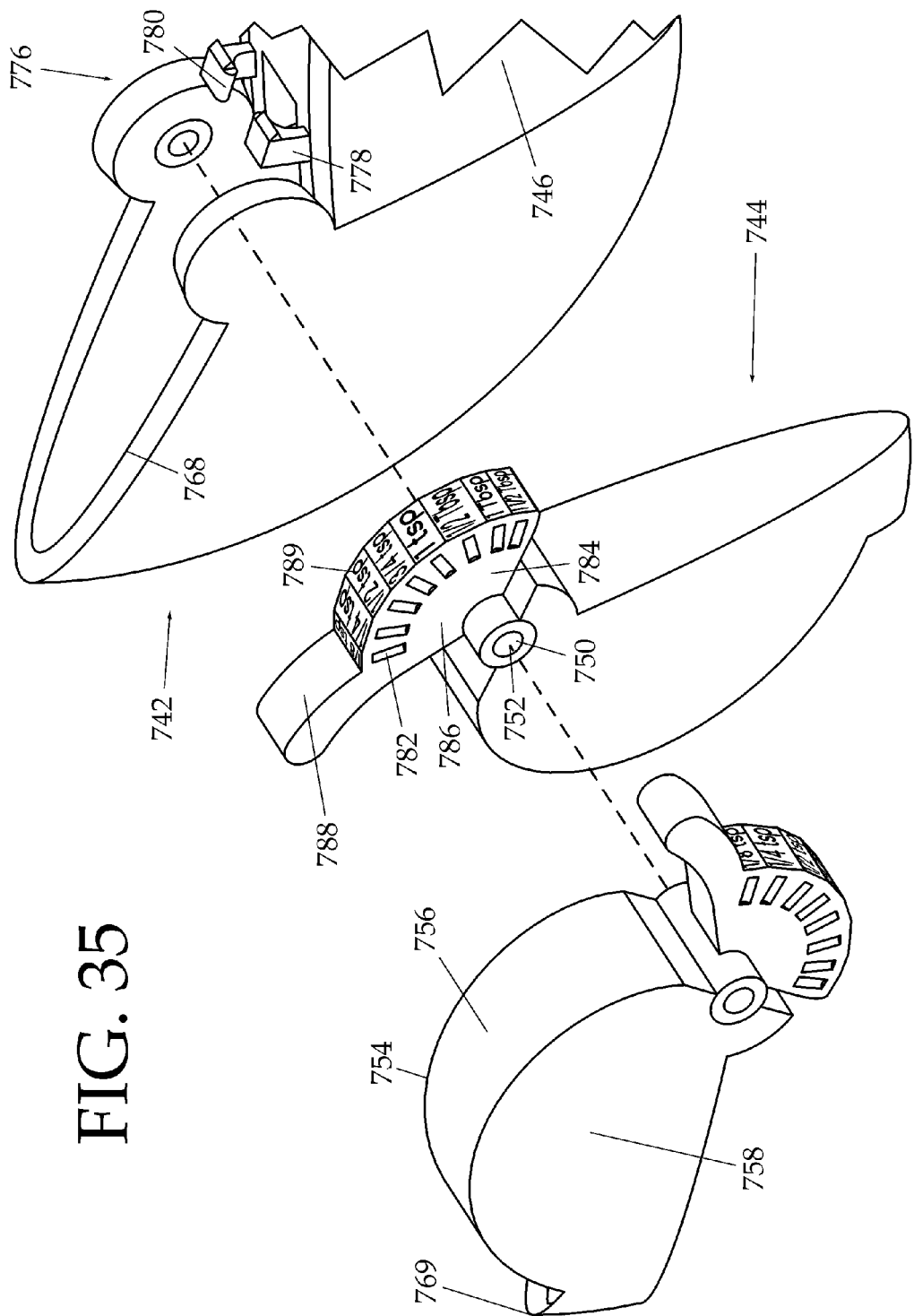
FIG. 35 is an upper front left exploded perspective view of the embodiment of FIG. 32.
Figure 36:
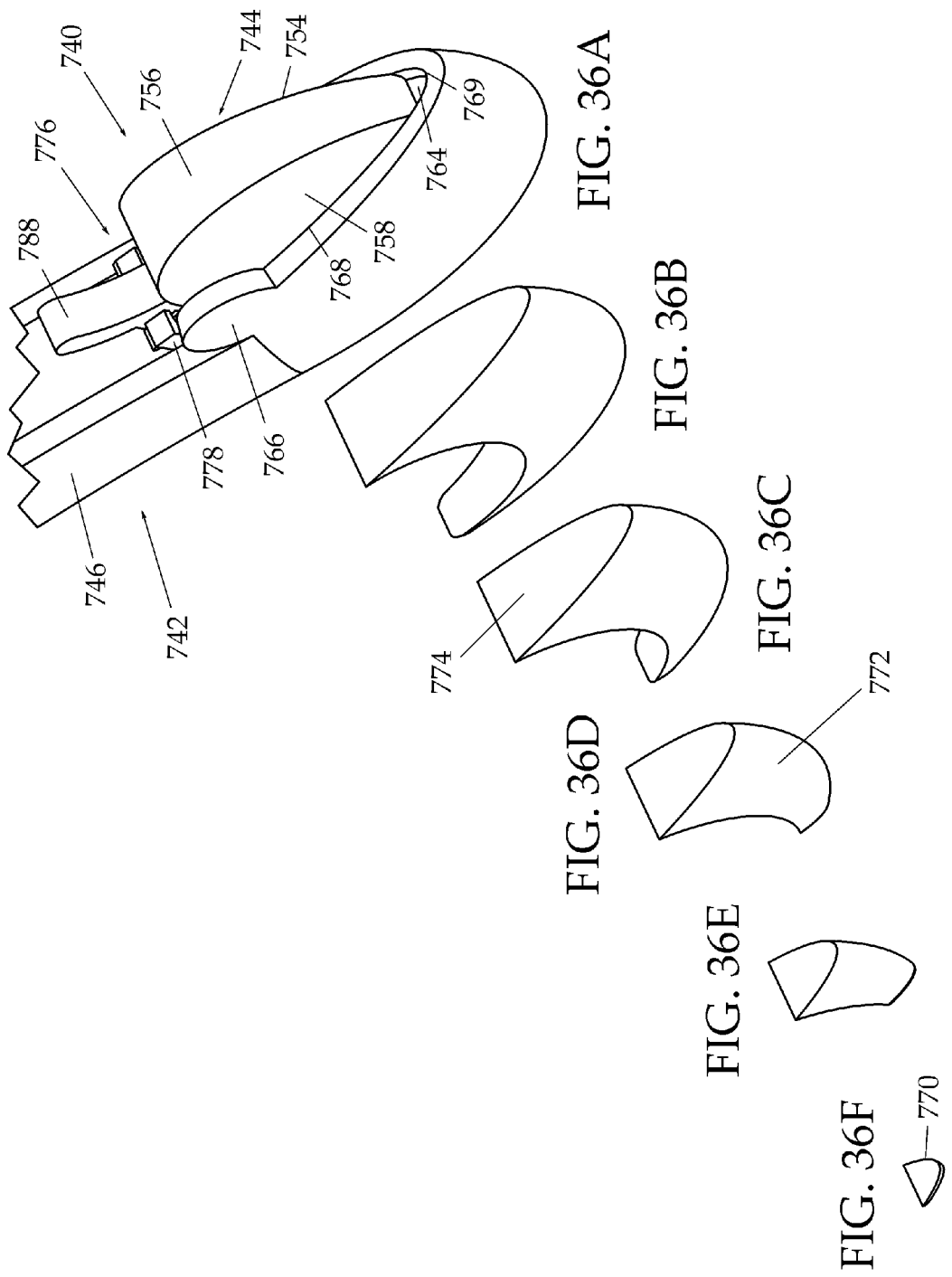
FIGS. 36A-F are semi-schematic upper back right perspective views of the embodiment of FIG. 32 showing a series of shapes of volumes of measured material.
Figure 37:
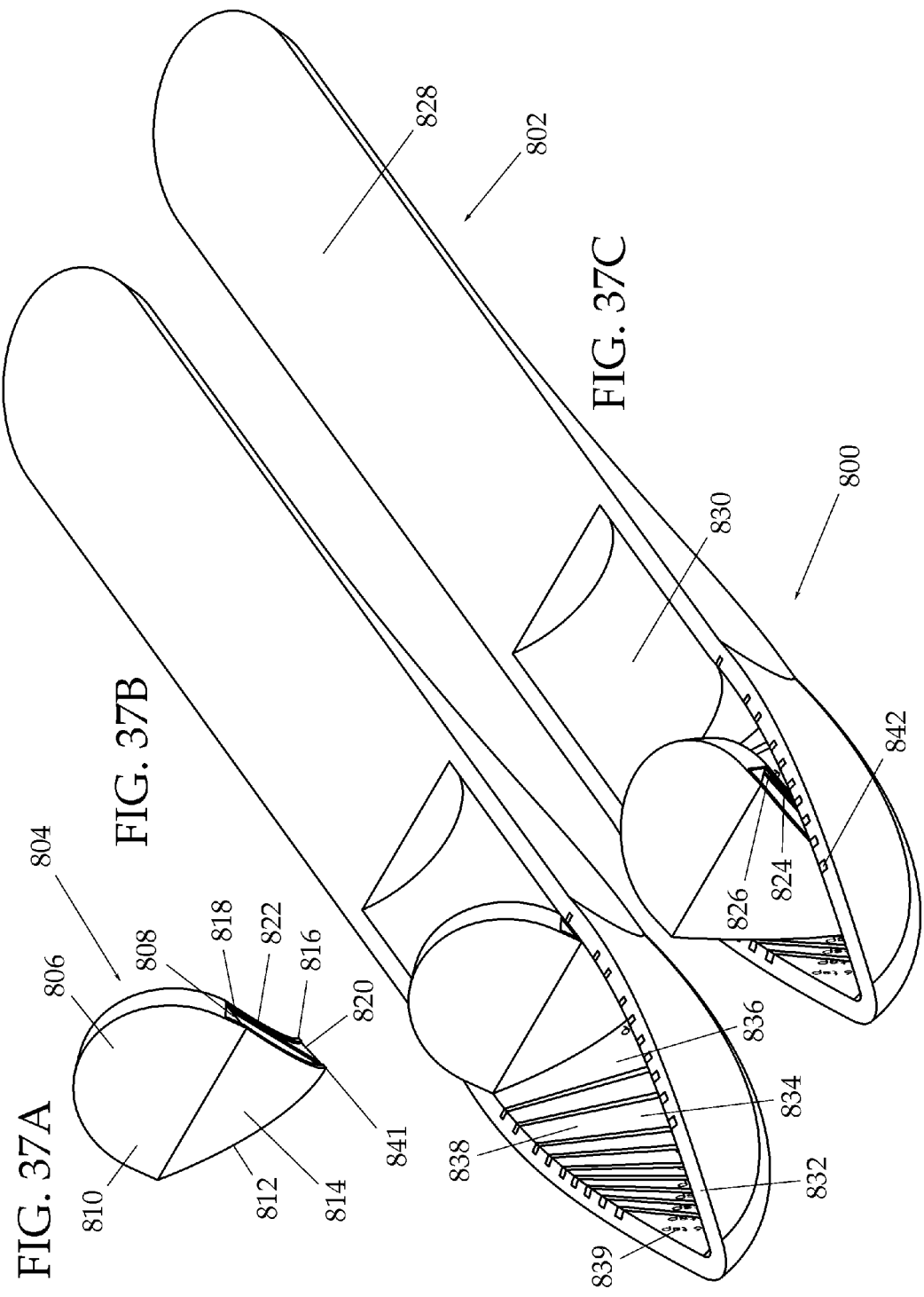
FIGS. 37A-C are upper back left perspective views of another adjustable measuring assembly according to an aspect of the inventive subject matter.
Figure 38:
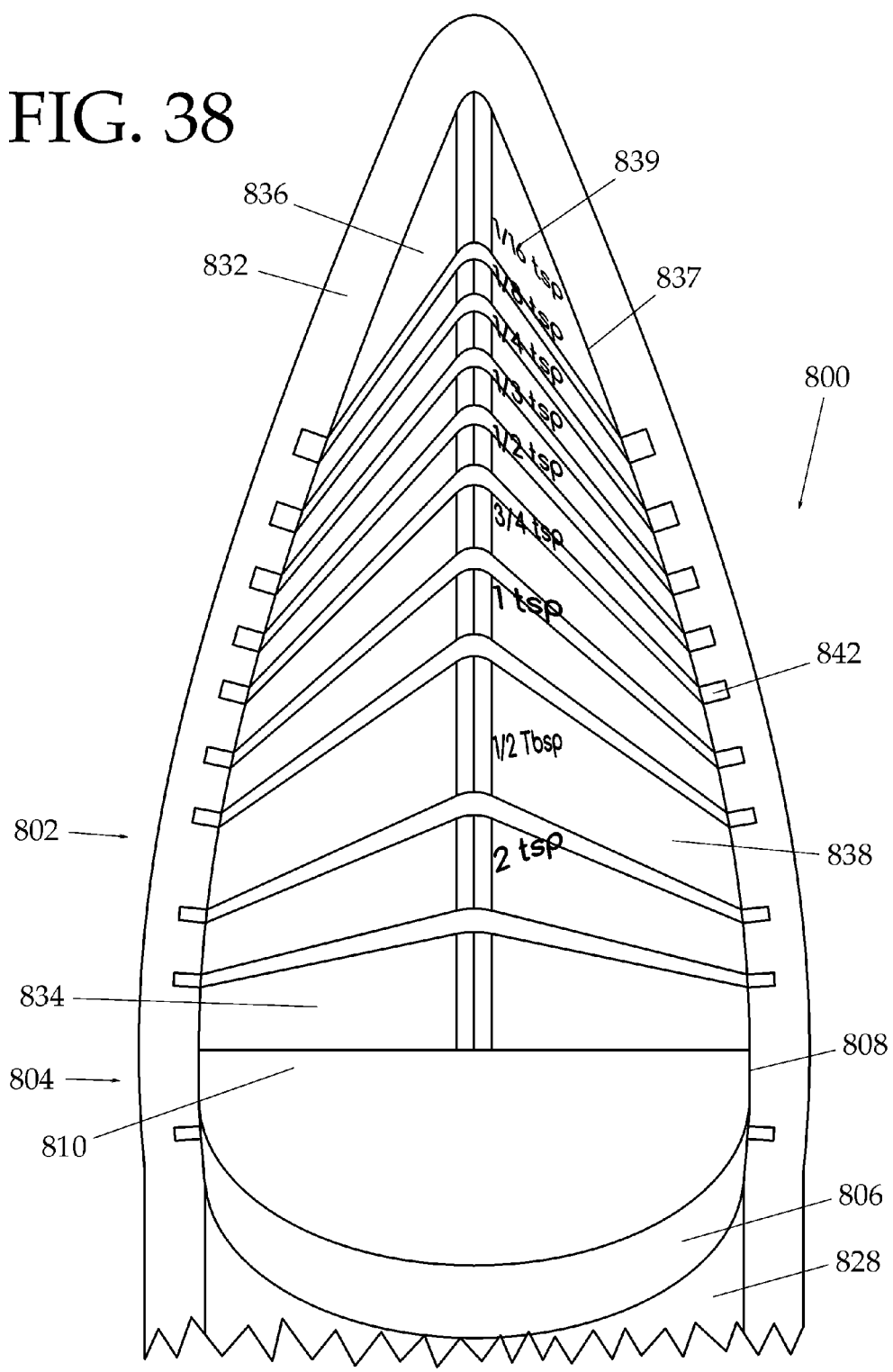
FIG. 38 is a top view of the embodiment of FIGS. 37A-C.

FIGS. 33A through 36A show that the tight-fitting peripheral leading edge 754 of the upstream face 756 of the repositionable dam member 758 of the adjustable inner member 744 and the incurvate interior surface 760 of the outer member 742 are attached to form a measuring assembly 740 by the radial clamping force exerted by the compression springs 762 of the ball plungers 750, forming a measuring chamber of variable volume 764. FIG. 33B shows the outer member 742 with almost the entire interior surface 744 visible, and FIG. 33C shows the adjustable inner member 744, including the protruding portions of the ball plungers 750. FIG. 35 shows an exploded view of the outer member 742 and two extreme positionings of the adjustable inner member 744, the leftmost adjustable inner member set to measure ⅛ teaspoon and the rightmost set to measure 1½ tablespoons. No particular peripheral sealing member is shown. It may be the case that the adjustable measuring utensil is only to be used with dry ingredients. If a watertight measuring utensil is desired, the peripheral leading edge 754 of the upstream face 756 of the dam member 758 can be made of a flexible material and can be enlarged sufficiently so as to tightly mate with the interior surface 760 of the outer member 742.

Although in this embodiment the axis of rotation 766 is level with the horizontal upper edge 768, in combination with the coiled-nautilus-like configuration of the upstream face 756 of the dam member 758 as shown, the same operative effect is produced as in the embodiment of the invention of FIGS. 26 through 31. As progressively larger sections of the upstream face 756 are removed from participation in the formation of the measuring chamber of variable volume 764, more precise measurements of the smallest increments are able to be made. FIG. 36A shows the measuring assembly 740 formed when the dam member 758 is fitted into the incurvate interior surface 760 of the outer member 742 at the smallest setting, ⅛ teaspoon, and also shows the reference point of greatest depth 769 (also shown in FIG. 35) which is the lowest point on the peripheral leading edge 754 of the dam member 758. FIG. 36F is a semi-schematic showing the shape of a volume of material 770 being measured at that smallest setting. FIG. 36B is a semi-schematic showing the shape of a volume of material 772 being measured at the largest setting of 1½ tablespoons. The series of five horizontal surfaces 774 shown in FIGS. 36B-F demonstrate that both of the surfaces' 774 linear dimensions (width and length) are altered at each setting, as is the height (here approximated by the changing angular displacement of the measuring chamber of variable volume 764) distinguishing this aspect of the inventive subject matter from prior art adjustable measuring utensils in which only a single linear dimension is altered.

The detent mechanism 776 comprises two opposed, inwardly facing, inwardly bent, flexible indicium indicator arms 778 extending upwardly from the back end of the handle 746, the two arms 778 terminating in a pair of rounded, chisel-shaped pointers 780 poised to mate with any one of eight pairs of indentations 782 located opposite one another on opposing parallel lateral faces 784 of a circular-arc-shaped plate 786 extending upward and forward from the axle 752 and integrally attached to the adjustable inner member 744. A small, curved handle 788 graspable by the thumb and index finger of the user extends upward and backward from the circular-arc-shaped plate 786, allowing the user to reposition the adjustable inner member 744 to any one of eight positionings in order to make any one of the following measurements: ⅛ teaspoon, ¼ teaspoon, ½ teaspoon, ¾ teaspoon, 1 teaspoon, ½ tablespoon, 1 tablespoon, and 1½ tablespoons, as indicated by the measurement indicia 789.

Referring now to aspects of the invention in more detail, FIGS. 37A through 41 show an adjustable measuring assembly 800 according to an aspect of the inventive subject matter having an outer member 802 and an adjustable inner member 804 attached to form the assembly 800 by the force of magnetic attraction. The adjustable inner member 804 has a small, semicircular finger grip 806 graspable by the thumb and index finger of the user that extends upward and backward from the upper surface 808 of a repositionable dam member 810. The dam member 810 has a generally rounded-bottom-closed-top-V-shaped cross-sectional profile normal to its circular-arc-shaped trajectory. The peripheral leading edge 812 of the upstream face 814 and the peripheral trailing edge 816 of the downstream face 818 of the dam member 810 are made of a flexible, waterproof material. A shallow recess 820 between the upstream and downstream faces forms a double-walled peripheral sealing member 822. A thin, flat, permanent magnet plate 824 embedded in the dam member 810 has lateral edges 826 whose lateral dimensions are constrained to lie well within the shallow recess 820, so that the permanent magnet plate 824 is slightly removed from direct contact with the outer member 802.

The outer member 802 is shown generally to have a spoon shape with a handle 828 having an indentation 830 allowing the user's thumb or index finger access to grasp the small, semicircular finger grip 806 of the adjustable inner member 804. The outer member 802 further comprises a fixed wall 832 defining an interior space 834 and having an incurvate interior surface 836 having a rounded-bottom-closed-top-V-shaped cross-sectional profile normal to the circular-arc-shaped trajectory of the repositionable dam member 810, the interior surface having a horizontal upper edge 837 that functions as a full measure indicator.

FIG. 37A shows the outer member 802 and the adjustable inner member 804 assembled in position to measure ⅓ teaspoon. FIG. 37B shows the outer member 802 and the adjustable inner member 804 repositioned to form a measuring chamber of variable volume 838 here set to measure 2 teaspoons. As shown, the measuring assembly 800 has the following measurement indicia 839: 1/16 teaspoon ⅛ teaspoon, ¼ teaspoon, ⅓ teaspoon, ½ teaspoon, ¾ teaspoon, 1 teaspoon, ½ tablespoon, and 2 teaspoons. FIG. 37C shows the adjustable inner member 804 removed from the outer member 802.

Figure 39:
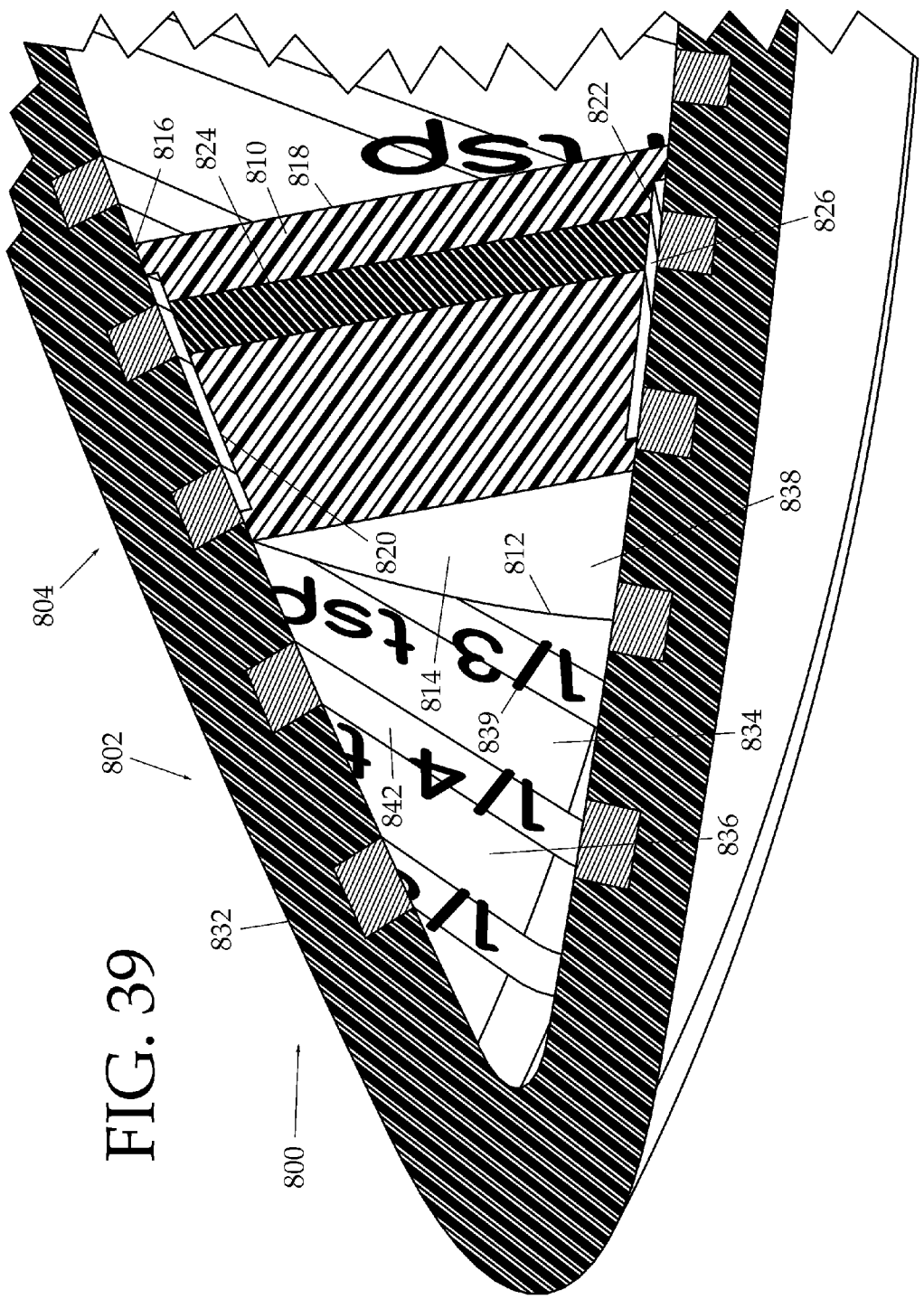
FIG. 39 is an upper back left cross-sectional perspective view of the embodiment of FIGS. 37A-C.
Figure 40:
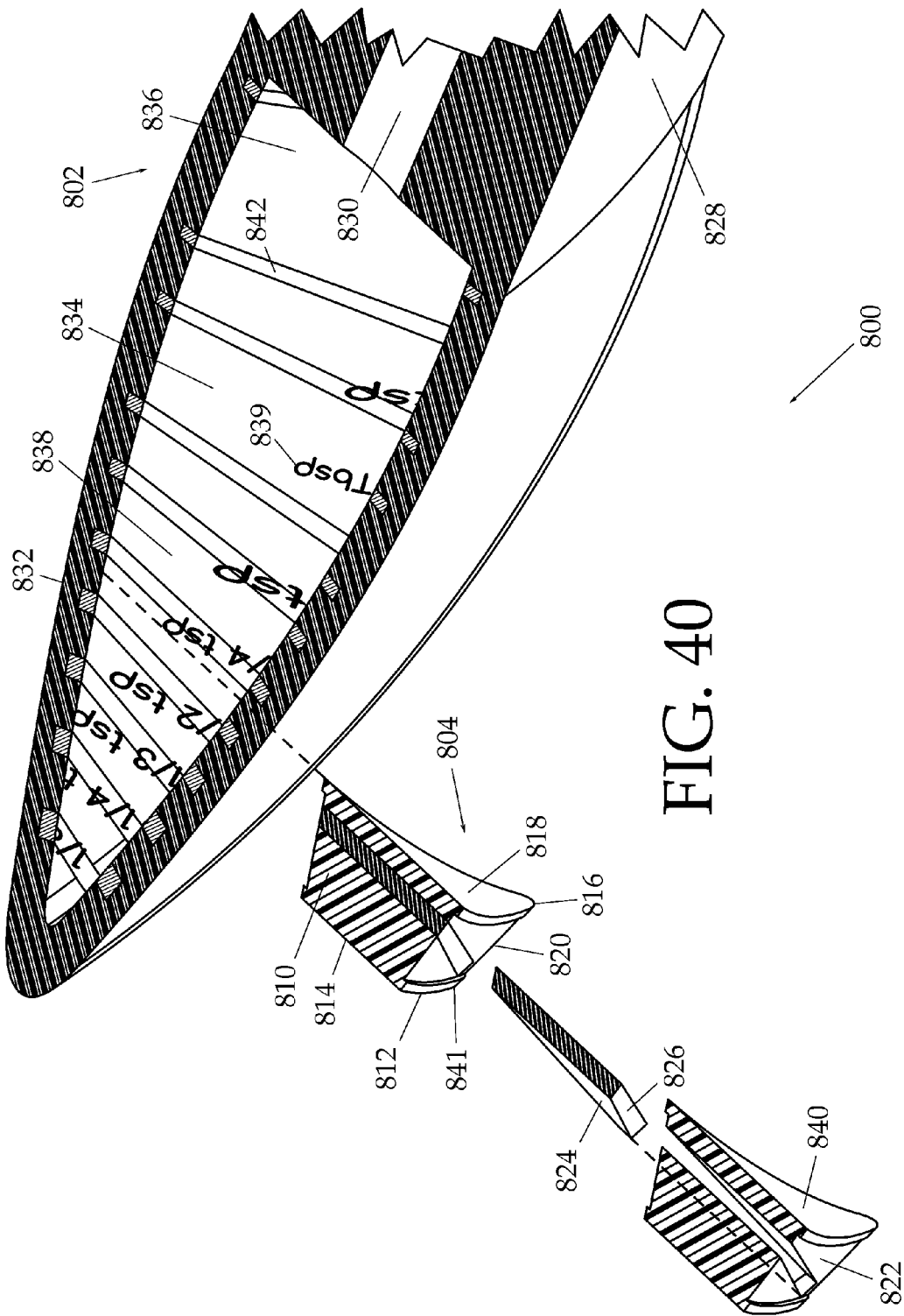
FIG. 40 is an exploded upper front left cross-sectional perspective view of the embodiment of FIGS. 37A-C.
Figure 41:
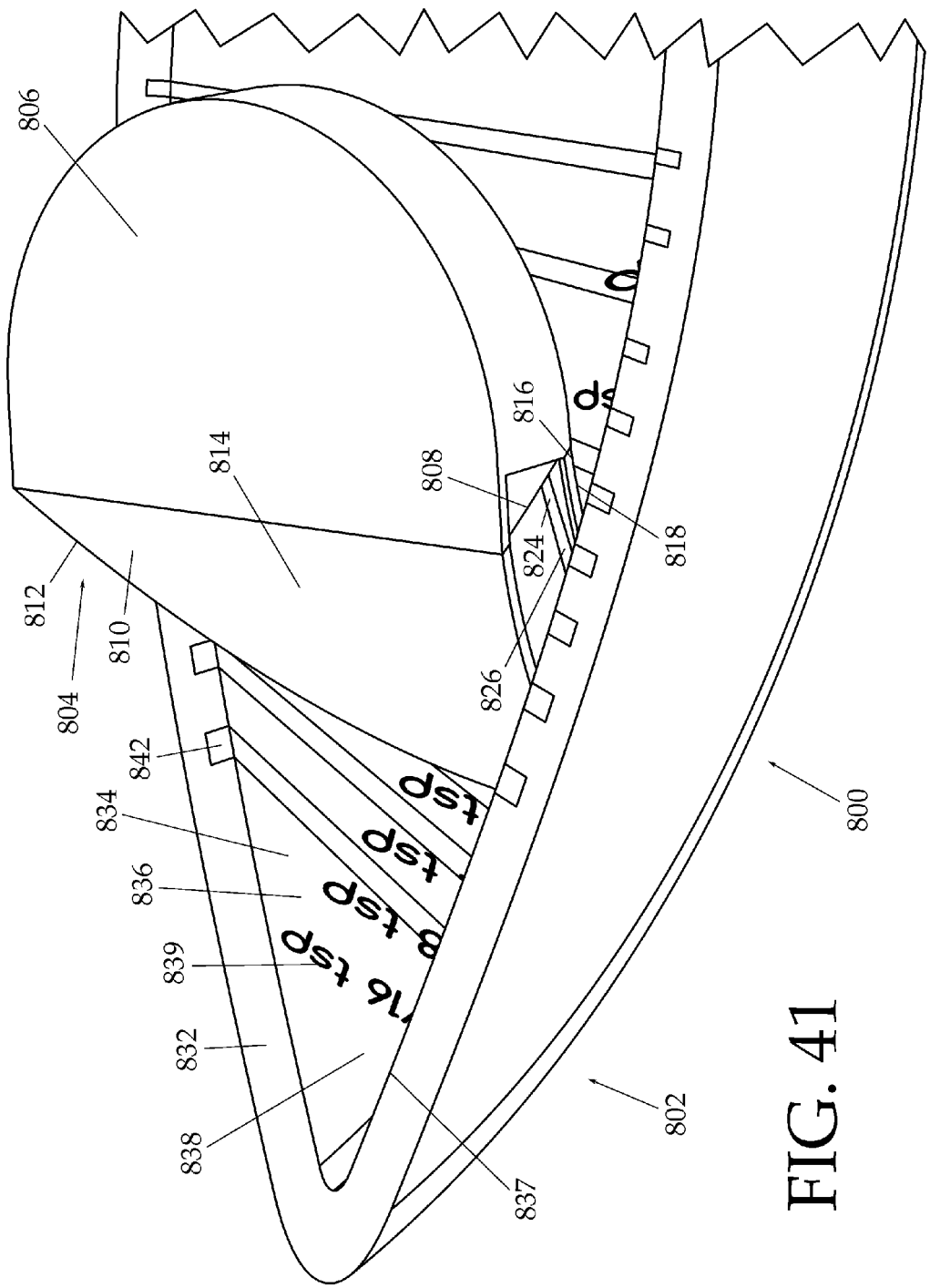
FIG. 41 is an upper back left perspective view of the embodiment of FIGS. 37A-C.

FIGS. 39 and 40 show the measuring assembly 800 in cross-section, positioned to measure ⅓ teaspoon, as shown in FIG. 39 where the indicium 839 "⅓ tsp" appears just behind the upstream face 814 of the dam member 810, imprinted upon the interior surface 836 of the outer member 802. FIG. 40 shows an exploded view of the bottom tip 840 of the dam member 810 with a thin, permanent magnet plate 824 embedded within the dam member 810; the thin, permanent magnet plate 824 shown separately from the dam member 810, and the bottom tip 840 of the dam member 810 shown separately from the magnet plate 824. At the center point of the peripheral leading edge is a reference point of greatest depth 841, which is also shown in FIG. 37C. Also shown are a series of ten thin, stainless steel, rounded-bottom-V-shaped ribs 842 having a rectangular cross-sectional profile and embedded at precise locations into the interior surface 836 of the fixed wall 832 of the outer member 802 to which the thin, permanent magnet plate 824 within the repositionable dam member 810 is attracted. The remainder of the interior surface 836 is made of a nonmagnetic, relatively inflexible, food safe material. The attractive magnetic force between the inner and outer members 804, 802 achieves the following aims: it precisely positions the dam member 810, allowing a more precise volumetric measurement to be made; it distributes a radially oriented magnetic force onto the flexible peripheral leading edge 812 of the upstream face 814 and the peripheral trailing edge 816 of the downstream face 818, further stabilizing the dam member 810; it permits the lateral edges 826 of the permanent magnet plate 824 to be recessed between the upstream and downstream faces 814, 818, where they will not directly contact and injuriously scrape the interior surface 836 of the outer member 802; and it allows the dam member 810 to be easily repositioned by the user grasping and twisting the small, semicircular finger grip 806, due to the mechanical advantage afforded the user by the relatively long lever arm overcoming the powerful but steeply attenuating range of the magnetic field's force.

Figure 42:
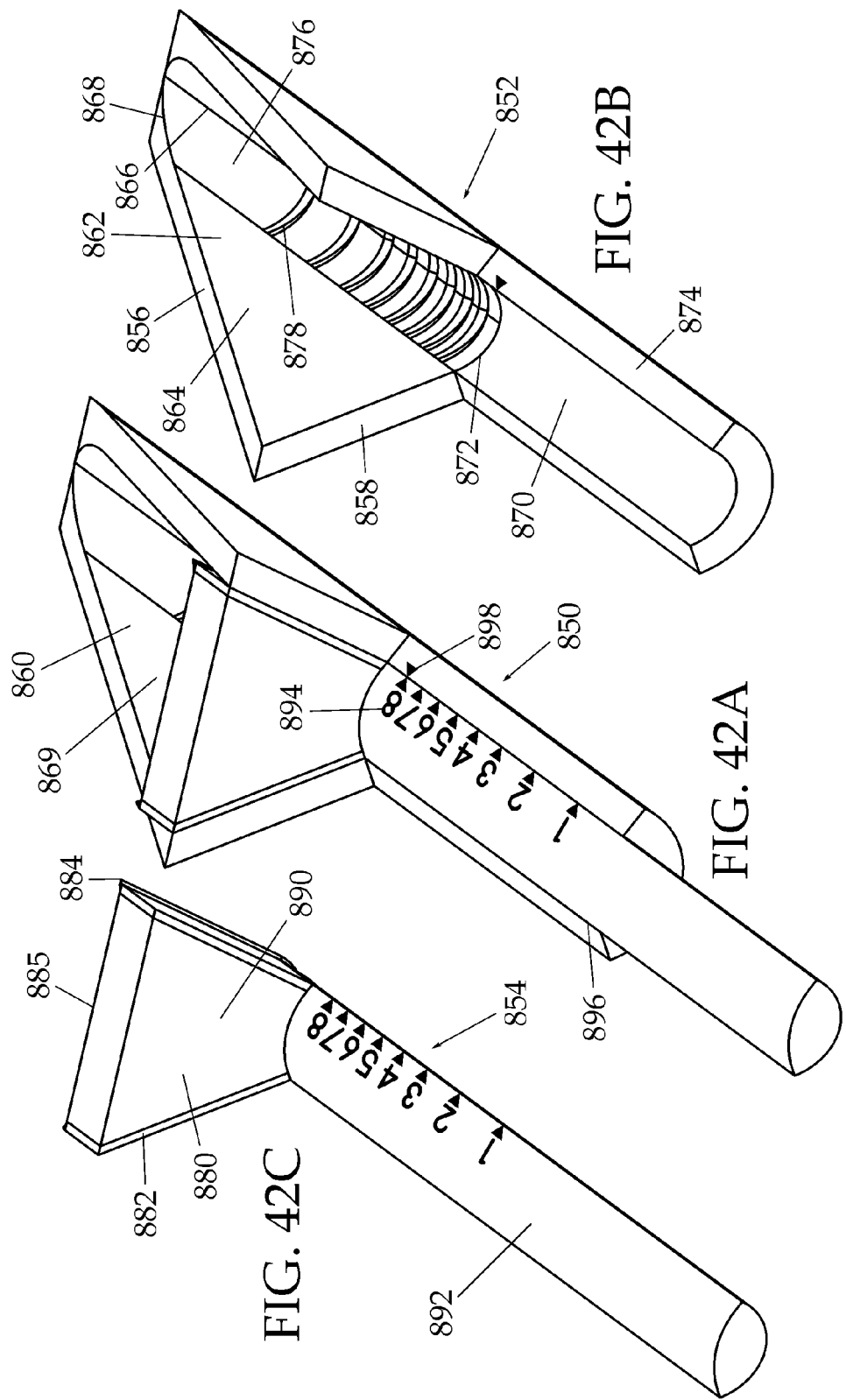
FIGS. 42A-C are upper front right perspective views of another adjustable measuring assembly according to an aspect of the inventive subject matter.
Figure 43:
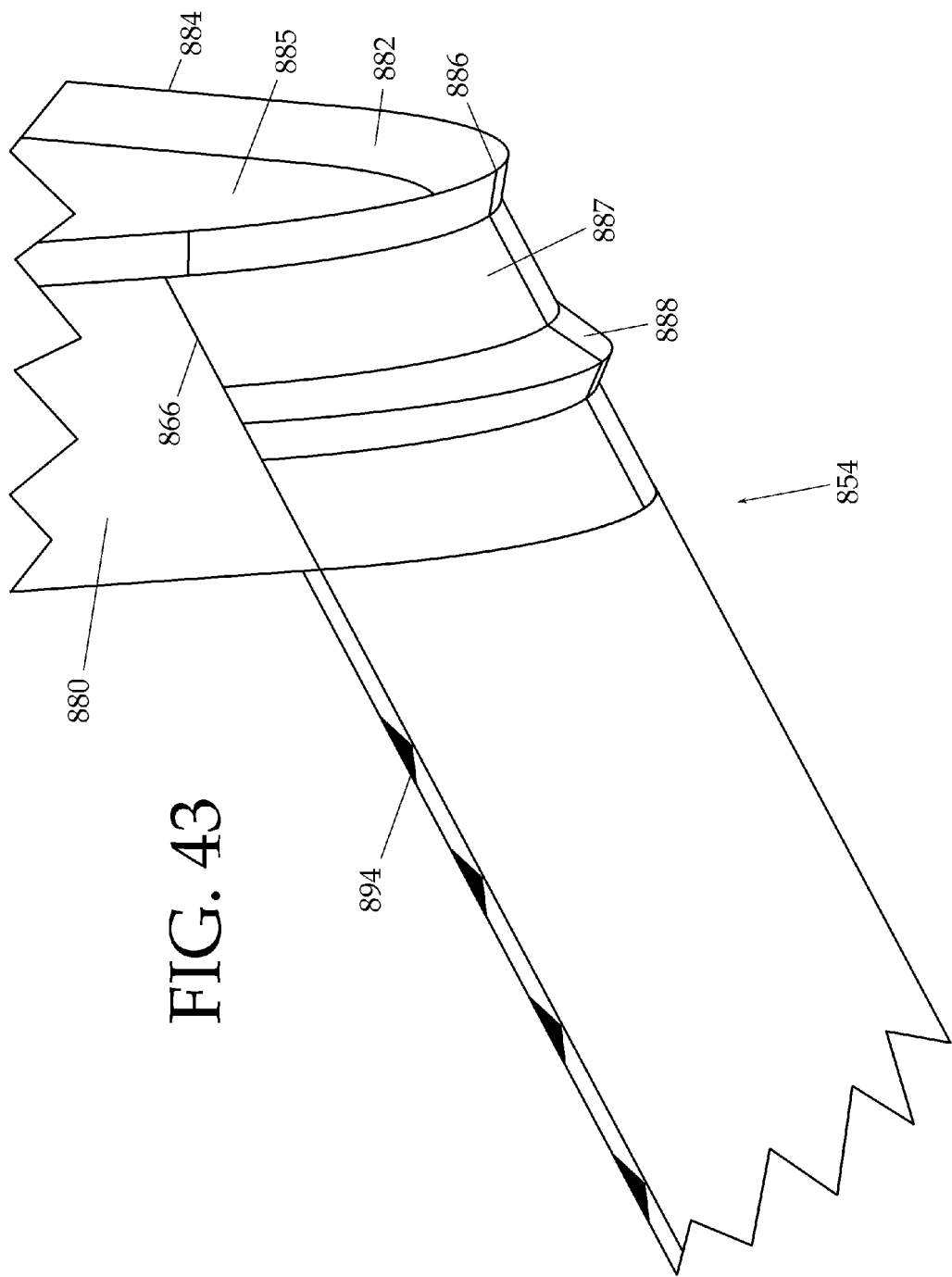
FIG. 43 is a lower back right perspective view of the adjustable inner member of the embodiment of FIGS. 42A-C.

Referring now to aspects of the invention in more detail, FIGS. 42A through 43 show an adjustable measuring assembly 850 according to an aspect of the inventive subject matter having an outer member 852 and an adjustable inner member 854 attached to form the assembly 850 by the force of gravity and a firm hand grip. FIG. 42A shows the outer member 852 and the adjustable inner member 854, assembled. FIG. 42B shows the outer member 852, and FIG. 42C shows the adjustable inner member 854, both disassembled. The outer member 852 comprises a fixed wall 856 having a vertical front face 858 having the shape of a rounded-bottom-V. The fixed wall 856 defines an interior space 860 and has an incurvate interior surface 862 forming an open channel 864 having a rounded-bottom-V-shaped cross-sectional profile normal to an oblique line 866 defining the slope of the open channel 864. The open channel 864 has a horizontal upper edge 868, such that the cross-sectional profile of the channel 864 is progressively truncated toward a horizontal upper edge 868 of the interior surface 862. The horizontal upper edge 868 functions as a full measure indicator for a measuring chamber of variable volume 869, defining a horizontal upper boundary plane that must match the horizontal upper surface of the measured material (not shown) to effect an accurate measurement. A shallow-channel-shaped, longitudinal extension 870 is attached to and extends obliquely forward and downward from the rounded bottom portion 872 of the vertical front face 858 of the fixed wall 858, forming a partial handle 874 that has a cross-sectional profile identical to that of the rounded bottom portion 876 of the open channel 864. FIG. 42B shows a series of eight curved, laterally oriented indentations 878 in the incurvate interior surface 862 at eight predetermined locations corresponding to eight volumetric measurements.

FIG. 42C shows the adjustable inner member 854 comprising a repositionable dam member 880 having a peripheral sealing member 882 made of a flexible material including a flexible peripheral leading edge 884 of the upstream face 885 that extends forward and latterly outward when in an unflexed condition and has a tapered flange shape similar in form and function to a windshield wiper blade that, when flexed by contact with the interior surface 862 of the fixed wall 856, creates a watertight seal. The center point of the peripheral leading edge 884 is also the reference point of greatest depth 886. A rounded bottom portion 887 of the dam member 880 has a curved, laterally oriented protuberance 888 that mates with any of the curved, laterally oriented indentations 878.

A lower portion of the downstream face 890 of the dam member 880 is attached to an obliquely oriented stabilizing member 892 having measurement indicia 894 imprinted thereon and having a laurel-leaf-shaped cross-sectional profile normal to the oblique line 866. The obliquely oriented stabilizing member 892 mates with the shallow-channel-shaped extension 874 of the open channel 864 (the partial handle 874) to form a two-part handle assembly 896.

FIG. 42A shows a triangular indicium indicator 898 aligned with an indicium 894 indicating a measurement of eight unspecified units (e.g., fluid ounces). FIG. 43 shows a curved, laterally oriented protuberance 898 shaped for matable engagement with any one of the eight indentations 878.

This embodiment of the invention relies upon the force of gravity acting upon the mass of the adjustable inner member 854 and the clamping force of a firm grip to urge the adjustable inner member 854 into correct alignment so as to mate positively with the outer member 852. Benefits of this embodiment of the invention include extreme ease of manufacture, ease of use, ease of repositioning of the adjustable inner member 854, and ease of separating the two members 852, 854 for cleanup, without sacrificing accuracy of measurement.

Referring now to aspects of the invention in more detail, FIGS. 44A through 45C show an adjustable measuring assembly 900 according to an aspect of the inventive subject matter having an outer member 902 and an adjustable inner member 904. FIGS. 44A and 45A show the adjustable inner member 904 and the outer member 902 attached to form the measuring assembly 900 and a measuring chamber of variable volume 906 here set for measuring ¼ cup. FIGS. 44B and 45B show the adjustable inner member 904 and the outer member 902 attached to form a measuring chamber of 1 cup. In this embodiment of the invention, the adjustable inner member 904 comprises a repositionable dam member 908 having an upstream face 910 having a rounded-bottom-closed-top-V-shaped profile normal to an oblique line 912 defining its trajectory. The repositionable dam member 908 has a downstream face 914 having a slightly larger, similarly shaped profile. The upstream face 910 and downstream face 914 are parallel to one another and perpendicular to the oblique line 912. FIGS. 44C and 45C show the repositionable dam member 908 having a peripheral sealing member 916 made of a flexible material attached to the peripheral portion 918 of the upstream face 910 and including a flexible peripheral leading edge 920 that extends forward and latterly outward when in an unflexed condition and has a tapered flange 922 similar in form and function to a windshield wiper blade. The center point of the peripheral leading edge is also the reference point of greatest depth 923. The side surfaces 924 of the dam member 908 are flared outward in the downstream direction to form a sharply beveled lip 926 around the peripheral trailing edge 928 of the downstream face 914.

FIGS. 44A-B and 45A-B show the outer member 902 comprising a fixed wall 930 defining an interior space 932 and having an incurvate interior surface 934 forming an obliquely oriented channel 936 having a cross-sectional profile that is progressively truncated toward the horizontal upper edge 938 of the interior surface 934. The horizontal upper edge 938 of the interior surface 934 in this embodiment of the invention is the full measure indicator, defining a horizontal upper boundary plane that must match the horizontal upper surface of the measured material (not shown) to effect an accurate measurement. At five predetermined locations upon the incurvate interior surface 934 corresponding to measurements of ¼ cup, ⅓ cup, ½ cup, ¾ cup, and 1 cup, five parallel indentations 940 each running down one side, across the bottom, and up the opposite side of the interior surface 934 of the fixed wall 930 of the outer member 902 define five parallel planes and form five tight-fitting slots 942 into which the repositionable dam member 908 can be inserted. Measurement indicia 944 are imprinted on the outer surface 946 of the fixed wall 930 near to the corresponding slot 942. The beveled edge of the dam member 908 itself functions as the indicium indicator 948. Insertion of the dam member 908 into one of the slots 942 causes the flexible sealing member 918 to flex, forming a watertight seal. The force of gravity pressing down upon the measured material and through the measured material to the repositionable dam member 908, as well as the frictional resistance of the increased contact surface between the dam member 908 and the tight-fitting slot 942 are sufficient to overcome the very slight flexing force of the sealing member 918, such that the repositionable dam member stays firmly in place during use.

Figure 48:
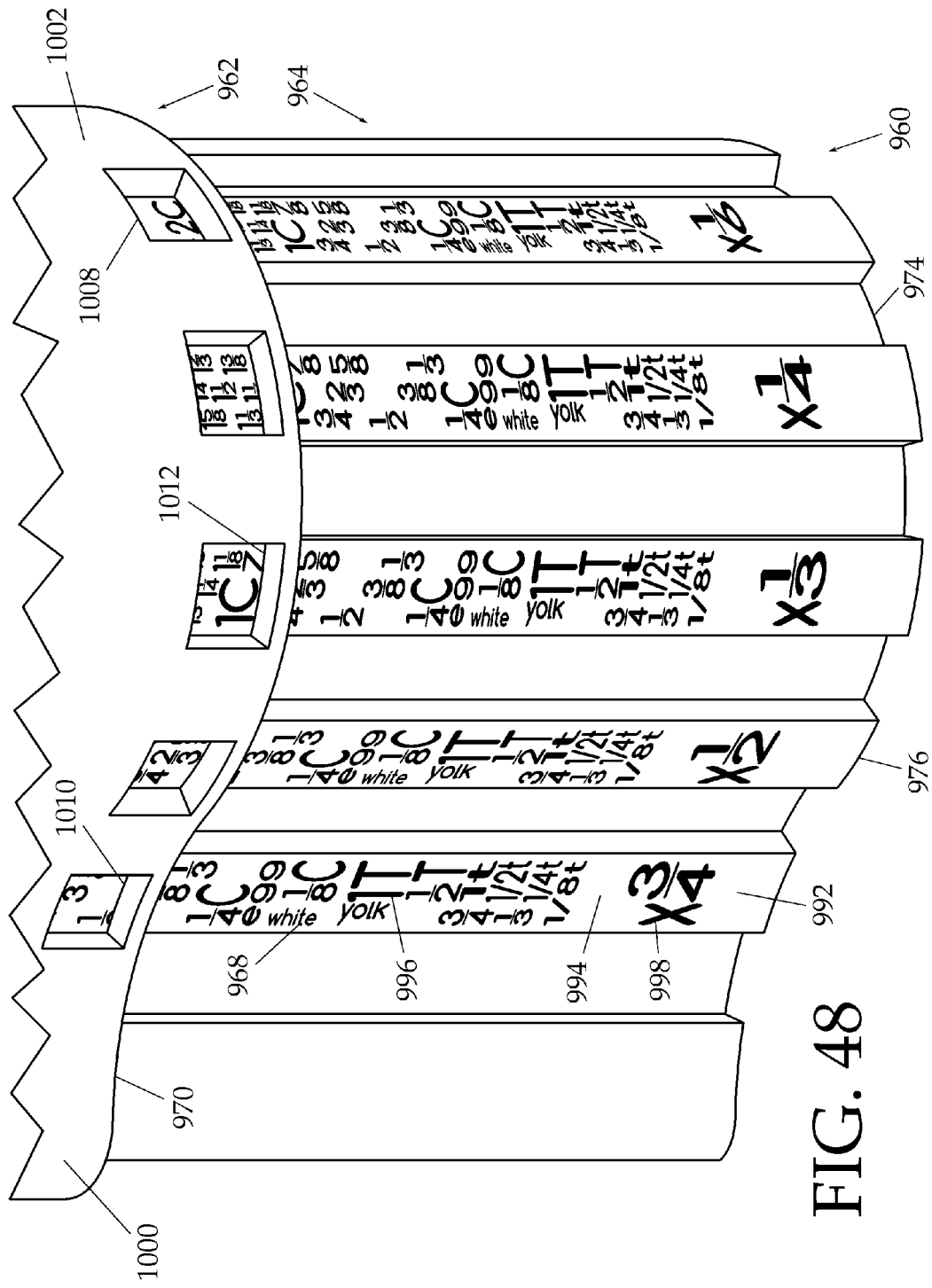
FIG. 48 is an upper left perspective view of the embodiment of FIGS. 46A-C.

Referring now to aspects of the invention in more detail, FIGS. 46A through 48 show an adjustable measuring assembly 960 according to an aspect of the inventive subject matter having an outer member 962 and an adjustable inner member 964. FIG. 46A shows the adjustable inner member 964 and the outer member 962 attached to form the measuring assembly 960 and a measuring chamber of variable volume 966, here set for measuring the volume of one egg yolk for a full recipe (with a recipe conversion factor of ×1). Measurement indicia 968, including a one egg yolk measurement, are shown more clearly in FIG. 48, as are the indicia 968 for a one egg white and a one whole egg measurement. FIGS. 47 and 48 show the adjustable inner member 964 and the outer member 962 attached to form a measuring chamber 966 set for measuring 1 cup for a ⅓ yield recipe conversion (i.e. an actual ⅓ cup measure). The adjustable inner member 964 is movable relative to the outer member 962. The inner member 964 is taller overall than the outer member 962 and protrudes both from the bottom horizontal surface 970 and the horizontal upper interior edge 972 of the outer member 962. The inner member 964 has a horizontal base 974 which can be used as a stand 976 for the measuring assembly 960. The adjustable inner member 964 has a vertical trajectory through the outer member 962. Integrally attached to and forming the upper surface 978 of the adjustable inner member 964 is a flexible, repositionable dam member 980 having an upstream face 982 that is obliquely oriented and convexly bowed upstream. The dam member 980 includes an annular peripheral sealing member 984 that is made of a flexible, waterproof material. The annular peripheral sealing member 984 includes the flexible peripheral leading edge 986 of the upstream face 982 of the dam member 980. The dam member 980 has a flexed cross-sectional profile normal to the vertical trajectory that is pear-shaped or tear-drop-shaped. The convexly bowed upstream face 982 of the dam member 980 has a progressively steeper slope toward the narrow neck of the pear shape, eventually leveling off at a reference point of greatest depth 988 at the extreme narrow end 990 of the pear shape.

FIGS. 47 and 48 show a set of ten vertical column-shaped protrusions 992 projecting outward, together forming an intermittant, curved, slidable side surface 994 having a shape conforming to the flexed cross-sectional profile of the flexible peripheral leading edge 986 of the upstream face 982 of the dam member 980. The curved, slidable side surfaces 994 of each of the columns includes a series 996 of measurement indicia 968 for one of ten recipe conversion factors and an identifying legend 998 imprinted thereupon.

As shown in FIGS. 46A, 46C, and 47, the outer member 962 has a fixed wall 1000 that is tubular and forms a snugly fitting sleeve 1002 around the adjustable inner member 964. The incurvate interior surface 1004 of the tubular fixed wall 1000 defines a laterally enclosed interior space 1006 and has a pear-shaped or tear-drop-shaped uniform cross-sectional profile normal to the trajectory of the dam member 980, such that the interior surface 1004 mates with the flexed annular peripheral sealing member 984 of the dam member 980 to form a watertight seal. The horizontal upper interior edge 972 of the tubular wall 1000 defines a full measure indicator and a horizontal upper surface of full measure for a measured quantity of material (not shown). Just above the bottom horizontal surface 970 of the outer member 962 are ten apertures 1008 through which the measurement indicia 968 can be viewed. The apertures 1008 have a lower edge 1010 that functions as an indicium indicator 1012, whereby aligning the desired indicium 968 from the desired series of recipe conversion factors of the adjustable inner member with the lower edge 1010 of the corresponding aperture 1008 of the outer member 962 forms a corresponding measuring chamber of the appropriate volume 966 in the laterally enclosed interior space 1006 above the upstream face 982 of the dam member 980.

Referring now to aspects of the invention in more detail, FIGS. 49A through 50 show an adjustable measuring assembly 1020 according to an aspect of the inventive subject matter having in general the form of an adjustable measuring spoon and comprising an outer member 1022 and an adjustable inner member 1024 that includes a repositionable dam member 1026 integrally attached to a spoon handle 1028. The repositionable dam member 1026 has an oblique linear trajectory through the outer member 1022. The upstream face 1035 of the repositionable dam member 1026 bows convexly upstream, from front to back, so that the slope of the upstream wall progressively increases as measured from the front to the back. A reference point of greatest depth 1030 is located at the farthest point back and down the peripheral leading edge 1032 of the dam member 1026. In order to create a more conventionally spoon-like, bowl-shaped measuring chamber of variable volume 1034, the upstream face 1035 of the repositionable dam member 1026 is concave in the lateral direction.

FIG. 50 shows an exploded view of the measuring assembly 1020 with the outer member 1022 and the adjustable inner member 1024 disassembled. The fixed wall 1036 of the outer member 1022 is shown to have the general form of an extruded parabolic U-shaped channel 1038 having an incurvate interior surface 1040 with two sharply protuberant, inwardly facing longitudinal ridges 1042 near the open front end 1044 of the U-shaped channel 1038, forming a pair of slidably engageable tracks 1046 and forming a snugly fitting sleeve 1048 that almost entirely surrounds the repositionable dam member 1026. The incurvate interior surface 1040 of the U-shaped channel 1038 and the two sharp, inwardly facing protuberant ridges 1042 in combination define a partially enclosed interior space 1050 having a uniform cross-sectional profile normal to the trajectory of the dam member

1026. A horizontal top edge 1052 of the incurvate interior surface 1040 of the fixed wall 1036 defines a full measure indicator and a horizontal upper surface of full measure for a measured quantity (not shown). The two sharp, inwardly facing protuberant ridges 1042 slidably mate with two obliquely oriented V-shaped indentations 1053 running parallel to and very near to the front face of the dam member, immediately behind the handle 1028. The measuring chamber of variable volume 1034 is shown to be formed when the outer member 1022 and the adjustable inner member 1024 are assembled to form the measuring assembly 1020. Along the exterior surface 1054 of the fixed wall 1036 near the open front end 1044 of the U-shaped channel 1038 a series of nine measuring indicia 1056 are imprinted ranging from ⅟₁₆ teaspoon to 1½ tablespoons. As the adjustable inner member 1024 is raised in relation to the outer member 1022, an arrow shaped indicium indicator 1058, shown in FIGS. 49A-B, that is located below the handle 1028 also rises to align with successively smaller measurement indicia 1056. Simultaneously, a progressively increasing area of the convexly bowed upstream face 1035 of the repositionable dam member 1026 rises above the horizontal upper surface of full measure. The last and smallest of the measuring chambers of variable volume 1034 (⅟₁₆ teaspoon) employs the smallest area of the upstream face 1035 of the dam member 1026. Raising the adjustable inner member 1024 farther until the reference point of greatest depth 1030 aligns with the horizontal top edge 1052 of the incurvate interior surface 1040 causes the measuring chamber of variable volume 1034, in effect, to disappear.

A peripheral sealing member (not shown) may be incorporated into this embodiment of the invention by having the sharp, windshield-wiper-shaped flange 1060 of the peripheral leading edge 1032 produced by the lateral concavity of the upstream face 1035 of the repositionable dam member 1026 be made of a flexible waterproof material and by slightly outwardly flaring the entire peripheral leading edge 1032 of the upstream face 1035, so that the constant inward pressure of the incurvate interior surface 1040 of the outer member 1022 upon the outwardly flaring peripheral leading edge 1032 of the upstream face 1035 of the dam member 1026 forms a watertight seal.

FIG. 49A shows the adjustable inner member 1024 and the outer member 1022 attached to form the measuring assembly 1020 and a measuring chamber of variable volume 1034, here set for measuring 1½ tablespoons. FIG. 49B shows the adjustable inner member 1024 and the outer member 1022 attached to form a measuring chamber of variable volume 1034 for ⅟₁₆ teaspoon.

The construction details of the invention as shown in FIGS. 3A through 50 are that the measuring utensil may be made of food grade or food safe plastic, bio-plastic, metal such as stainless steel, or other sufficiently strong and rigid material. Parts not directly in contact with measured foodstuff, such as a stand or indicia display area may be made of other rigid materials such as wood or bamboo. The peripheral sealing member may be made of food grade waterproof silicone, flexible vinyl, natural latex rubber, or synthetic rubber and may be attached to the repositionable dam member by food grade adhesive or by the interlocking of mating parts.

The construction details of the invention as shown in FIG. 1, FIG. 2, FIG. 6, FIG. 7, FIG. 8, FIG. 9, FIG. 10, and FIG. 11 are that the structure of walls 29, 30, and 31, doors 28 and 27, cabinetry, deck 41, column formwork 14, and floor substrate 45 may be of wood, metal, or any other sufficiently strong material such as high-strength plastic, fiberglass or carbon fiber as is suited to the use. In addition, exterior walls should incorporate materials that are appropriate to their exposure to the elements. Wall finishes such as tile 55, paint or wall covering must be flexible and durable enough to withstand unusual stresses from transportation prior to placement, as well as normal wear and tear during regular use after they are placed in the final building. All materials, fixtures, finishes, and equipment are to be installed such that they meet all necessary building codes, inspections, and other regulatory requirements.

Having thus described in detail certain specific embodiments of the adjustable volumetric measuring utensil of the present invention, it is to be appreciated and will be apparent to those skilled in the art that many changes not exemplified in the detailed description of the invention could be made without altering the inventive concepts and principles embodied therein. It is also to be appreciated that numerous embodiments incorporating only part of the preferred embodiment are possible which do not alter, with respect to those parts, the inventive concepts and principles embodied therein. The presented embodiments are therefore to be considered in all respects exemplary and/or illustrative and not restrictive, the scope of the invention being indicated by the appended claims, and all alternate embodiments and changes to the embodiments shown herein which come within the meaning and range of equivalency of the appended claims are therefore to be embraced therein.

I claim:

1. An adjustable volumetric measuring utensil comprising:
   (a) an adjustable inner member including a repositionable dam member comprising an upstream face having a peripheral leading edge having a reference point of greatest depth,
   (b) an outer member including a fixed wall defining an interior space and having an incurvate interior surface mating with the peripheral leading edge of the upstream face of the repositionable dam member at at least four predetermined locations upon the incurvate interior surface, the incurvate interior surface having an upper edge that is open and unobstructed, the outer member having a full measure indicator selected from the group consisting of a lowest portion of the upper edge of the incurvate interior surface wherein the lowest portion of the upper edge is horizontal, a distinguishing mark, a pointer, an indicator, an indicium, a distinguishing physical feature, an imprinted horizontal line of demarcation and an incised horizontal line of demarcation, wherein the full measure indicator defines a horizontal upper boundary plane delimiting the incurvate interior surface and wherein, for a measured quantity of material, the full measure indicator defines a horizontal upper surface of full measure, such that the dam member can be repositioned to any one of the plurality of predetermined locations upon the incurvate interior surface to define a measuring chamber of variable volume depending on the positioning of the dam member upon the incurvate interior surface, the measuring chamber being bounded above by the horizontal upper boundary plane; the at least four predetermined locations comprising a first location defining a first positioning of the dam member, defining a first positioning of the adjustable inner member relative to the outer member, defining a first predetermined volumetric measurement, and defining a first reference point of greatest depth of the peripheral leading edge, having a depth beneath the horizontal upper boundary plane of D1, a second location defining a second positioning of the dam member defining a second positioning of the adjustable inner member relative to the outer member, defining a second predetermined volumetric measurement, and defining a second reference point of greatest depth of the peripheral leading edge, having a depth beneath the horizontal upper boundary plane of D2 lower than D1, a third location defining a third positioning of the dam member defining a third positioning of the adjustable inner member relative to the outer member, defining a third predetermined volumetric measurement, and defining a third reference point of greatest depth of the peripheral leading edge, having a depth beneath the horizontal upper boundary plane of D3 lower than D2, and a fourth location defining a fourth positioning of the dam member defining a fourth positioning of the adjustable inner member relative to the outer member, defining a fourth predetermined volumetric measurement, and defining a fourth reference point of greatest depth of the peripheral leading edge, having a depth beneath the horizontal upper boundary plane of D4 lower than D3; the upstream face of the dam member comprising a lower surface of variable area depending on the positioning of the dam member upon the incurvate interior surface, the lower surface being that part of the upstream face of the dam member that is in contact with the volume of measured material, the lower surface being delimited above by the horizontal upper boundary plane and delimited laterally and below by the peripheral leading edge, wherein the first positioning of the dam member defines a first positioning of the upstream face comprising a first lower surface having a vertical height H1 and an area A1 and wherein the first positioning of the dam member defines a first measuring chamber having a first volume V1; wherein the second positioning of the dam member defines a second positioning of the upstream face comprising a second lower surface having a vertical height H2 greater than H1 and an area A2 greater than A1 and wherein the second positioning of the repositionable dam member defines a second measuring chamber having a second volume V2 greater than V1, the second volume V2 comprising the first volume V1 and an additional volume VT including a portion of the interior space below depth D1; and wherein the third positioning of the dam member defines a third positioning of the upstream face comprising a third lower surface having a vertical height H3 greater than H2 and an area A3 greater than A2 and wherein the third positioning of the repositionable dam member defines a third measuring chamber having a third volume V3 greater than V2, the third volume V3 comprising the second volume V2 and an additional volume V3' including a portion of the interior space below depth D2; and wherein the fourth positioning of the dam member defines a fourth positioning of the upstream face comprising a fourth lower surface having a vertical height H4 greater than H3 and an area A4 greater than A3 and wherein the fourth positioning of the repositionable dam member defines a fourth measuring chamber having a fourth volume V4 greater than V3, the fourth volume V4 comprising the third volume V3 and an additional volume V4' including a portion of the interior space below depth D3, (c) a series of volumetric measuring indicia including, for each one of the at least four predetermined positionings of the adjustable inner member relative to the outer member defining one of the at least four predetermined volumetric measurements, an aligned pair of distinguishing marks selected from the group consisting of an indicium identifying the one of the plurality of predetermined volumetric measurements imprinted or incised upon the adjustable inner member and an indicator imprinted or incised upon the outer member; and an indicium identifying the one of the plurality of predetermined volumetric measurements imprinted or incised upon the outer member and an indicator imprinted or incised upon the adjustable inner member, and (d) releasable attachment means for attaching the repositionable dam member of the adjustable inner member to the incurvate interior surface of the outer member to form a measuring assembly when the dam member is fitted into the incurvate interior surface at one of the at least four predetermined locations.

2. The adjustable volumetric measuring utensil of claim 1, further comprising at least a second series of volumetric measuring indicia and a legend indicating a recipe conversion factor, the second series of volumetric measuring indicia being of a selected ratio to but indicating a volume different from the actual volume of the measured quantity of material in the measuring utensil such that the volume indicated is the product of the actual volume times the reciprocal of the recipe conversion factor, the at least a second series of volumetric measuring indicia including, for each one of a plurality of predetermined positionings of the adjustable inner member relative to the outer member defining one of a plurality of predetermined converted volumetric measurements, an aligned pair of distinguishing marks selected from the group consisting of an indicium identifying the one of the plurality of predetermined converted volumetric measurements imprinted or incised upon the adjustable inner member and an indicator imprinted or incised upon the outer member; and an indicium identifying the one of the plurality of predetermined converted volumetric measurements imprinted or incised upon the outer member and an indicator imprinted or incised upon the adjustable inner member.

3. The adjustable volumetric measuring utensil of claim 1, wherein the outer member further comprises at least a second full measure indicator for safely measuring a quantity of spillable liquid selected from the group consisting of a distinguishing mark, a pointer, an indicator, an indicium, a distinguishing physical feature, an imprinted horizontal line of demarcation and an incised horizontal line of demarcation, the second indicator being located beneath the full measure indicator, wherein the full measure indicator is the horizontal upper edge of the outer member and is intended for the measurement of dry ingredients that can be leveled with a straightedge or by gently shaking the dry ingredients, wherein the second full measure indicator defines a second horizontal upper boundary plane delimiting the incurvate interior surface and wherein, for a measured quantity of spillable liquid, the second full measure indicator defines a horizontal upper surface of full measure, and wherein the series of volumetric measuring indicia further includes a second indicator selected from the group consisting of a second indicator imprinted or incised upon the adjustable inner member and a second indicator imprinted or incised upon the outer member.

4. The adjustable volumetric measuring utensil of claim 1, wherein the adjustable inner member has an axial end swingably suspended about a swinging axis and a circumferential end integrally attached to the repositionable dam member, the dam member having a circular-arc-shaped trajectory centered at the swinging axis, the dam member being movable along the trajectory, the dam member having a generally closed-top-V-shaped cross-sectional profile normal to the circular-arc-shaped trajectory, wherein the dam member comprises a peripheral sealing member that is made of a flexible, waterproof material and wherein the peripheral sealing member includes the peripheral leading edge of the upstream face of the dam member, wherein the incurvate interior surface of the fixed wall of the outer member comprises a curved open channel slidably mating with the flexible peripheral leading edge of the upstream face of the dam member and having a channel shape of uniform, generally V-shaped cross-sectional profile normal to the circular-arc-shaped trajectory of the dam member, the uniform cross-sectional profile of the channel shape being progressively truncated toward the upper edge of the interior surface, the channel shape mating with the profile of the flexible peripheral leading edge of the upstream face of the dam member when in a sufficiently flexed condition so as to form a watertight seal between the dam member and the channel, wherein the outer member includes a support member having an axial end extending above the channel to include the swinging axis, the axial end of the support member being pivotally coupled to the axial end of the adjustable inner member so that the inner and outer members exert a radially oriented clamping force upon the flexible peripheral edge of the upstream face of the dam member, and wherein the releasable attachment means for attaching the repositionable dam member of the inner member to the incurvate interior surface of the outer member to form a measuring assembly when the dam member is fitted into the incurvate interior surface at one of the at least four predetermined locations comprises the radially oriented clamping force exerted upon the flexible peripheral edge of the upstream face of the dam member by the pivotal coupling of the axial ends of the inner and outer members.

5. The adjustable volumetric measuring utensil of claim 4, further comprising at least a second series of volumetric measuring indicia and a legend indicating a recipe conversion factor, the second series of volumetric measuring indicia being of a selected ratio to but indicating a volume different from the actual volume of the measured quantity of material in the measuring utensil such that the volume indicated is the product of the actual volume times the reciprocal of the recipe conversion factor, the at least a second series of volumetric measuring indicia including, for each one of a plurality of predetermined positionings of the adjustable inner member relative to the outer member defining one of a plurality of predetermined converted volumetric measurements, an aligned pair of distinguishing marks selected from the group consisting of an indicium identifying the one of the plurality of predetermined converted volumetric measurements imprinted or incised upon the adjustable inner member and an indicator imprinted or incised upon the outer member; and an indicium identifying the one of the plurality of predetermined converted volumetric measurements imprinted or incised upon the outer member and an indicator imprinted or incised upon the adjustable inner member.

6. The adjustable volumetric measuring utensil of claim 4, wherein the outer member further comprises at least a second full measure indicator for safely measuring a quantity of spillable liquid selected from the group consisting of a distinguishing mark, a pointer, an indicator, an indicium, a distinguishing physical feature, an imprinted horizontal line of demarcation and an incised horizontal line of demarcation, the second indicator being located beneath the full measure indicator, wherein the full measure indicator is the horizontal upper edge of the outer member and is intended for the measurement of dry ingredients that can be leveled with a straightedge or by gently shaking the dry ingredients, wherein the second full measure indicator defines a second horizontal upper boundary plane delimiting the incurvate interior surface and wherein, for a measured quantity of spillable liquid, the second full measure indicator defines a horizontal upper surface of full measure, and wherein the series of volumetric measuring indicia further includes a second indicator selected from the group consisting of a second indicator imprinted or incised upon the adjustable inner member and a second indicator imprinted or incised upon the outer member.

7. The adjustable volumetric measuring utensil of claim 1, wherein the repositionable dam member comprises an annular peripheral sealing member that is made of a flexible, waterproof material and wherein the annular peripheral sealing member includes the peripheral leading edge of the upstream face of the dam member, the dam member having a significantly non-horizontal trajectory, the dam member being movable along the trajectory, the trajectory being selected from the group consisting of a linear trajectory and a circular-arc-shaped trajectory, the tangent to the midpoint of the trajectory having an angle of inclination between 30 degrees and 90 degrees and preferentially 90 degrees above horizontal, the upstream face having a flexed cross-sectional profile normal to the trajectory, the dam member having a slidable side surface having a shape conforming to a sweep trajectory of the flexed cross-sectional profile of the upstream face normal to the trajectory, wherein the fixed wall of the outer member is tubular and defines a laterally enclosed interior space, the incurvate interior surface of the tubular wall having a uniform cross-sectional profile normal to the trajectory of the dam member, the uniform cross-sectional profile of the incurvate interior surface being progressively truncated toward the upper edge of the interior surface, the incurvate interior surface slidably mating with the flexible peripheral leading edge of the upstream face of the dam member when in a sufficiently flexed condition so as to form a watertight seal between the dam member and the channel, such that the outer member exerts a circumferential clamping force upon the flexible peripheral edge of the upstream face of the dam member, and wherein the releasable attachment means for attaching the repositionable dam member of the adjustable inner member to the incurvate interior surface of the outer member to form a measuring assembly when the dam member is fitted into the incurvate interior surface at one of the plurality of predetermined locations comprises the circumferential clamping force exerted upon the flexible peripheral edge of the upstream face of the dam member by the outer member.

8. The adjustable volumetric measuring utensil of claim 7, further comprising at least a second series of volumetric measuring indicia and a legend indicating a recipe conversion factor, the second series of volumetric measuring indicia being of a selected ratio to but indicating a volume different from the actual volume of the measured quantity of material in the measuring utensil such that the volume indicated is the product of the actual volume times the reciprocal of the recipe conversion factor, the at least a second series of volumetric measuring indicia including, for each one of a plurality of predetermined positionings of the adjustable inner member relative to the outer member defining one of a plurality of predetermined converted volumetric measurements, an aligned pair of distinguishing marks selected from the group consisting of an indicium identifying the one of the plurality of predetermined converted volumetric measurements imprinted or incised upon the adjustable inner member and an indicator imprinted or incised upon the outer member; and an indicium identifying the one of the plurality of predetermined converted volumetric measurements imprinted or incised upon the outer member and an indicator imprinted or incised upon the adjustable inner member.

9. The adjustable volumetric measuring utensil of claim 7, wherein the outer member further comprises at least a second full measure indicator for safely measuring a quantity of spillable liquid selected from the group consisting of a distinguishing mark, a pointer, an indicator, an indicium, a distinguishing physical feature, an imprinted horizontal line of demarcation and an incised horizontal line of demarcation, the second indicator being located beneath the full measure indicator, wherein the full measure indicator is the horizontal upper edge of the outer member and is intended for the measurement of dry ingredients that can be leveled with a straightedge or by gently shaking the dry ingredients, wherein the second full measure indicator defines a second horizontal upper boundary plane delimiting the incurvate interior surface and wherein, for a measured quantity of spillable liquid, the second full measure indicator defines a horizontal upper surface of full measure, and wherein the series of volumetric measuring indicia further includes a second indicator selected from the group consisting of a second indicator imprinted or incised upon the adjustable inner member and a second indicator imprinted or incised upon the outer member.

10. The adjustable volumetric measuring utensil of claim 1, wherein the repositionable dam member comprises a peripheral sealing member that is made of a flexible, waterproof material and wherein the peripheral sealing member includes the peripheral leading edge of the upstream face of the dam member, the dam member having a significantly non-horizontal trajectory, the dam member being movable along the trajectory, the trajectory being selected from the group consisting of a linear trajectory, a circular-arc-shaped trajectory, and a continuous-curve-shaped trajectory, such that a line connecting the endpoints of the trajectory has an angle of inclination between 20 degrees and 135 degrees above horizontal, the flexible leading edge of the dam member having a flexed cross-sectional profile normal to the trajectory,
wherein the incurvate interior surface of the fixed wall of the outer member comprises an elongated, significantly non-horizontally oriented open channel having a general longitudinal orientation having an angle of inclination between 20 degrees and 135 degrees and preferentially between 30 degrees and 90 degrees above horizontal, the open channel slidably mating with the flexible peripheral leading edge of the upstream face of the dam member and having a channel shape having a uniform cross-sectional profile normal to the trajectory of the dam member, the uniform cross-sectional profile of the channel shape being progressively truncated toward the upper edge of the interior surface, the channel shape mating with the flexible peripheral leading edge of the upstream face of the dam member when in a sufficiently flexed condition so as to form a watertight seal between the dam member and the channel.

11. The adjustable volumetric measuring utensil of claim 10,
further comprising at least a second series of volumetric measuring indicia and a legend indicating a recipe conversion factor, the second series of volumetric measuring indicia being of a selected ratio to but indicating a volume different from the actual volume of the measured quantity of material in the measuring utensil such that the volume indicated is the product of the actual volume times the reciprocal of the recipe conversion factor, the at least a second series of volumetric measuring indicia including, for each one of a plurality of predetermined positionings of the adjustable inner member relative to the outer member defining one of a plurality of predetermined converted volumetric measurements, an aligned pair of distinguishing marks selected from the group consisting of an indicium identifying the one of the plurality of predetermined converted volumetric measurements imprinted or incised upon the adjustable inner member and an indicator imprinted or incised upon the outer member; and an indicium identifying the one of the plurality of predetermined converted volumetric measurements imprinted or incised upon the outer member and an indicator imprinted or incised upon the adjustable inner member.

12. The adjustable volumetric measuring utensil of claim 10,
wherein the outer member further comprises at least a second full measure indicator for safely measuring a quantity of spillable liquid selected from the group consisting of a distinguishing mark, a pointer, an indicator, an indicium, a distinguishing physical feature, an imprinted horizontal line of demarcation and an incised horizontal line of demarcation, the second indicator being located beneath the full measure indicator, wherein the full measure indicator is the horizontal upper edge of the outer member and is intended for the measurement of dry ingredients that can be leveled with a straightedge or by gently shaking the dry ingredients, wherein the second full measure indicator defines a second horizontal upper boundary plane delimiting the incurvate interior surface and wherein, for a measured quantity of spillable liquid, the second full measure indicator defines a horizontal upper surface of full measure, and wherein the series of volumetric measuring indicia further includes a second indicator selected from the group consisting of a second indicator imprinted or incised upon the adjustable inner member and a second indicator imprinted or incised upon the outer member.

13. The adjustable volumetric measuring utensil of claim 1,
wherein the repositionable dam member comprises a peripheral sealing member that is made of a flexible, waterproof material and wherein the peripheral sealing member includes the peripheral leading edge of the upstream face of the dam member, the dam member having a side surface adjacent the peripheral leading edge, the side surface having a prominent surface feature selected from the group consisting of a laterally oriented protuberance and a laterally oriented indentation, wherein the side surface has a shape, wherein the incurvate interior surface of the fixed wall of the outer member comprises an elongated, significantly non-horizontally oriented open channel having a general longitudinal orientation having an angle of inclination between 5 degrees and 135 degrees and preferentially between 30 degrees and 90 degrees above horizontal, wherein the open channel has at least four prominent surface features located at the at least four predetermined locations upon the incurvate interior surface, each one of the at least four prominent surface features having a shape mating with the shape of the prominent surface feature of the side surface of the dam member, so as to positively seat the repositionable dam member at the at least four predetermined locations upon the incurvate interior surface.

14. The adjustable volumetric measuring utensil of claim 1, wherein the repositionable dam member comprises a peripheral sealing member that is made of a flexible, waterproof material and wherein the peripheral sealing member includes the peripheral leading edge of the upstream face of the dam member, the dam member having a side surface adjacent the peripheral leading edge and a downstream face having a peripheral portion adjacent the side surface including a sufficiently expansive area of the downstream face so that the combination of the flexed peripheral leading edge, the side surface, and the peripheral portion of the downstream face have a shape in the form of a generally semi-annular protrusion, wherein the incurvate interior surface of the fixed wall of the outer member comprises an elongated, significantly non-horizontally oriented open channel having a general longitudinal orientation having an angle of inclination between 5 degrees and 135 degrees and preferentially between 30 degrees and 90 degrees above horizontal, wherein the open channel has at least four indentations located at the at least four predetermined locations upon the incurvate interior surface, each one of the at least four indentations having a downstream lip and having a shape mating with the shape of the combination of the flexed peripheral leading edge, the side surface, and the peripheral portion of the downstream face of the dam member so as to positively seat the repositionable dam member at each of the at least four predetermined locations upon the incurvate interior surface such that a downwardly directed force of gravity and a downstream force exerted by the pressure of the measured quantity of material will lock the repositionable dam member in place.

* * * * *